(12) United States Patent
Abe et al.

(10) Patent No.: US 6,499,822 B1
(45) Date of Patent: Dec. 31, 2002

(54) METHOD AND APPARATUS FOR FORMING AN IMAGE ON A RECORDING MEDIUM WITH CONTRACTION AND EXPANSION PROPERTIES

(75) Inventors: Junkichi Abe, Tokyo (JP); Hiroyuki Miyake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/295,440

(22) Filed: Apr. 23, 1999

(30) Foreign Application Priority Data

Apr. 27, 1998 (JP) ........................... 10-116745
Apr. 27, 1998 (JP) ........................... 10-116746
Apr. 27, 1998 (JP) ........................... 10-116747

(51) Int. Cl.[7] .................. B41J 29/393; B41J 29/38; B41J 2/01
(52) U.S. Cl. .................. 347/19; 347/14; 347/101
(58) Field of Search .................. 347/14, 15, 19, 347/101, 105, 106

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/56 |
| 4,463,359 A | 7/1984 | Ayata et al. | 347/56 |
| 4,698,642 A | 10/1987 | Gamblini | 347/42 |
| 4,723,129 A * | 2/1988 | Endo et al. | 347/56 |
| 4,740,796 A | 4/1988 | Endo et al. | 347/56 |
| 4,956,906 A | 9/1990 | Masse et al. | 413/8 |
| 5,345,863 A * | 9/1994 | Kurata et al. | 101/126 |
| 5,376,957 A | 12/1994 | Gandy et al. | 347/3 |
| 5,742,301 A | 4/1998 | Ikeda | 347/9 |

FOREIGN PATENT DOCUMENTS

| | | | |
|---|---|---|---|
| EP | 0 718 228 | 6/1996 | B65H/20/20 |
| EP | 0 764 543 | 3/1997 | B41J/13/10 |
| EP | 0 796 740 | 9/1997 | B41J/11/00 |
| EP | 0 835 761 | 4/1998 | B41J/3/60 |
| FR | 2 687 348 | 2/1992 | B44C/1/00 |
| JP | 2-90275 | 3/1990 | G06F/15/66 |
| JP | 5-212851 | 8/1993 | B41J/2/01 |

* cited by examiner

Primary Examiner—John Barlow
Assistant Examiner—Juanita Stephens
(74) Attorney, Agent, or Firm—Fitzpatrick, Cella, Harper & Scinto

(57) ABSTRACT

The invention provides an image forming method and apparatus capable of forming an image with a desired shape at a correct position on a recording medium having expansion and contraction properties. Boundary lines formed on the recording medium being conveyed are detected by a sensor. Distortion of the recording medium is evaluated on the basis of the detected boundary lines. Image data is corrected in accordance with the result of the evaluation and an image is formed in accordance with the corrected image data. In the above process, image data within the respective areas surrounded by the boundary lines is deformed such that the image is printed at a correct location even when the recording medium has distortion due to expansion/contraction.

59 Claims, 36 Drawing Sheets

FIG. I

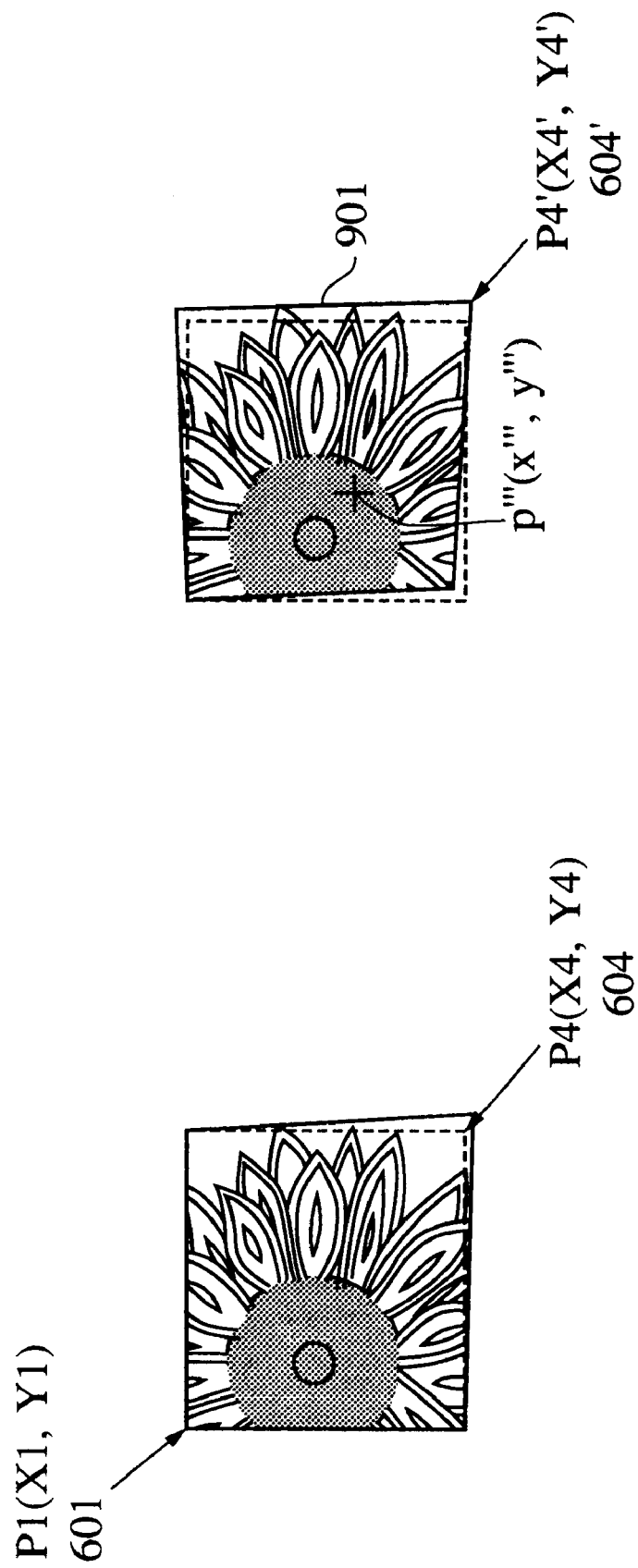

| |
|---|
| T1 |
| T1__σX2 |
| T1__σY2 |
| T1__σX3 |
| T1__σY3 |
| T1__σX4 |
| T1__σY4 |
| T2 |
| T2__σX2 |
| T2__σY2 |
| T2__σX3 |
| T2__σY3 |
| T2__σX4 |
| T2__σY4 |
| T3 |
| T3__σX2 |
| T3__σY2 |
| T3__σX3 |
| T3__σY3 |
| T3__σX4 |
| T3__σY4 |
| T4 |
| T4__σX2 |
| • |
| • |
| • |
| • |

TILE NUMBER (1)
CORRECTION VALUE 505 FOR A SECOND REFERENCE POINT IN THE MAIN SCANNING DIRECTION
CORRECTION VALUE 506 FOR THE SECOND REFERENCE POINT IN THE SUB-SCANNING DIRECTION
CORRECTION VALUE 507 FOR A THIRD REFERENCE POINT IN THE MAIN SCANNING DIRECTION
CORRECTION VALUE 508 FOR THE THIRD REFERENCE POINT IN THE SUB-SCANNING DIRECTION
CORRECTION VALUE 509 FOR A FOURTH REFERENCE POINT IN THE MAIN SCANNING DIRECTION
CORRECTION VALUE 510 FOR THE FOURTH REFERENCE POINT IN THE SUB-SCANNING DIRECTION
TILE NUMBER (2)

TILE NUMBER (3)

TILE NUMBER (4)

FIG. 10

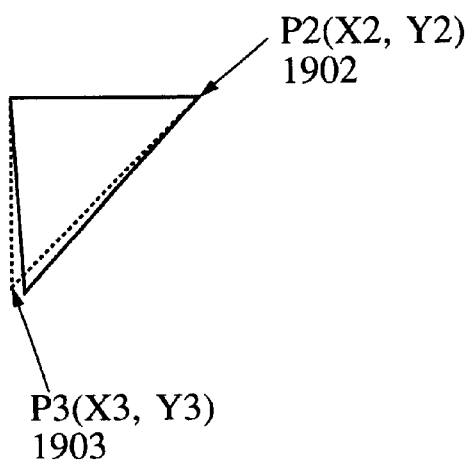
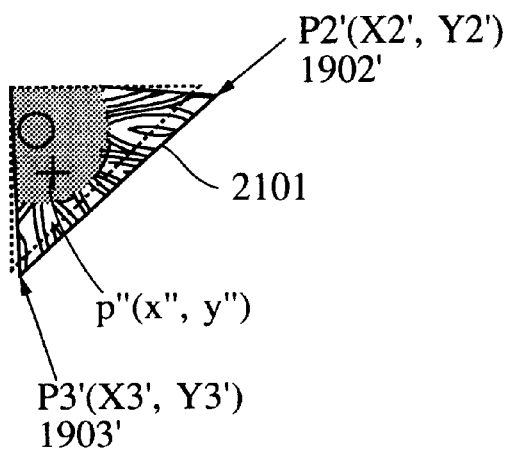
FIG. 21A    FIG. 21B
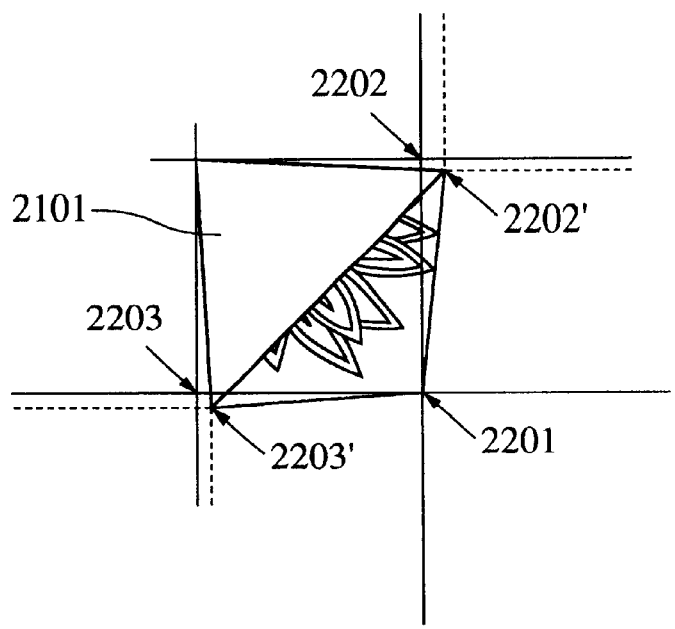
FIG. 22

411

413

412

METHOD AND APPARATUS FOR FORMING AN IMAGE ON A RECORDING MEDIUM WITH CONTRACTION AND EXPANSION PROPERTIES

BACKGROUND OF THE INVENTION

1. Field of the Invention

The present invention relates to a method and apparatus for forming an image on a recording medium. More specifically, the present invention relates to a method and apparatus for forming an image on a recording medium having expansion/contraction properties such as a cloth. The present invention also relates to a method and apparatus for forming an image by emitting ink using an ink-jet head according to an ink-jet recording technique.

2. Description of the Related Art

An ink-jet recording apparatus is widely used because of its ease of use. In this type of recording apparatus, recording is accomplished by emitting ink toward a recording medium.

The ink-jet recording apparatus includes an ink-jet head for emitting an ink droplet and an ink tank for storing ink to be supplied to the ink-jet head. The ink-jet head has an emission orifice through which ink is emitted. Near the emission orifice, there is provided an emission energy generator used to emit ink. Various types of energy generators are known. They include a heat generator for applying thermal energy to ink and a piezoelectric device for applying a mechanical pressure to ink thereby emitting the ink. The ink tank is connected to the emission orifice via an ink flowing path.

In recent years, image forming apparatus for printing an image on a cloth according to an ink-jet technique is used. In this type of textile printing system, unlike conventional screen textile printing systems, it is not required to prepare a master image to be printed. Therefore, this type of textile printing system has the advantage that a wide variety of images can be printed and the total printing cost is low.

However, both the ink-jet textile printing system and the screen textile printing system have a common problem that expansion/contraction or deformation of a cloth during a printing process can cause a printed image to have distortion. This problem is described in further detail below for both textile printing systems.

(1) Screen Textile Printing System

In screen textile printing systems, a printing belt having a flat surface with a size as large as 10 to 30 meters is used to move a plurality of screen frames up and down in a vertical direction thereby forming a color image on a cloth. The cloth on which the image is to be printed is stuck via an adhesive material onto the printing belt using a cloth expanding and sticking apparatus. It is generally required that bending and skewing during the expanding and sticking process should be less than 3%. To meet the above requirement, the bending/skewing of the cloth is corrected using a cloth bending/skewing correcting apparatus before the cloth is supplied to the cloth stretching apparatus. However, the highest available correction accuracy is 1% to 3%. This rather low correction accuracy causes printed images to have distortion.

(2) Ink-Jet Printing System

An example of an ink-jet printing system is disclosed in Japanese Patent Laid-Open No. 5-212851. In this type of textile printing system, as can be seen from the description and the drawing of the patent cited above, in particular from FIG. 2 thereof, printing is performed by emitting ink from an ink-jet head toward a cloth employed as a recording medium being moved in a vertical direction. The system has a printing section for emitting ink. The printing section includes a printing unit provided with an ink-jet head and also includes a conveying mechanism including an endless belt or a conveying belt made of metal wherein the printing unit and the conveying mechanism are disposed at locations opposing each other via a cloth.

An adhesive layer is provided on the surface of the conveying belt so that the cloth can be stuck in a flat fashion on the conveying belt via the adhesive layer. The conveying belt is driven such that it rotates intermittently so as to intermittently convey the cloth by a predetermined distance at a time.

An image is printed on the surface of the cloth along one printing line at a time using a known serial printing technique. After completion of the printing, the cloth is pulled by a proper tension applied by a wind-up roller disposed at an extremely downstream location on the conveying path. At the end of the conveying belt, the cloth is separated from the adhesive layer and wound around the wind-up roller via a cloth path.

In ink-jet printing systems including the specific example described above, a crease-preventing roller is generally used to prevent the cloth from having creases when the cloth is stuck onto the adhesive layer of the conveying belt. This causes the cloth to have a nonuniform tension. As a result, the cloth stuck to the conveying belt has distortion. In order to improve the sticking accuracy to the adhesive layer, it is required to expand the cloth in a particular direction. If an image is printed on the expanded cloth, the aspect ratio of the image will become incorrect when the cloth is released from the expansion.

In the conventional screen textile printing system, as described above, it is known to use a cloth bending/skewing correcting apparatus to correct the bending/skewing of a cloth. However, about 3% distortion occurs in commonly-used apparatus and about 1% distortion occurs in highest-performance apparatus. As a result, the image printed on the cloth always has distortion. In order to precisely feed a cloth without creating distortion in printed images using the conventional screen textile printing apparatus in which distortion of the cloth is mechanically corrected, complicated mechanisms and/or troublesome manual operations by a human operator are required. In practice, therefore, printed images have a ceratin amount of distortion.

The distortion of the recording medium can cause a serious problem in particular when an image is formed via a plurality of image forming processes using various types of dyes as is the case with the textile printing on a mixed fabric. In such textile printing processes, distortion occurs not only in an image formed first but also in an image formed later. The distortion in the images can cause the images to be shifted from each other. Thus, an image miss registration or an undesirable nonuniformity can occur.

In the textile printing on a cloth, an image formed on the cloth is fixed by impregnating a coloring agent such as a dye contained in ink into fibers. When the cloth has a large thickness, it is required to impregnate a larger amount of dye into fibers. In general, the proper amount of dye impregnated into fibers is determined by visually observing the back side of the cloth on which no image is printed to check whether the dye reaches the back side.

In the art of the textile printing, it is desired to form an image on a cloth such that the image can be viewed from both sides thereby increasing the value of the cloth in markets. In particular for cloths such as a handkerchief and a scarf or for a decorating cloth such as a curtain, an image on a cloth is viewed from both sides in most cases and thus it is desirable that images be formed on both sides by increasing the amount of dye which reaches the back side in such a manner that the images on both sides correspond to each other.

One possible technique to increase the amount of dye present on the back side is to print an image on both sides of a cloth. However, in practice, it is very difficult to print an image on both sides in the ink-jet textile printing technique and also in the screen textile printing technique. In particular, it is not known to form images on both sides such that the images formed on the respective sides are coincident with each other. Some methods of printing images on both sides of a cloth are described below. However note that these methods are not good enough.

(1) A Dye having a High Penetration Property is Employed so that the Dye can Reach the Back Side This technique is limited to cloths having a small thickness. Another problem of this technique is that the high penetration property of the dye causes an image formed on a cloth to feather. If the feathering is suppressed, the dye cannot reach the back side of the cloth. Furthermore, when the cloth has a large thickness, the dye cannot reach the back side and thus it is impossible to form an image on both sides.

(2) First, Coloring (Dip Dyeing) is Performed Over the Entire Coth

Then decoloring is performed on the colored cloth in accordance with a pattern to be printed as the pattern is printed with ink containing a dye which cannot be decolored by the decoloring agent employed. In this technique, only one color of image formed by means of dip dying can be printed such that it uniformly reaches the back side. Other colors will have the same problems as those in the technique (1). Another problem of this technique is that it is required to properly select a dye capable of being decolored and a dye incapable of being decolored. That is, the types of dyes are limited and thus all dyes capable of providing a desired color cannot be used. An alternative possible technique is to print an image on both sides of a cloth. However, as will be described below, this technique has the problem that it is difficult to form high-quality images on both sides in a desirable fashion.

(3) Images are Formed on Both Sides Using a Screen Textile Printing Technique

In this technique, an image is first printed on the principal surface of a cloth and then another image is formed on the back surface of the cloth turned over. However, when the coth is turned over after the image is printed on the principal surface of the cloth, the cloth is expanded or contracted in a manner different from the manner in which the cloth is expanded or contracted when the image is printed on the principal surface. That is, there is a difference in distortion between printing processes for the principal surface and for the back surface. As a result, the resultant images formed on both sides become inconsistent with each other.

(4) Images are Formed on Both Sides Using an Ink-jet Textile Printing Technique

For recording media having substantially no expansion/contraction properties such as a film, it is possible to print images on both sides at the same time using a technique disclosed for example in U.S. Pat. No. 5,376,957. However, a recording medium having expansion/contraction properties such as a cloth cannot be conveyed while maintaining a high accuracy using a pair of rollers disclosed in the patent cited above. That is, nonuniformity of the cloth on the band causes nonuniformity in the resultant image. Thus, it is difficult to obtain an image including no defects.

As described above, when images are printed on both sides of a cloth using any conventional textile printing technique or apparatus in such a manner that after forming an image on the principal surface of the cloth and then the cloth is turned over and finally another image is printed on the back surface, the image formed on the back surface becomes inconsistent with the image formed on the principal surface due to deformation of the cloth caused by the expansion/contraction properties of the cloth (that is, it is difficult to achieve sufficiently high accuracy in registration between the images on both sides). Thus, the printing technique on cloths is used only to form an image on one surface. Therefore, the back side on which no image is printed looks whitish. This limits the applications of the printed cloths and it is impossible to increase their value.

As described above, any conventional textile printing technique cannot form images on both sides such that the images on both sides have the same image intensity and such that the images on both sides are coincident with each other.

SUMMARY OF THE INVENTION

Thus, it is an object of the invention to provide an image forming method and apparatus having a simplified construction, capable of printing a high-precision image with no distortion on a recording medium having expansion/contraction properties, such as a cloth.

According to an aspect of the present invention, there is provided an image forming apparatus for forming an image on a recording medium using a recording head in accordance with image data, the apparatus comprising: conveying means for conveying the recording medium; evaluation means for evaluating the distortion of the recording medium conveyed by the conveying means; correction means for correcting the image data in accordance with the result of the evaluation made by the evaluation means; and image forming means for forming an image on the recording medium by driving the recording head in accordance with the image data corrected by the correction means.

According to another aspect of the present invention, there is provided a method of forming an image on a recording medium using a recording head in accordance with image data, the method comprising the steps of: conveying the recording medium; evaluating the distortion of the recording medium conveyed; correcting the image data in accordance with the result of the evaluation made in the evaluation step; and forming an image on the recording medium using the recording head in accordance with the image data corrected in the correction step.

Another object of the present invention is to provide a method and apparatus capable of forming a higher-precision image with no distortion even when an image is formed on a mixed fabric via a plurality of image forming operations using different types of dyes.

To achieve the above object, the invention provides an image forming apparatus for forming an image on a recording medium using a recording head in accordance with image data, the apparatus comprising: conveying means for conveying the recording medium; evaluation means for evaluating the distortion of the recording medium conveyed by the conveying means; correction means for correcting the image data in accordance with the result of the evaluation made by the evaluation means; control means for controlling the image forming process such that an image is formed a plurality of times on the recording medium in accordance with the same image data, and such that at least in one of the plurality of image forming processes, the evaluation means evaluates the distortion of the recording medium and then the correction means corrects the image data and finally an image is formed in accordance with the corrected image data.

The invention also provides a method of forming an image on a recording medium using a recording head, wherein the method includes: a first image forming step in which an image is formed on the conveyed recording medium in accordance with image data; conveying the recording medium; evaluating the distortion of the recording medium conveyed; correcting the image data in accordance with the evaluation result given by the evaluation means; and a second image forming step in which an image is formed on the recording medium using the recording head in accordance with the image data corrected in the correction step.

Another object of the present invention is to provide an image forming method and apparatus capable of forming high-precision images with high-quality colors including little color shading on both sides of a recording medium having expansion/contraction properties for use in special applications in such a manner that the images formed on both sides are coincident with each other.

Still another object of the present invention is to provide an image forming method and apparatus capable of forming an image from both side of a cloth such that a sufficiently large amount of dye ink can achieve the opposite side thereby ensuring that beautiful images which are suitable in particular for handkerchiefs or scarfs can be printed on both sides.

According to an aspect of the invention, to achieve the above objects, there is provided an image forming apparatus including: first recording means disposed at a location which allows the first recording means to face the principal surface of a recording medium, the first recording means serving to form an image on the surface of the recording medium by applying a recording agent, via a recording head, to the principal surface of the recording medium; first conveying means for conveying the recording medium to the first recording means; second recording means disposed at a location which allows the second recording means to face the back surface of the recording medium, the second recording means serving to form an image on the back surface of the recording medium by applying a recording agent, via a recording head, to the back surface of the recording medium; second conveying means disposed on an extension of the conveying path of the first conveying means, the second conveying means serving to receive the recording medium from the first conveying means and convey it to the second recording means; and both-side alignment controlling means for controlling the positions where images are formed so that the image formed on the back surface of the recording medium by the second recording means becomes coincident with the image formed on the principal surface of the recording medium by the first recording means.

According to another aspect of the invention, there is provided an image forming apparatus including: conveying means for conveying a recording medium; recording means disposed such that the first recording means faces the principal surface of the recording medium conveyed by the conveying means, the first recording means serving to form an image on the principal surface of the recording medium by applying a recording agent, via a recording head, to the principal surface of the recording medium; recording medium storing means disposed on an extension of the conveying path of the conveying means, the recording medium storing means serving to temporarily store the recording medium received via the conveying means while preserving the recording starting position; recording medium turning-over/conveying means for conveying the recording medium stored in the recording medium storing means from the recording starting position such that the back surface of the recording medium faces the recording means; back surface image forming means for transmitting image data converted in a mirror-symmetric fashion in the conveying direction to the recording means; and both-side alignment controlling means for controlling the positions where images are formed so that the image formed on the back surface of the recording medium conveyed by the recording medium turning-over/conveying means becomes coincident with the image formed on the principal surface of the recording medium.

According to still another aspect of the invention, there is provided a method of forming an image on a recording medium by applying a recording agent to the recording medium, the method including: a first image forming step in which an image is formed on one surface of the recording medium by applying a recording agent in accordance with image data; a conveying step in which the recording medium on which the image has been formed in the first image forming step is conveyed; an evaluation step in which the state of the recording medium conveyed in the conveying step is evaluated; a processing step in which the image data is processed in accordance with the result of the evaluation made in the evaluation step; and a second image forming step in which in accordance with the image data processed in the processing step an image is formed on the surface opposite to the surface on which the image has been formed in the first image forming step.

According still another aspect of the invention, there is provided an image forming apparatus for forming an image on a recording medium using a recording head, the apparatus including: conveying means for conveying a recording medium; evaluation means for evaluating the state of the conveyed recording medium; processing means for processing image data to be recorded, in accordance with the result of the evaluation; and recording process controlling means for controlling the image forming process such that an image is formed by the recording head on one surface of the recording means in accordance with image data, the state of the recording medium having the image formed on the one surface thereof conveyed by the conveying means is evaluated by the evaluation means, the image data is processed by the processing means in accordance with the result of the evaluation, and an image is formed by the recording head on the surface opposite to the surface on which the image has been formed.

By employing any of the image forming apparatus and/or image forming methods described above, it becomes possible to evaluate distortion which can occur in a recording medium having expansion/contraction properties such as a cloth when the recording medium is conveyed and thus it becomes possible to form a high-precision image at a correct position on the recording medium in accordance with image data corrected depending on the distortion detected.

Thus, the present invention provides an image forming apparatus and method capable of forming a high-precision image with a guaranteed high accuracy on a coth employed as the recording medium at low cost even when the cloth is conveyed in an expanded/contracted state.

BRIEF DESCRIPTION OF THE DRAWINGS

FIGS. 9A and 9B are schematic diagrams illustrating a manner in which the distortion correcting unit corrects distortion caused by a deviation of a fourth reference point of a unit tile;

FIG. 10 is a schematic diagram illustrating a storage format of correction value parameters stored in a memory provided in a deformation parameter generator according to an embodiment of the invention;

FIGS. 21A and 21B are schematic diagrams illustrating a manner in which a distortion correcting unit corrects distortion caused by a deviation of a third reference point of a unit tile;

FIG. 22 is a schematic diagram illustrating a manner in which a distortion correcting unit corrects distortion of a cloth in a unit tile area detected by an even-number-th detection;

DESCRIPTION OF THE PREFERRED EMBODIMENTS

The present invention is described in further detail below with reference to preferred embodiments in conjunction with the accompanying drawings.

First Embodiment

Figure 1:
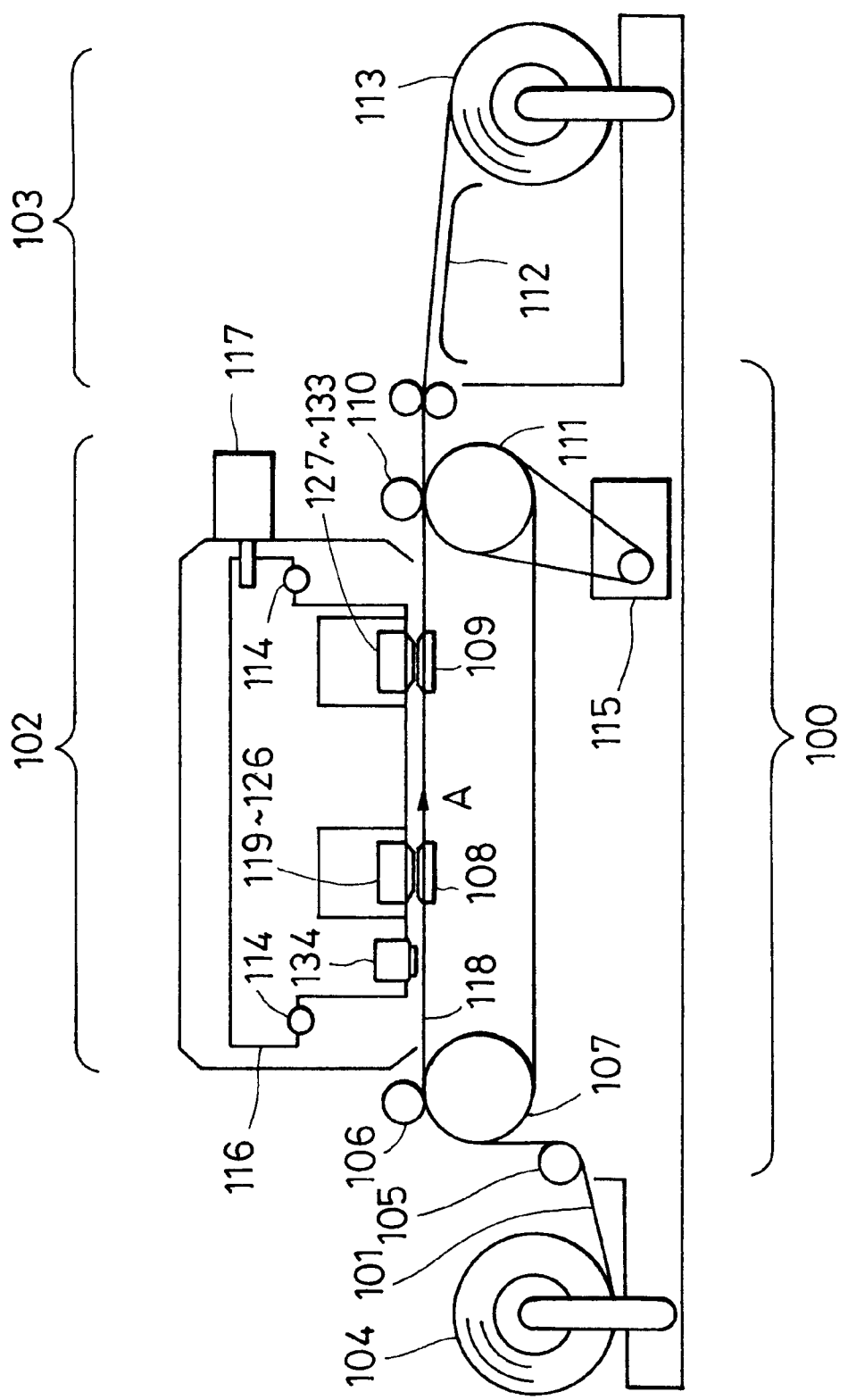
FIG. 1 is a cross-sectional view schematically illustrating the construction of an ink-jet textile printing apparatus according to an embodiment of the invention.

In this first embodiment of the invention, an ink-jet textile printing apparatus for forming an image by emitting ink is disclosed. FIG. 1 is a cross-sectional view illustrating the construction of a full-color ink-jet recording apparatus according to the first embodiment of the invention.

Herein, the "image forming" refers to a process of forming an image on a recording medium by applying a recording agent such as ink to the recording medium. In the following description, the terms "recording an image", and "printing an image" are also used to describe the same meaning as that described by "forming an image".

The ink-jet textile printing apparatus shown in FIG. 1 includes an ink-jet head of the bubble jet type having an electrothermal transducer for applying thermal energy to ink thereby emitting ink. In this printing apparatus, an image is formed by emitting ink on an on-demand basis by driving the electrothermal transducer according to image data.

As shown in FIG. 1, the ink-jet textile printing apparatus includes a conveying unit 100 for conveying a cloth 101 serving as a recording medium, a printer unit 102 for recording an image, a wind-up unit 103 for winding up the recording medium 101 on which the image has been printed, a feed roller 104 around which the recording medium 101 is wound, presser rollers 105 and 106, a driving roller 107, platens 108 and 109 for allowing the printing section to be maintained flat, a presser roller 110, a driving roller 111, a drying unit 112, a wind-up roller 113, a supporting rod 114 on which the carriage unit 116 is placed and held thereon, and an electric motor 117 for driving the carriage unit in a main scanning direction. The driving rollers 107 and 111 are driven by a conveying motor 115. A conveying belt 118 is stretched between the driving rollers 107 and 111 across the scanning area of the carriage unit 116. An adhesive is coated on the outer surface of the conveying belt 118 so that the recording medium 101 is held on the conveying belt 118 by means of adhesive and frictional forces and thus the recording medium 101 is conveyed in a direction denoted by an arrow A in FIG. 1 when the above-described rollers are driven by a conveying motor 115.

The carriage unit 116 is moved by a carriage motor 117 in a horizontal direction along the supporting rod 114. The carriage unit 116 includes ink-jet heads 119–133 for forming an image. Of these, ink-jet heads 119–126 are disposed on the upstream side of the conveying path of the recording medium 101. That is, those ink-jet heads 119–126 are located near the feed roller 104. The ink-jet head 119 serves as a first magenta head having a plurality of emission orifices for emitting magenta ink (other heads described below also have similar orifices). The ink-jet head 120 serves as a first yellow head for emitting yellow ink. The ink-jet head 121 serves as a first orange head for emitting orange ink. The ink-jet head 122 serves as a second light-magenta head for emitting a light-magenta ink. The ink-jet head 123 serves as a first cyan head for emitting cyan ink. The ink-jet head 124 serves as a first light-cyan head for emitting light-cyan ink. The ink-jet head 125 serves as a first blue head for emitting blue ink. The ink-jet head 126 serves as a first black head for emitting black ink.

On the other hand, ink-jet heads 127–133 are disposed on the downstream side of the conveying path of the recording medium 101 so that they form an image following the image formed by the ink-jet heads 119–126. The ink-jet heads 127–133 are spaced apart from the ink-jet heads 119–126 on the upstream side by a distance half the width which is scanned at a time by the carriage unit 116 (such a width is referred to as a band width). Of these heads, the ink-jet head 127 serves as a second magenta head for emitting magenta ink, the ink-jet head 128 serves as a second yellow head for emitting yellow ink, the ink-jet head 129 serves as a second orange head for emitting orange ink, the ink-jet head 130 serves as a second light-magenta head for emitting a light-magenta ink, the ink-jet head 131 serves as a second cyan head for emitting cyan ink, the ink-jet head 132 serves as a second light-cyan head for emitting a light-cyan ink, the ink-jet head 132 serves as a second blue head for emitting blue ink, and the ink-jet head 133 serves as a second black head for emitting black ink.

An optical line sensor 134 is mounted on the carriage unit 116 thereby detecting the position of yarn on the platen 101 wherein the yarn has been dyed with an invisible-color dye and woven into the recording medium 101 in advance. The recording medium will be described in further detail later.

Figure 2:
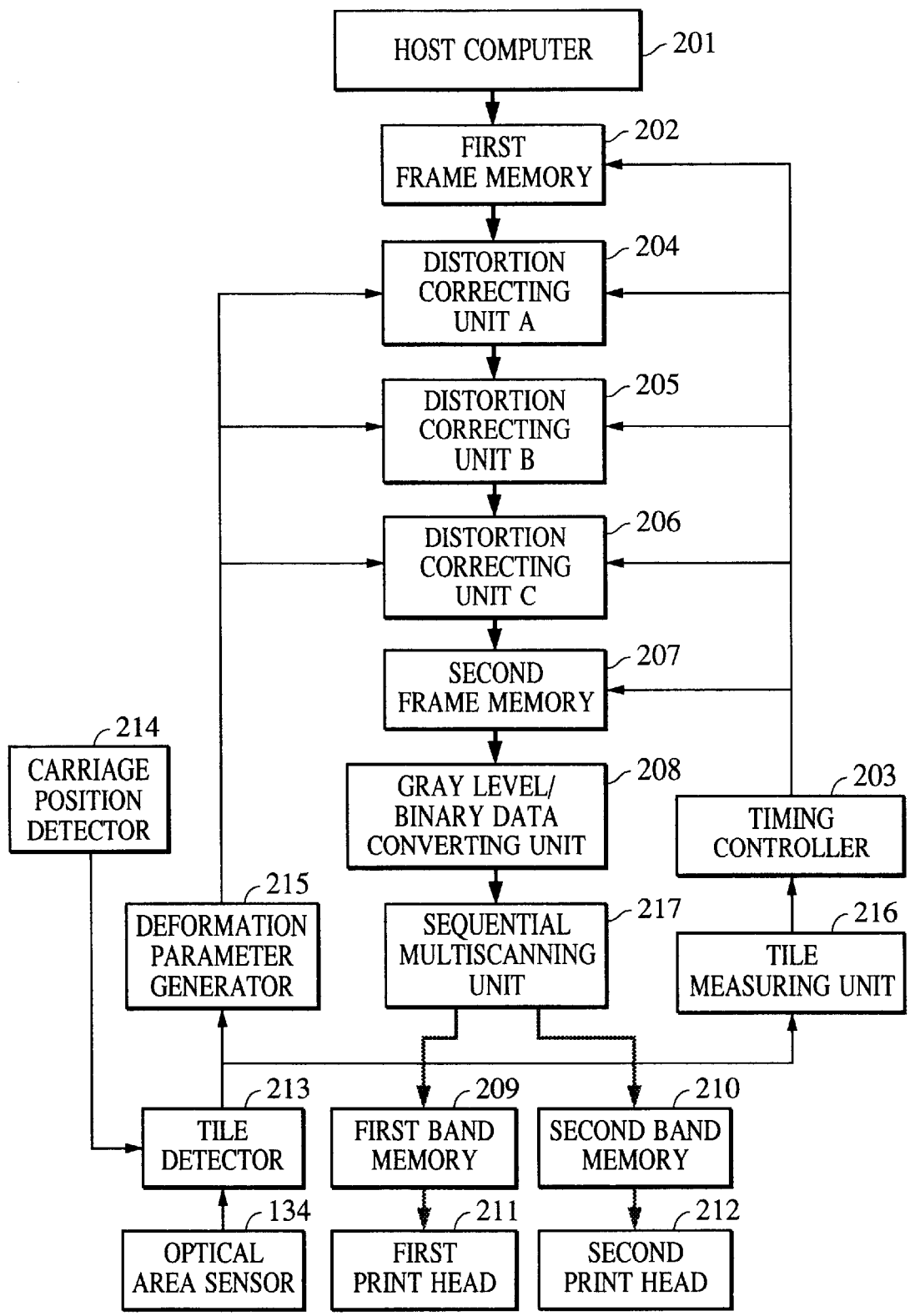
FIG. 2 is a block diagram illustrating a process performed on image data by the ink-jet textile printing apparatus shown in FIG. 1.

FIG. 2 is a block diagram illustrating the printing operation performed by the ink-jet printer shown in FIG. 1. Reference numeral 201 denotes a host computer responsible for controlling the ink-jet textile printing system. When printing image data is received from the host computer 201 via a GPIB (General Purpose Interface Bus) interface, the received data is temporarily stored in a first frame memory 202. In response to a print start command issued by the host computer 201, a timing controller 203 sequentially reads printing image data by an amount corresponding to one main scanning length at a time from a first frame memory 202 to a sequential multiscanning unit 217 via distortion correcting units (204, 205, 206), a memory 207, and a multilevel/bilevel converter 208. The sequential multiscanning unit 217 divides the printing image data received from the first frame memory 202 into two parts and sends them to the first band memory 209 and the second band memory 210, respectively. The image data stored in the first band memory 209 and that stored in the second band memory 210 are read according to a one-way or two-way printing sequence and recorded via the first print head 211 and the second print head 212, respectively.

Figure 3:
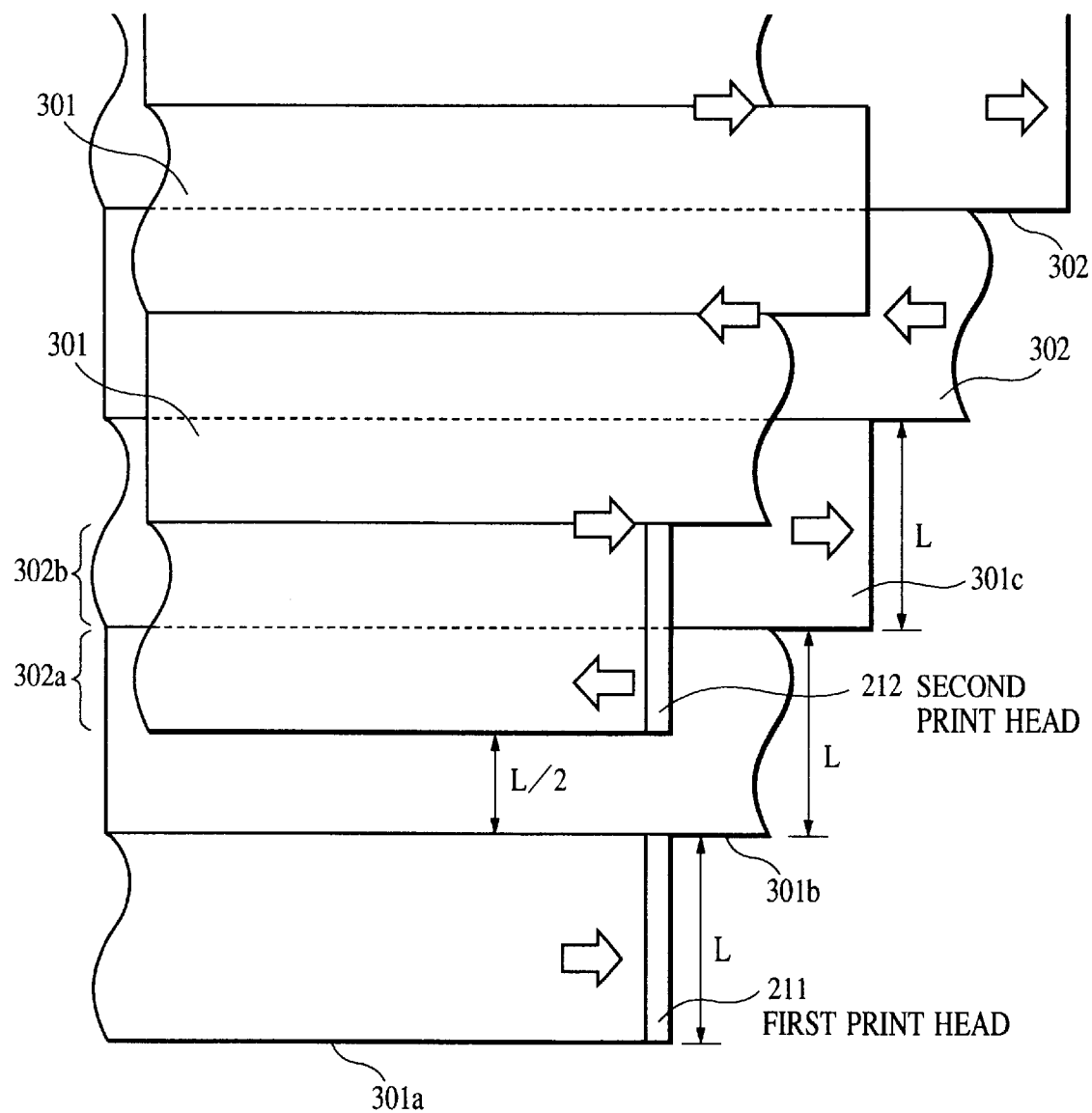
FIG. 3 is a schematic diagram illustrating a sequential multiscanning recording method using the ink-jet textile printing apparatus shown in FIG. 1.

FIG. 3 illustrates the printing operation performed by the printer unit 102 of the ink-jet textile printing apparatus shown in FIGS. 1 and 2.

The first print head 211 connected to the first band memory 209 is disposed on the upstream side of the conveying path along which the recording medium 101 is conveyed in the Y direction so that the first pint head 211 serves to perform a first printing operation on the recording medium 101.

This printing operation is performed in accordance with recording data which has been supplied from the multiscanning unit 217 and now is stored in the first band memory 209. During a scanning process in a forward direction Xa, an image is recorded on the recording medium 101 using all emission orifices of the first print head 211. The recording medium 101 is then moved by a predetermined distance corresponding to the width of the emission orifice array of the print head so that the area 301a in which the image has been formed in the scanning process in the forward direction Xa becomes an area 301b where an image will be formed by the second print head 212. The second print head 212 prints the image in this area 301b according to the remaining recording data which has been supplied from the multiscanning unit and now is stored in the second band memory 210. As described above, the first print head 211 and the second print head 212 are spaced from each other such that the recording positions thereof are shifted from each other by a distance half the width L of the emission orifice array. Therefore, in a scanning operation in a backward scanning direction Xb, the second print head 212 records an image using a half number of emission orifices located on the upstream side such that the image is recorded in the area 302b corresponding to a half area, on the upstream side, of the area 301b which has already been subjected to the recording process by the first print head 211.

The recording medium 101 is then moved by a distance corresponding to the emission orifice array width L so that the above-described area 301b of the recording medium 101 becomes an area 301c. The second print head 212 records an image using the remaining half number of emission orifices located on the downstream side such that the resultant image is recorded in the area 301b corresponding to a half area, on the downstream side, of the area 301c which has already been subjected to the recording process by the first print head 211. The area in which the image is recorded by the first print head 211 and the second print head in the above-described manner is denoted by reference numeral 302.

As described above, the present embodiment employs the multiscanning recording method in which the respective lines in the area 302 are formed with ink emitted from different emission orifices of the first and second print heads 211 and 212. That is, the recording data is divided into two parts, which are supplied to the first and second print heads 211 and 212, respectively. The first and second print heads 211 and 212 print images according to the received recording data in different areas using emission orifices located in a half area on the upstream side and in a half area located on the downstream side, respective, thereby scattering the intensity nonuniformity or a undesirable line-shaped pattern due to variations in emission orifice diameter and emission direction of the ink-jet head.

Figure 4:
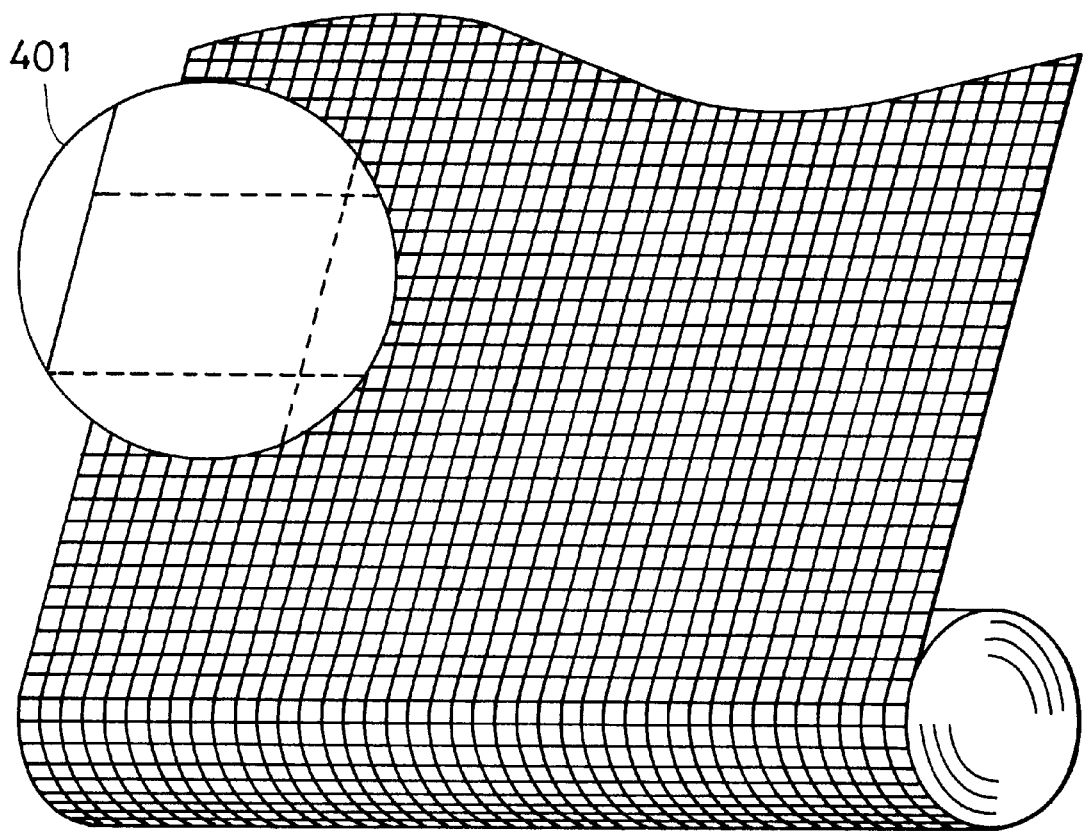
FIG. 4 is a schematic diagram illustrating tile-shaped boundary lines formed by weaving yarn dyed with invisible-color ink into a cloth.

FIG. 4 illustrates boundary lines formed in the shape of tiles (lattice) by weaving yarn dyed with invisible ink into the cloth employed as the recording medium before performing the printing operation with the ink-jet textile printing apparatus shown in FIGS. 1 and 2.

In FIG. 4, some boundary lines are shown in a circle 401 in an enlarged fashion. The tile-shaped boundary lines are formed using an invisible dye so that they are invisible to human eyes but they can be detected using special light such as ultraviolet light thereby ensuring that the tile-shaped boundary lines do not interfere with the image printed by the ink-jet textile printing apparatus. If the invisible dye is of the type which does not color the cloth and which can be removed in a step after completion of the printing step, then it becomes possible to prevent the printed image from having a change in color caused by aging.

The boundary lines are needed to be formed at least on the surface of the cloth employed as the recording medium.

Figure 5:
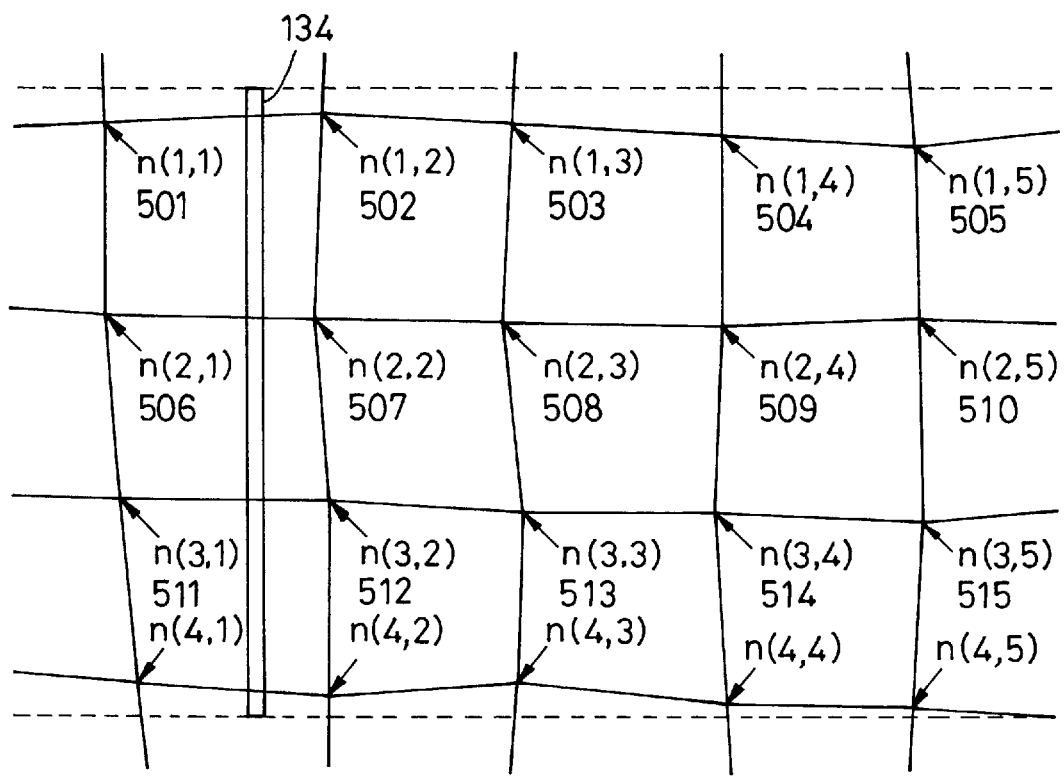
FIG. 5 is a schematic diagram illustrating tile-shaped boundary lines formed on a cloth employed as a recording medium stuck to the conveying belt of the ink-jet textile printing apparatus shown in FIG. 1 wherein a manner of detecting the boundary lines using an optical line sensor is also shown.

FIG. 5 is a schematic diagram illustrating tile-shaped boundary lines formed on a cloth employed as a recording medium stuck to the conveying belt 118 and also illustrating a manner of detecting the boundary lines using an optical line sensor 134.

The optical line sensor 134 is mounted on the carriage unit 116 such that the optical line sensor 134 faces the surface of the recording medium. The optical line sensor 134 detects the tile-shaped boundary lines when the carriage unit 116 moves in the forward and backward main scanning directions. On the basis of the detected boundary lines, the tile detector 213 determines the positions, in the conveying direction, of intersection points 501–515 among the tile-shaped boundary lines. On the other hand, the positions of the intersection points in the main scanning direction are determined by the carriage position detector 214.

Figure 6:
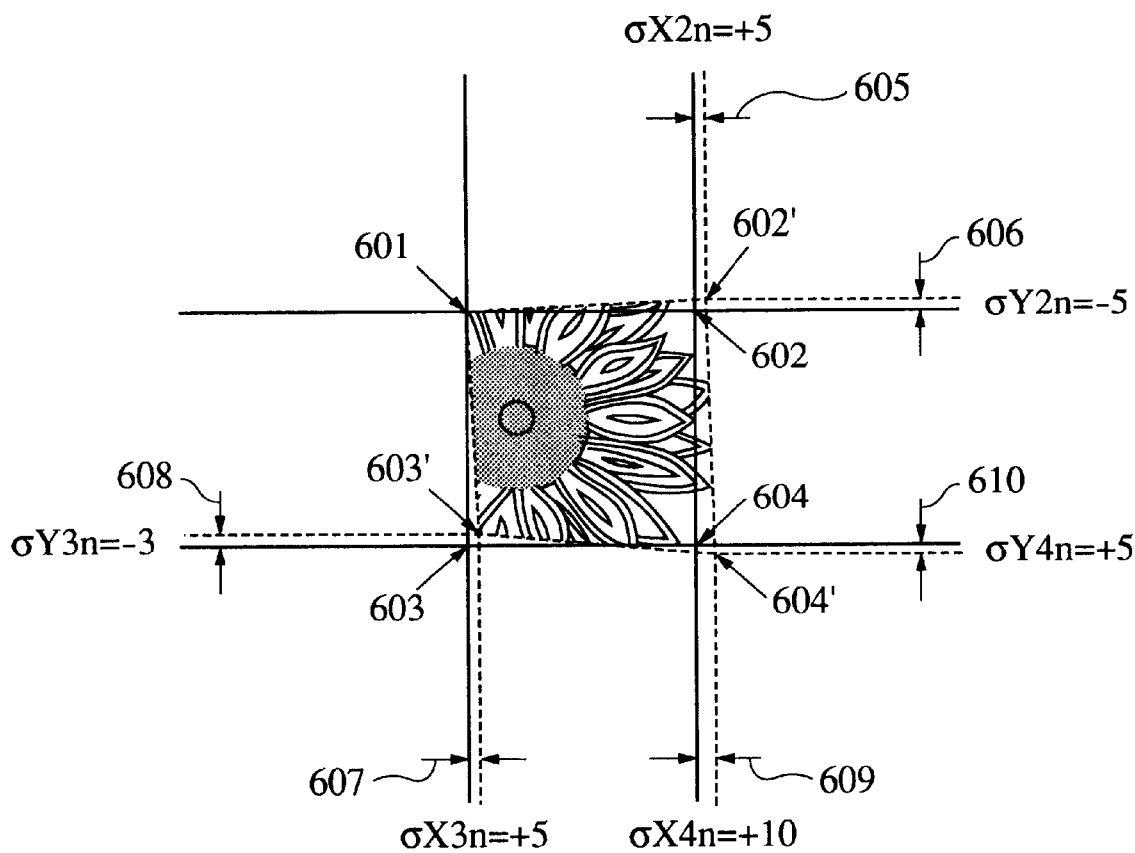
FIG. 6 is a schematic diagram illustrating a manner in which distortion of a cloth employed as a recording medium of the ink-jet textile printing apparatus is corrected.

FIG. 6 is a schematic diagram illustrating a manner of correcting distortion of a cloth employed as a recording medium 101 which occurs when the recording medium 101 is conveyed via the conveying means 101 and stuck onto the conveying belt 118 of the ink-jet textile printing apparatus shown in FIGS. 1 and 2.

On the basis of the positions of the tile-shaped lattice points determined by the tile detector 213, the tile number counter 214 assigns a processing number (n) to a detected tile. The processing number is sent to the timing controller 203. The deformation parameter generator 215 determines the coordinates 601'–604' of the four corners of the detected tile with respect to the known coordinates 601–604 of the four corners of the ideal rectangular tile having no distortion. Furthermore, the deformation parameter generator 215 calculates the correction value parameters 605–610 indicating the deviations of reference points 602–604 with respect to the first reference point 601. The resultant correction value parameters 605–610 are stored in a memory provided in the deformation parameter generator 215 as shown in FIG. 10. Herein, the respective parameters are represented in the manner described below.

Ideal first reference point 601=P1
Detected first tile reference point 601'=P1'
Ideal second reference point 602=P2
Detected second tile reference point 602'=P2'
Correction value 605 in the main scanning direction for the second reference point=$\sigma X2n$
Correction value 606 in the secondary scanning direction for the second reference point=$\sigma Y2n$
Ideal third reference point 603=P3
Detected third tile reference point 603'=P3'
Correction value 607 in the main scanning direction for the third reference point=$\sigma X3n$
Correction value 608 in the secondary scanning direction for the third reference point=$\sigma Y3n$
Ideal fourth reference point 604=P4
Detected fourth tile reference point 604'=P4'
Correction value 609 in the main scanning direction for the fourth reference point=$\sigma X4n$
Correction value 610 in the secondary scanning direction for the fourth reference point=$\sigma Y4n$ In response to a print start command issued by the host computer 201, the timing controller 203 reads printing image data by an amount corresponding to one main scanning length from the first frame memory 202. The distortion correcting unit A (204), the distortion correction unit B (205), and the distortion correcting unit C (206) perform distortion correcting processes (1)–(3) on the basis of the coordinates of the first reference point such that the positions of all pixels within the tile area 701 read from the first frame memory 202 are corrected thereby producing a corrected tile area 801. The generated corrected tile area 801 is sequentially stored into the second frame memory 207.

The distortion caused by deviations of the respective reference points is corrected as follows.

(1) Correcting Process for the Second Reference Point (by the Distortion Correcting Unit A)

Figure 7B:
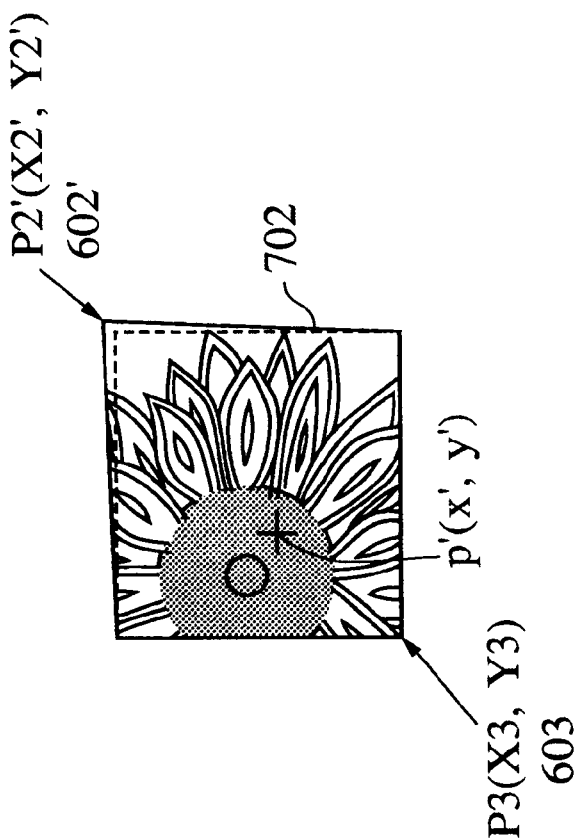
FIGS. 7A and 7B are schematic diagrams illustrating a manner in which a distortion correcting unit corrects distortion caused by a deviation of a second reference point of a unit tile.
Figure 7A:
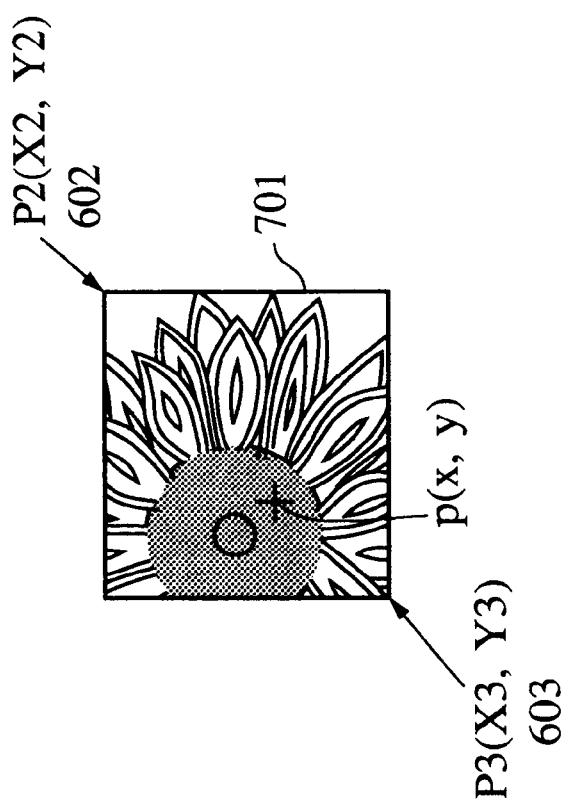

FIGS. 7A and 7B illustrate distortion due to a deviation of the second reference point. Referring to these figures, the distortion correcting process for the second reference point is described below.

With reference to the ideal tile area 701, the deviation of the second reference point 602' relative to the third reference point 603 at a diagonally opposite location is determined. The correction coefficient $\alpha 2$ in the main scanning direction and the correction coefficient $\beta 2$ in the secondary scanning direction are then calculated from the deviation, as described below.

$$\alpha 2=(X2-X3+\sigma X2n)/(X2-X3)$$

$$\beta 2=(Y2-Y3+\sigma Y2n)/(Y2-Y3)$$

In accordance with the above correction coefficients, the coordinates p(x, y) of pixels read from the first frame memory 202 are converted to corrected coordinates p'(x', y') for all pixels in the area corresponding to the ideal tile area 701, as described below.

$$x'=x\times\alpha 2$$

$$y'=x\times\beta 2$$

Thus, the corrected tile coordinate information 702 associated with the second reference point is obtained.

(2) Correcting Process for the Third Reference Point (by the Distortion Correcting Unit B)

Figures 8A, 8B:
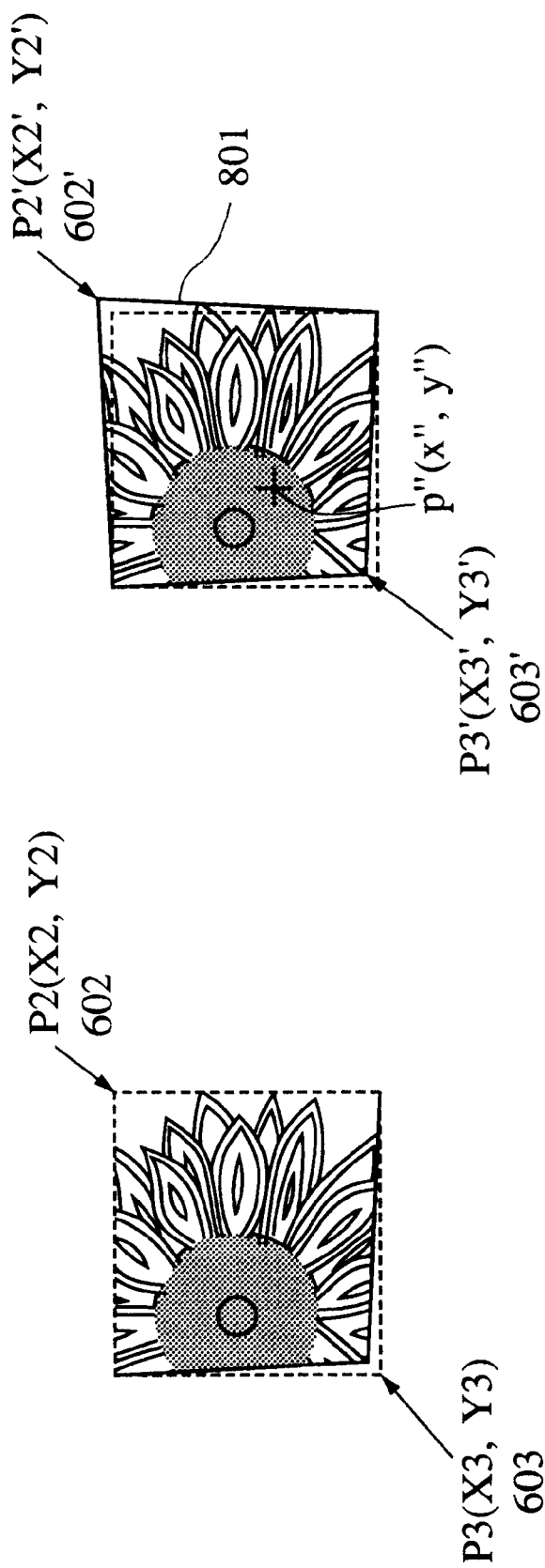
FIGS. 8A and 8B are schematic diagrams illustrating a manner in which the distortion correcting unit corrects distortion caused by a deviation of a third reference point of a unit tile.

FIGS. 8A and 8B illustrate distortion due to a deviation of the third reference point. Referring to these figures, the distortion correcting process for the third reference point is described below.

With reference to the ideal tile area 701, the deviation of the third reference point 602' relative to the second reference point 602 at a diagonally opposite location is determined. The correction coefficient α3 in the main scanning direction and the correction coefficient β3 in the secondary scanning direction are then calculated from the deviation, as described below.

$$\alpha 3=(X2-X3+\sigma X3n)/(X2-X3)$$

$$\beta 3=(Y2-Y3+\sigma Y3n)/(Y2-Y3)$$

In accordance with the above correction coefficients, all pixel coordinates p'(x', y') of the corrected tile coordinate information 702 associated with the second reference point are converted to corrected coordinates p"(x", y"), as described below.

$$x''=x'\times\alpha 3$$

$$y''=y'\times\beta 3$$

Thus, the corrected tile coordinate information 801 associated with the third reference point is obtained.

(3) Correcting Process for the Fourth Reference Point (by the Distortion Correcting Unit C)

FIGS. 9A and 9B illustrate distortion due to a deviation of the fourth reference point. Referring to these figures, the distortion correcting process for the fourth reference point is described below.

With reference to the ideal tile area 701, the deviation of the fourth reference point 604' relative to the first reference point 601 at a diagonally opposite location is determined. The correction coefficient α4 in the main scanning direction and the correction coefficient β4 in the secondary scanning direction are then calculated from the deviation, as described below.

$$\alpha 4=(X4-X1+\sigma X4n)/(X4-X1)$$

$$\beta 4=(Y4-Y1+\sigma Y4n)/(Y4-Y1)$$

In accordance with the above correction coefficients, all pixel coordinates p"(x", y") of the corrected tile coordinate information 801 associated with the third reference point are converted to corrected coordinates p'"(x'", y'"), as described below.

$$x'''=x''\times\alpha 4$$

$$y'''=y''\times\beta 4$$

Thus, the final corrected tile 901 is obtained.

Figure 11:
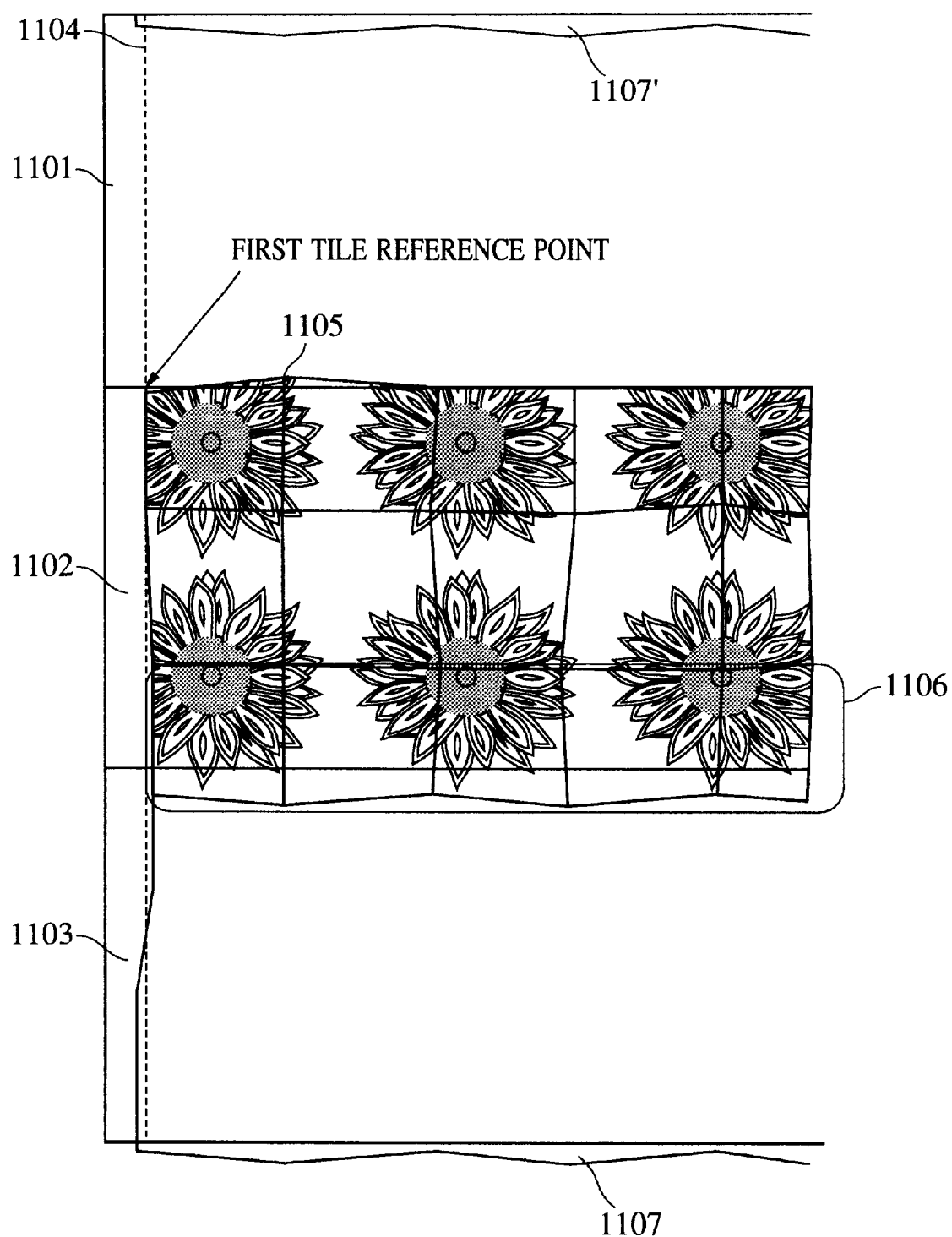
FIG. 11 is a schematic diagram illustrating a process associated with a third frame memory according to an embodiment of the invention.

FIG. 11 illustrates the process associated with the second frame memory 207 of the ink-jet textile printing apparatus shown in FIGS. 1 and 2.

Figure 12:
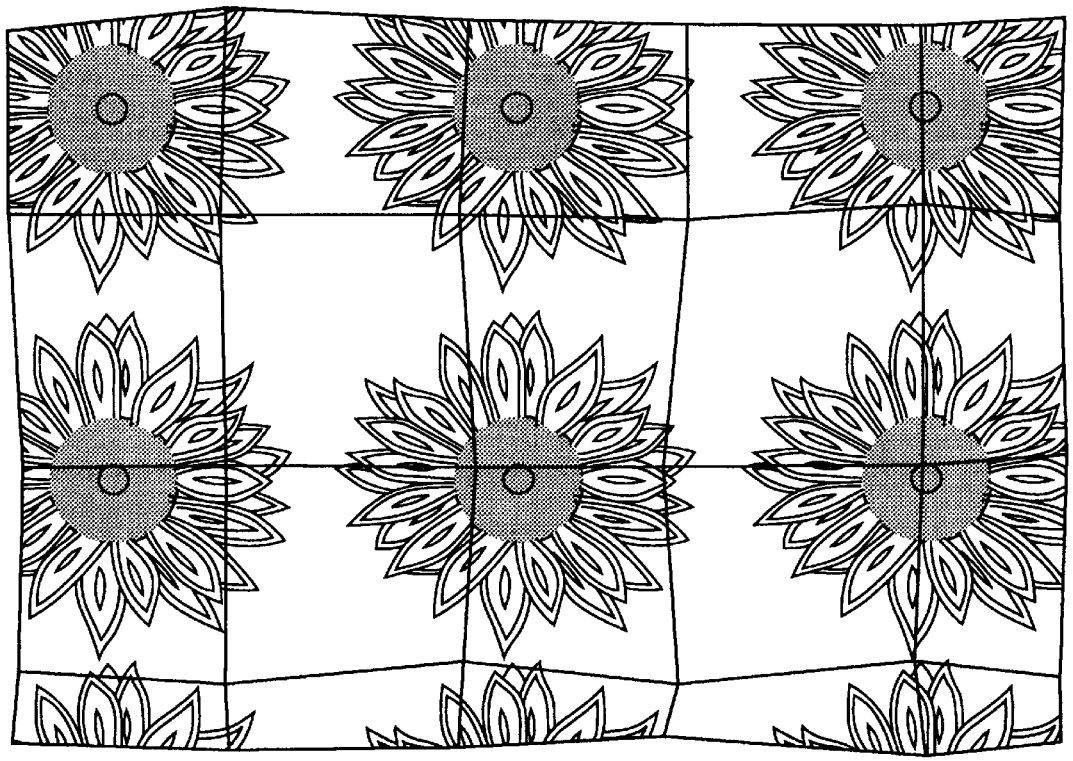
FIG. 12 is a schematic diagram illustrating an image with tile boundary lines placed in the third frame memory.

The second frame memory 207 includes an area A 1101, an area B 1102, and an area C 1103 and thus it has a capacity equal to one main scanning area×3. After a print start command is issued by the host computer 201, if the timing controller 203 detects a first tile (via the tile measuring unit 216), a corrected tile area 901 is produced by the distortion correcting unit A (204), the distortion correcting unit B (205), and the distortion correcting unit C (206). The resultant corrected tile area 901 is placed in the area B 1102 of the second frame memory 207. Similarly, other tile areas are sequentially placed in the second frame memory 207 such that the first reference point of each tile area becomes coincident with the second reference point of an immediately previous tile area thereby placing tile areas side by side in the second frame memory 207 without creating spacings (FIG. 12). In the above process, the corrected tile area 901 is placed in such a manner that its first reference point 601 is offset in the X direction by an amount denoted by 1104 so that the following corrected tile areas are prevented from being placed outside the printing area across the left edge. In the Y-direction, the first reference point 601 is located on the upper edge (on the side of the area A) of the area B 1102 so that even if a following corrected tile area 901 is shifted into the area A across the upper edge of the area B 1102 (as represented by 1105), the tile area 901 can be properly printed by starting the printing operation for the tile area 901 from a point in the area A 1101 thereby preventing a non-printed area from being created. If all tile areas have been placed along one line in the X direction until reaching the area C 1103 across the edge of the area B 1102 (as represented by 1106), the image data of the area B 1102 is sequentially read to the sequential multiscanning unit 217 via the second multilevel/bilevel converter 208. Another corrected tile area 901 is then produced by the distortion correcting unit A (204), the distortion correcting unit B (205), and the distortion correcting unit C (206) and placed in the area C 1103 of the second frame memory 207. An area 1107 extending outward across the lower edge is stored at an upper end location 1107' of the area A. If all tile areas have been placed along one line in the X direction until reaching the area A 1101, then image data of the area C 1103 is transmitted. That is, memory areas from which the image data is transmitted are switched such that A→B→C→A→B→ and so on each time image data has been transmitted along one main scanning line.

The sequential multiscanning unit 217 divides the printing image data received from the second frame memory 207 into two parts and sends them to the first band memory 209 and the second band memory 210, respectively. The first print head 211 and the second print head 212 emit ink in accordance with the image data stored in the first band memory 209 and the image data stored in the second band memory 210, respectively.

Figure 13:
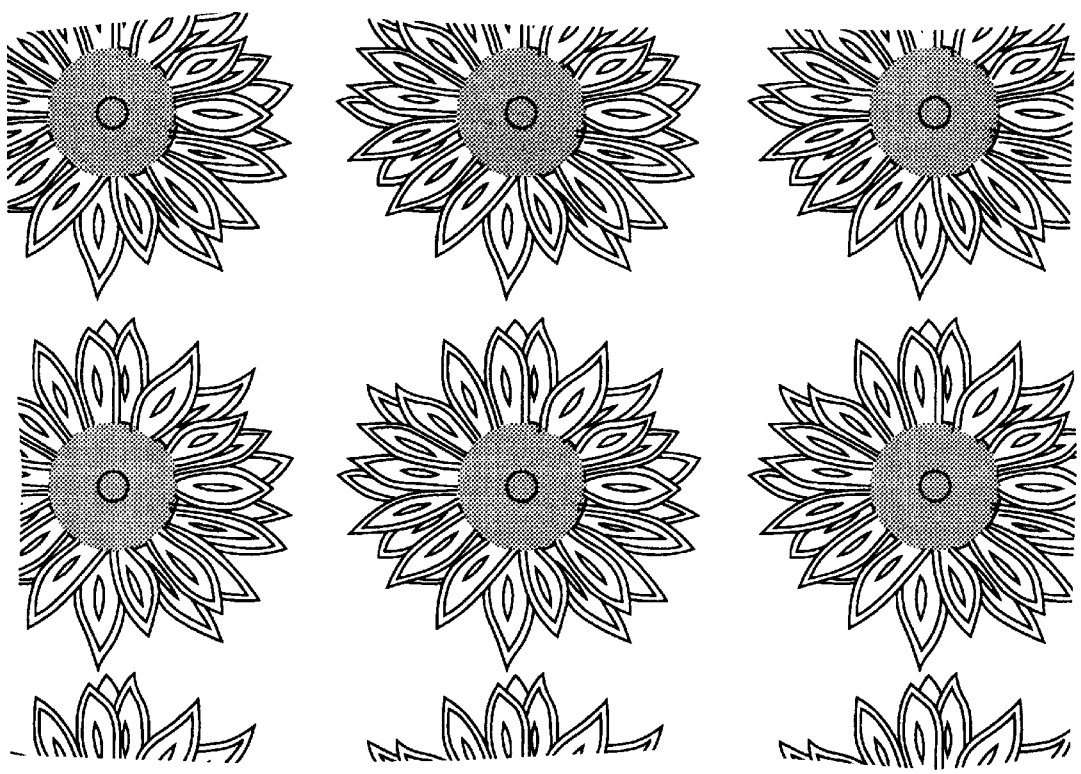
FIG. 13 is a schematic diagram illustrating a printed image obtained by correcting distortion of a cloth on which the image is printed by first and second print heads of a color ink-jet textile printing apparatus according to the present invention.
Figure 14:
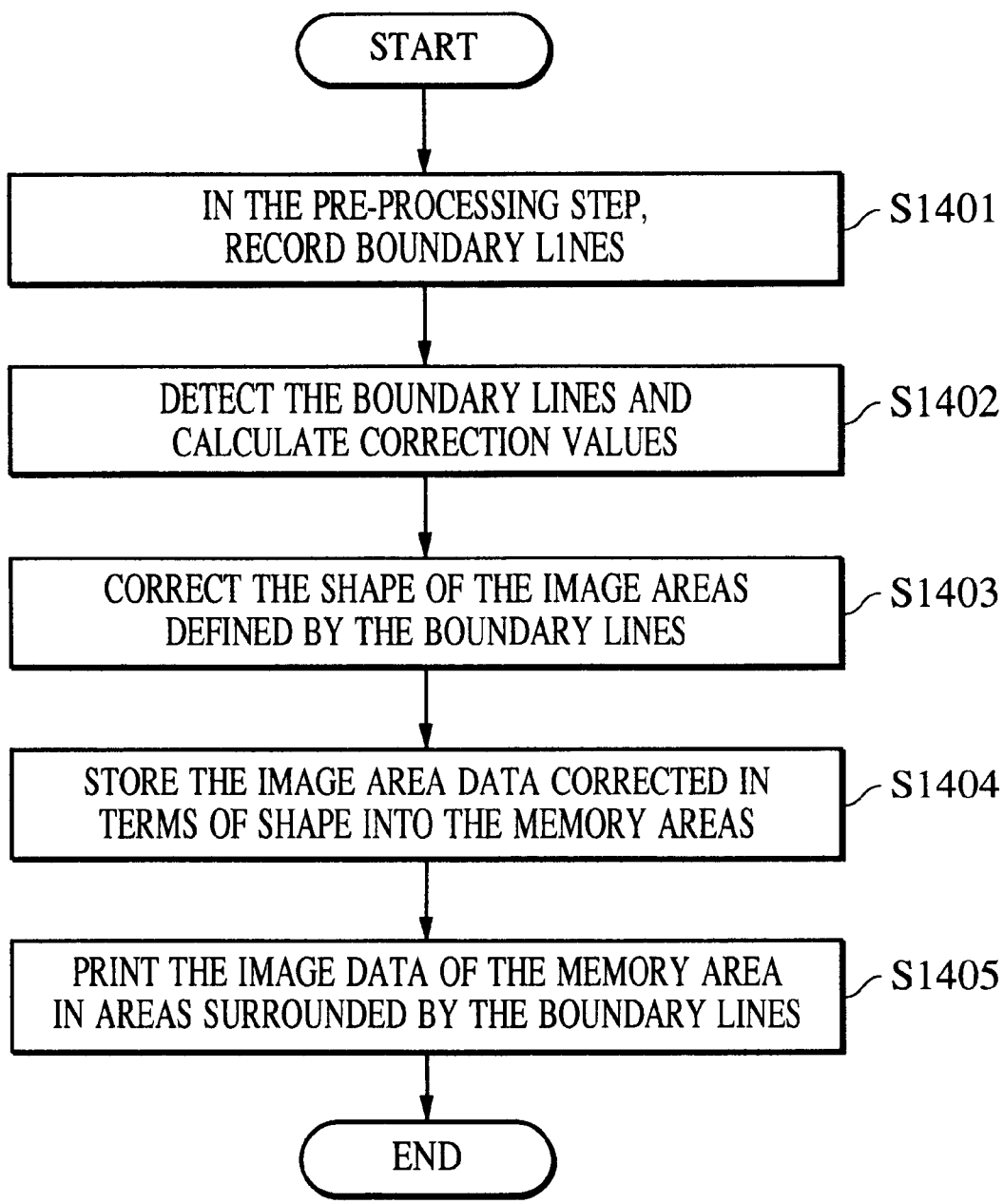
FIG. 14 is a flowchart illustrating a printing sequence according to an embodiment of the invention.

The overall sequence associated with the above-described processes is shown in the form of a flowchart in FIG. 14. FIG. 13 schematically illustrates a printed image obtained by correcting distortion of a cloth on which the image is printed by first and second print heads 211 and 212.

Referring now to the flowchart shown in FIG. 14, an image forming process according to the present embodiment is described below.

In a pre-process prior to the recording operation, rectangular-tile-shaped boundary lines are formed on the surface of a cloth as shown in FIG. 4. As described earlier, the boundary lines are formed using invisible-color ink so that they can be detected using special light such as ultraviolet light. In step S2, the boundary lines formed on the cloth are detected using an optical area sensor 134 and the correction values 605–610 are calculated from the distortion of the tile shapes. In the next step S3, the image data in the image area corresponding to the recording position is corrected in accordance with the correction values. Then in steps S4, the corrected image data is stored in a memory area of a memory along one full length of line in the main scanning direction. In step S5, an image is formed on the cloth in accordance with the corrected image data. That is, the process shown in the flowchart of FIG. 14 includes the steps of evaluating the distortion or the state of the supplied recording medium, correcting the image data in accordance with the evaluation result, and forming an image in accordance with the corrected image data.

In the present embodiment, as described above, an image is formed by the process including the steps of evaluating the distortion of a supplied recording medium by detecting boundary lines formed on the recording medium, correcting image data on the basis of the evaluation result, and forming the image according to the corrected image data, and thus it becomes possible to form the image with a correct shape at a correct position even when the position on a cloth where the image is to be formed is shifted by expansion or contraction of the cloth.

Second Embodiment

A second embodiment of the present invention is now described below in detail with reference to the accompanying drawings. In this second embodiment, the construction of the apparatus is similar to that employed in the first embodiment, and thus a duplicated description is not given here.

Figure 15:
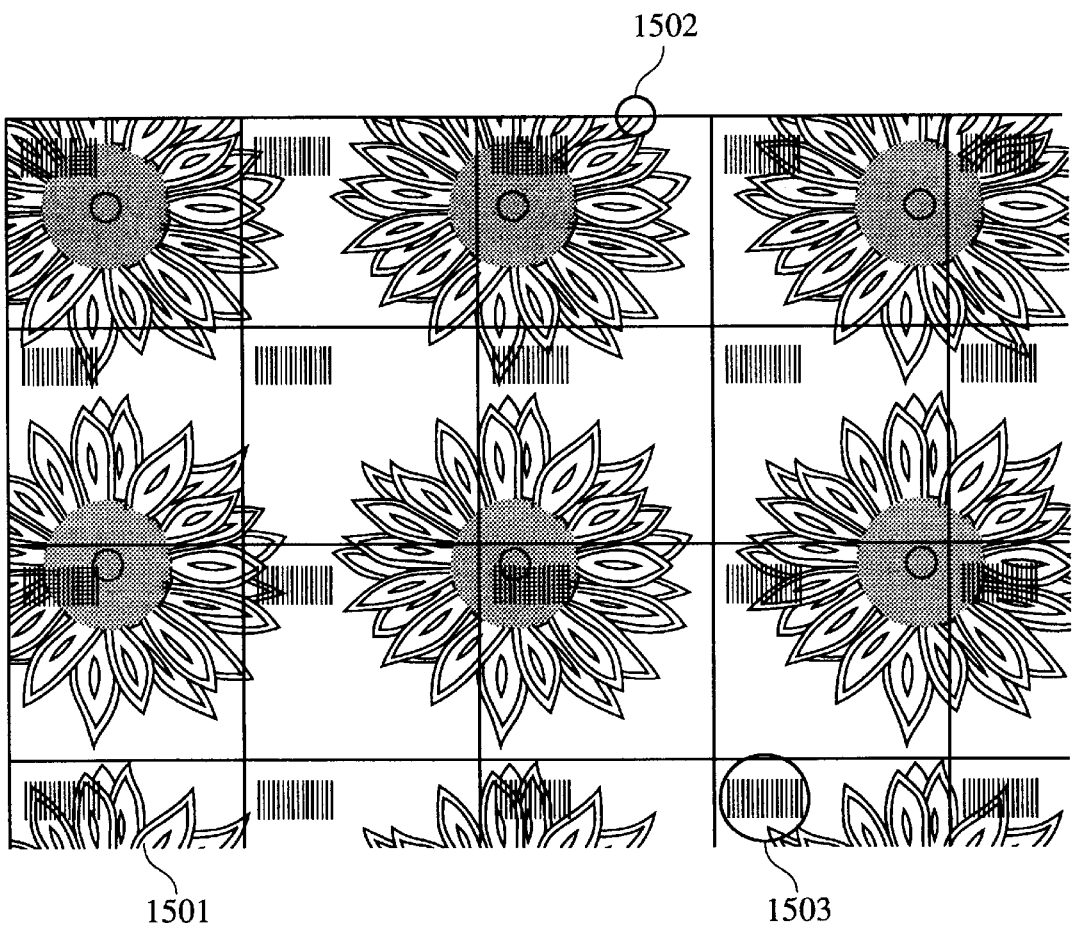
FIG. 15 is a schematic diagram illustrating an image obtained by printing image data using a full-color ink-jet textile printing apparatus such that the image data is superimposed on rectangular boundary lines formed with yarn dyed with invisible-color ink and also superimposed on tile information printed in a previous step using invisible-color ink.

FIG. 15 is a schematic diagram illustrating an image printed on a recording medium using a full-color ink-jet textile printing apparatus according to the second embodiment, wherein the recording medium has tile-shaped boundary lines 1502 formed in advance with invisible-color ink and wherein tile information 1053 is superimposed on the image data 1501.

In this embodiment, information 1602 in the form of a bar code or the like is recorded in respective areas defined by frames formed by the tile-shaped boundary lines and the information 1602 is detected using an optical area sensor 134 so as to detect the absolute positions of the respective tiles on the recording medium. Even if the count information of the tile number counter 213 is lost when the apparatus is shut down because of an unpredictable cause, it is possible to correctly adjust the image locations using the bar-code information when the printing operation is restarted. This makes it possible to increase the operating ratio of the apparatus. As a result, it becomes possible to reduce the production cost.

Third Embodiment

A third embodiment of the present invention is described below in detail with reference to the accompanying drawings.

Figure 16:
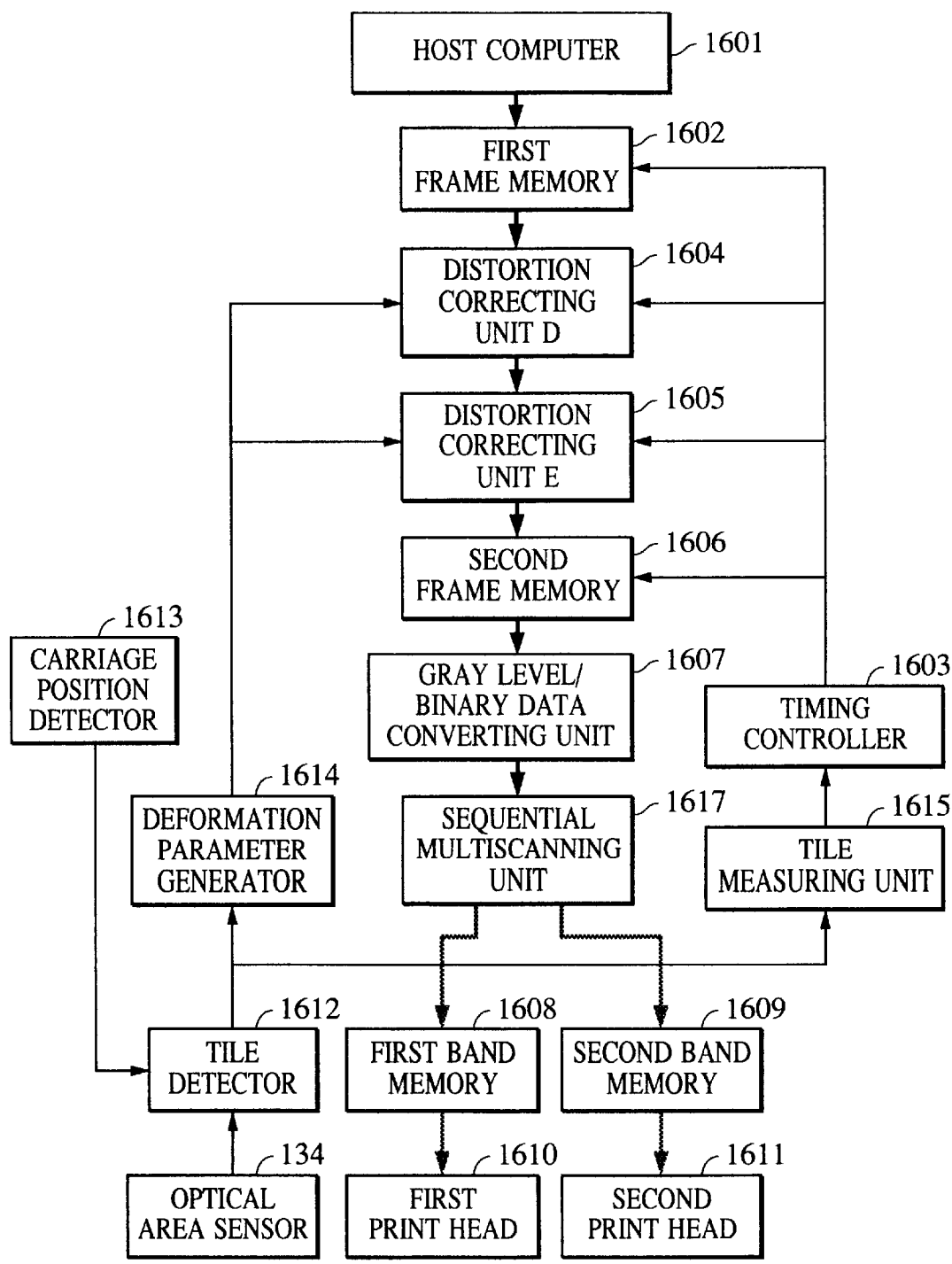
FIG. 16 is a block diagram illustrating a process performed on image data by a color ink-jet textile printing apparatus.
Figure 17:
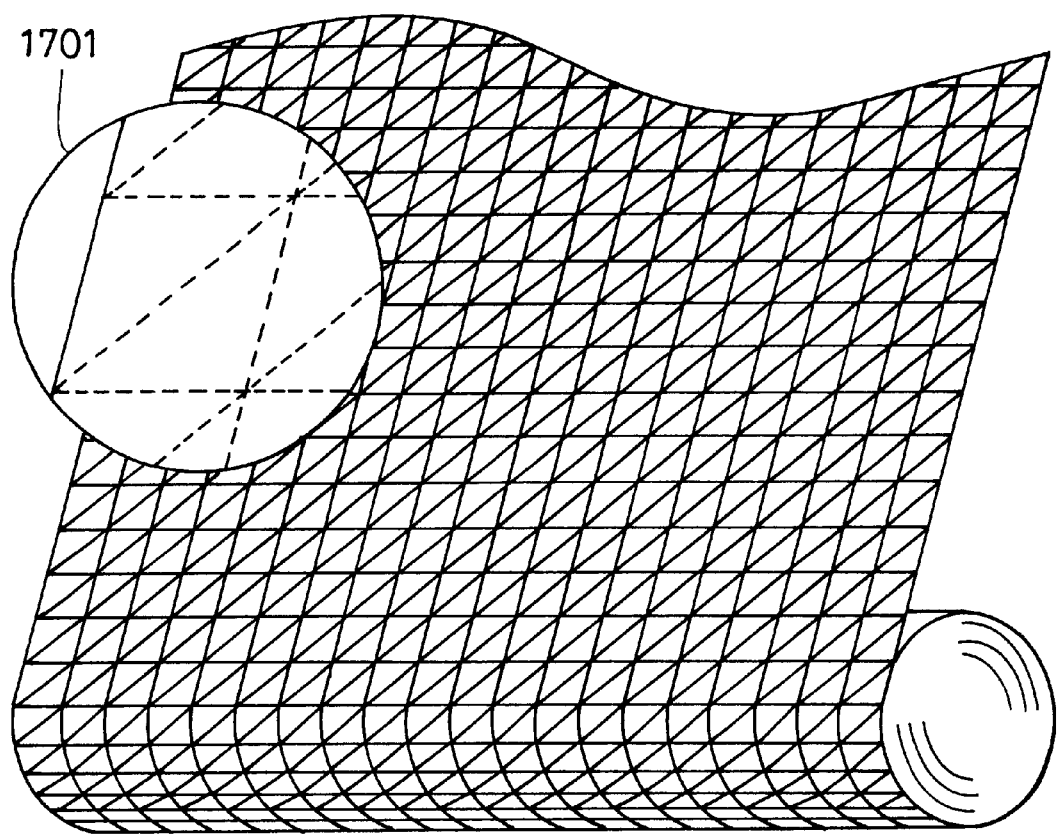
FIG. 17 is a schematic diagram illustrating tile-shaped boundary lines formed by weaving yarn dyed with invisible-color ink into a cloth.

FIG. 16 is a block diagram illustrating the printing operation of an ink-jet printer according to the third embodiment of the invention. In this third embodiment, as shown in FIG. 17, before starting the printing operation using the ink-jet textile ink-jet printing apparatus, tile-shaped boundary lines are formed on a cloth employed as the recording medium by weaving yarn dyed with invisible ink into the cloth. In FIG. 17, in order to illustrate the boundary lines in detail, a part of the cloth is shown in an enlarged fashion in a circle 1701.

Figure 18:
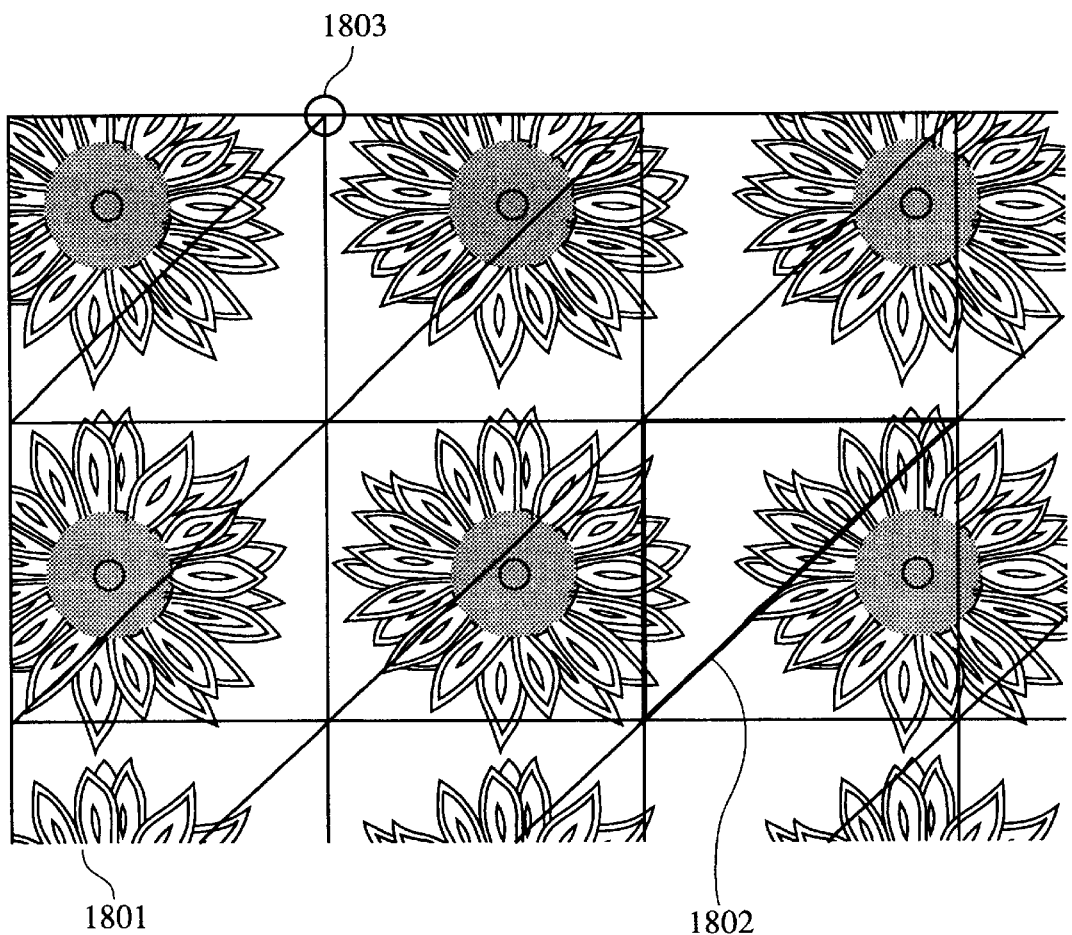
FIG. 18 is a schematic diagram illustrating a manner in which image data to be printed is divided into triangular-shaped tile areas.

FIG. 18 is a schematic diagram illustrating a manner in which image data 1801 to be printed by the ink-jet textile printing apparatus is divided into triangular-shaped tile areas. In this embodiment, the construction of the textile printing apparatus is similar to that shown in FIG. 1 employed in the first embodiment.

In response to a print start command issued by the host computer 1601, the timing controller 1603 according to the third embodiment reads printing image data by an amount corresponding to one full length of line along the main scanning direction from the first frame memory 1602.

Figure 19:
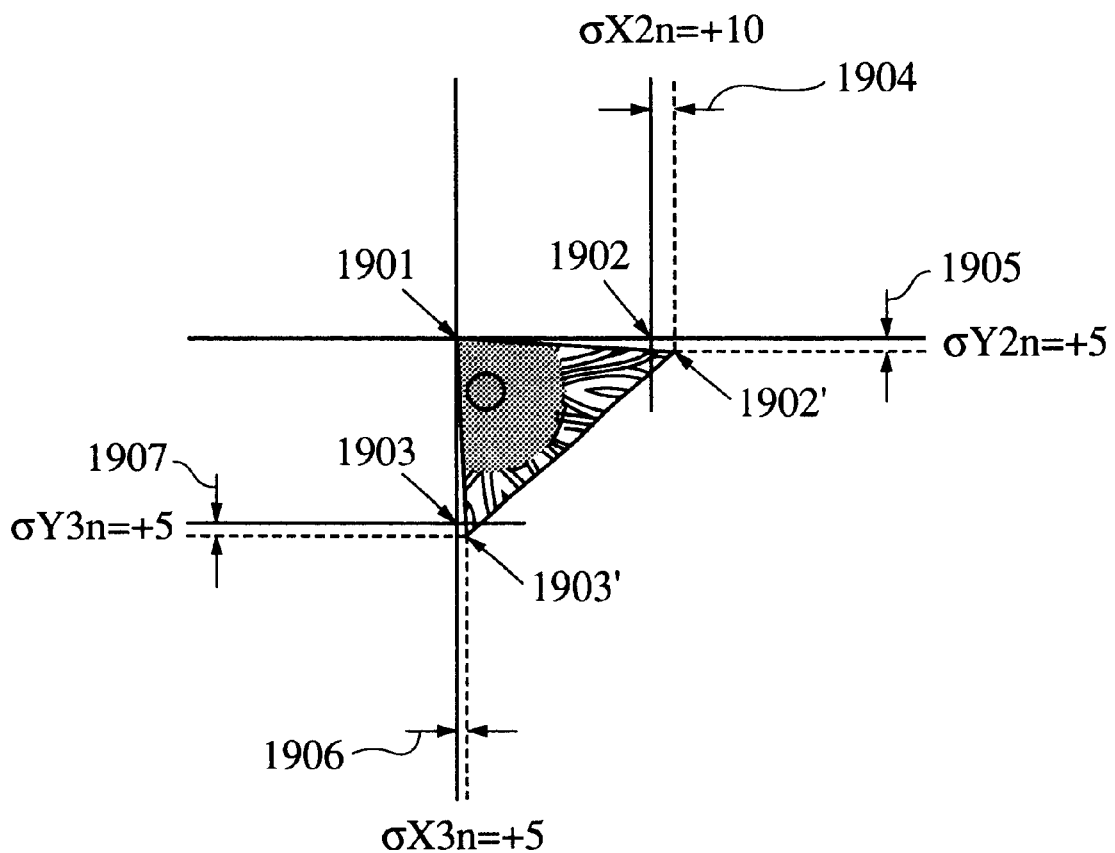
FIG. 19 is a schematic diagram illustrating a manner of correcting distortion of a cloth employed as the recording medium.

FIG. 19 illustrates the manner of correcting distortion of a cloth which occurs when the recording medium or the cloth 101 supplied via the conveying means 101 is stuck onto the platen 118 of the ink-jet textile printing apparatus, according to the present embodiment.

The tile number counter 1615 assigns a process number (n) to a given tile in accordance with the lattice position of the tile detected by the tile detector 1612. The resultant process number (n) is sent to the timing controller 1603. The deformation parameter generator 1614 determines the actual coordinates 1901'–1903' of three corners of the tile with respect to the predetermined ideal coordinates 1901–1903 of three corners of the triangular tile which would be obtained if there were no distortion. The deformation parameter generator 1614 then calculates the correction parameters 1905–610 indicating the deviations of reference points 1902 and 1903 with respect to the coordinates of the first reference point 1901. The calculated correction parameters are stored in a memory provided in the deformation parameter generator 1614. Herein, the respective parameters are:

Ideal first reference point 1901=P1
Detected first reference point 1901'=P1'
Ideal second reference point 1902=P2
Detected second reference point 601'=P1'
Correction value 1904 in the main scanning direction for the second reference point=σX2n
Correction value 1905 in the secondary scanning direction for the second reference point=σY2n
Ideal third reference point 1903=P3
Detected third tile reference point 1903'=P3'
Correction value 1906 in the main scanning direction for the third reference point=σX3n
Correction value 1907 in the secondary scanning direction for the third reference point=σY3n In the following distortion correcting processes (1) and (2), as described below, the distortion correcting units (1604, 1605) correct the pixel positions with respect to the coordinates of the first reference point for all pixels within the tile area 2001 read from the first frame memory 1711 thereby producing a corrected tile area 2101.

Figure 20A:
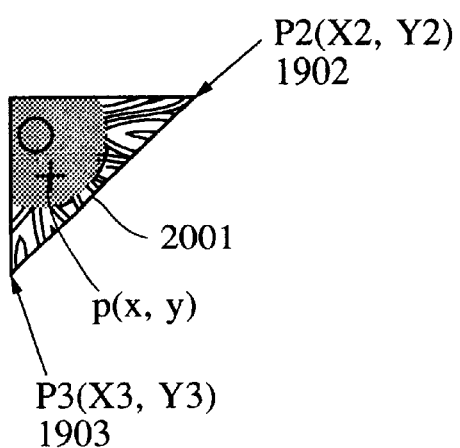
FIGS. 20A and 20B are schematic diagrams illustrating a manner in which a distortion correcting unit corrects distortion caused by a deviation of a second reference point of a unit tile.
Figure 20B:
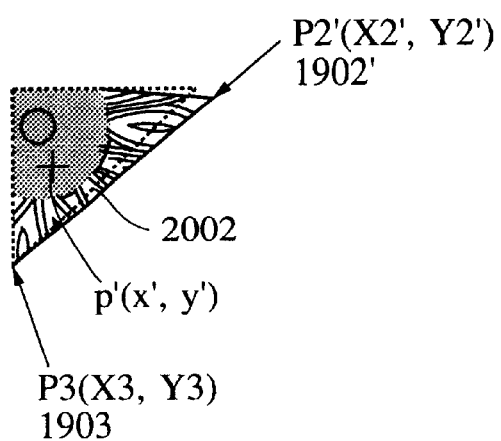

(1) Correcting Process for the Second Reference Point (by the Distortion Correcting Unit D) FIGS. 20A and 20B illustrate the manner of correcting the distortion due to the deviation of the second reference point.

With reference to the ideal tile shape information 2001, the deviation of the second reference point 1902' relative to the third reference point 1903 is determined. The correction coefficient α4 in the main scanning direction and the correction coefficient β4 in the secondary scanning direction are then calculated from the deviation, as described below.

$$\alpha 4=(X2-X3+\sigma X2n)/(X2-X3)$$

$$\beta 4=(Y2-Y3+\sigma Y2n)/(Y2-Y3)$$

In accordance with the above correction coefficients, the coordinates p(x, y) of all pixels within the ideal tile-shaped area 2001 are converted to corrected coordinates p'(x', y'), as described below.

$$x' = x \times \alpha 4$$

$$y' = y \times \beta 4$$

Thus, the corrected tile coordinate information 2002 associated with the second reference point is obtained.

(2) Correcting Process for the Third Reference Point (by the Distortion Correcting Unit E)

FIGS. 21A and 21B illustrate the manner of correcting the distortion due to the deviation of the third reference point.

With reference to the ideal tile shape information 2001, the correction coefficient α5 in the main scanning direction and the correction coefficient β5 in the secondary scanning direction are calculated from the deviation of the third reference point 1903' relative to the second reference point 1901, as described below.

$$\alpha 5 = (X2-X3+\sigma X3n)/(X2-X3)$$

$$\beta 5 = (Y2-Y3+\sigma Y3n)/(Y2-Y3)$$

In accordance with the above correction coefficients, all pixel coordinates p'(x', y') of the corrected tile coordinate information 2002 associated with the second reference point are converted to corrected coordinates p"(x", y"), as described below.

$$x'' = x' \times \alpha 5$$

$$y'' = y' \times \beta 5$$

Thus, the corrected tile coordinate information 2101 associated with the third reference point is obtained.

FIG. 22 illustrates the manner of correcting the cloth distortion in a unit tile area obtained by an even-number-th detection. Reference numeral 2201 denotes the first reference point of a tile obtained by an even-number-th detection, 2202 denotes the second reference point of the detected tile, and 2203 denotes the third reference point of the detected tile. The distortion is corrected in a similar manner to those detected in odd-number-th unit tile areas.

Figure 23:
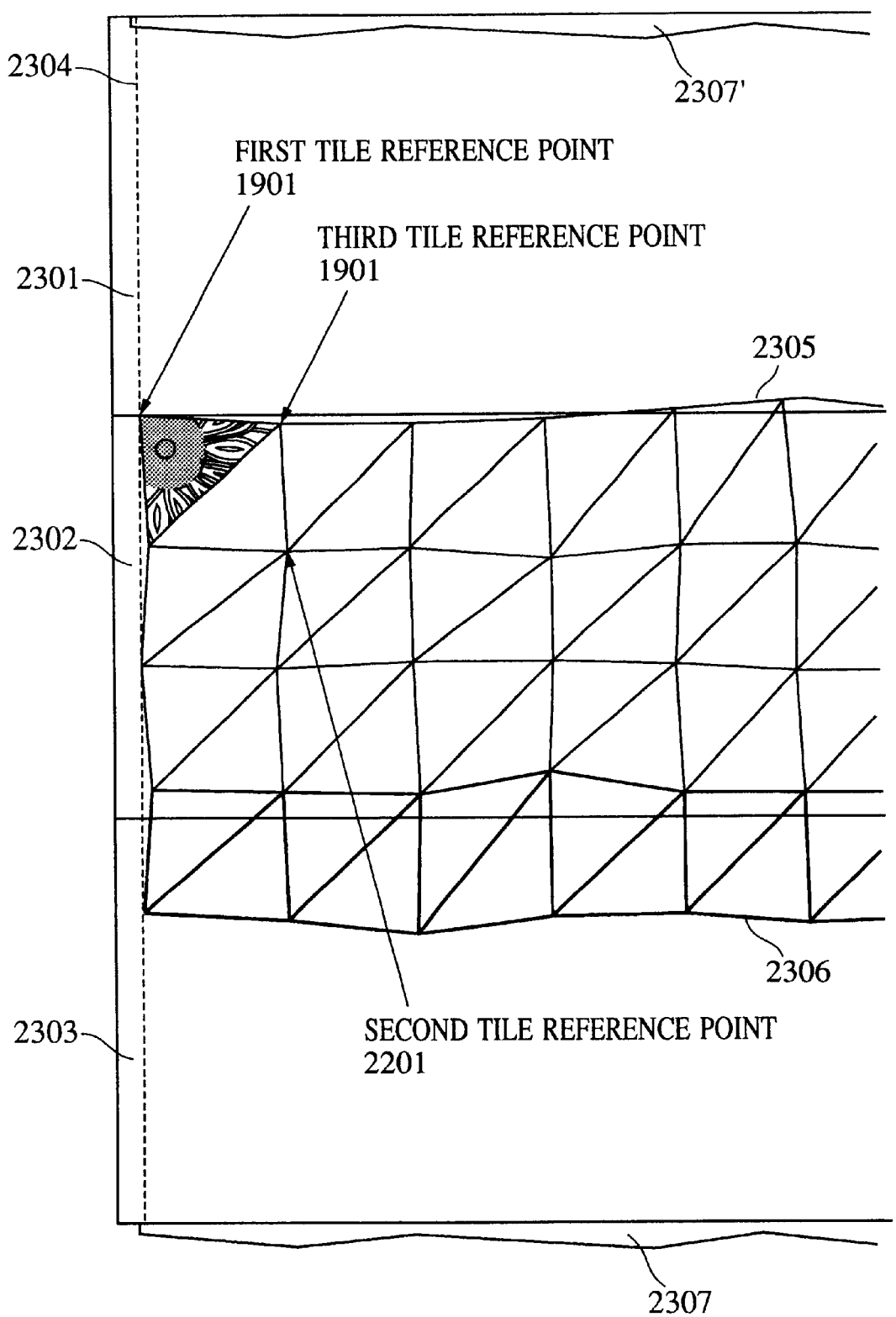
FIG. 23 is a schematic diagram illustrating a process associated with a third frame memory.

FIG. 23 illustrates the process performed on the second frame memory 1606 by the ink-jet textile printing apparatus according to the third embodiment.

The second frame memory 1616 includes the area A 2301, the area B 2302, and the area C 2303, and thus it has a capacity equal to one main scanning area×3. After a print start command is issued by the host computer 201, if the double-side alignment controller 1603 detects a first tile (via the tile measuring unit 1615), a corrected tile area 2101 is produced by the distortion correcting units (1604, 1605). The resultant corrected tile area 2101 is placed in the area B 2302 of the second frame memory 1606. In the above process, the corrected tile area 2101 is placed in such a manner that its first reference point 1901 is offset in the X direction by an amount denoted by 2304 so that the following corrected tile areas are prevented from being placed outside the printing area across the left edge. In the Y-direction, the first reference point 1901 is located on the upper edge (on the side of the area A) of the area B 2302 so that even if a following corrected tile area 2301 is shifted into the area A across the upper edge of the area B 2302 (as represented by 2305), the corrected tile area can be perfectly printed without creating a non-printed area.

Following tile areas are sequentially placed in the second frame memory 1606, at locations close to each other as described below.

(1) Unit Tile Areas Detected in Even-number-th Detections

A vertex of a triangle opposing a triangular tile area detected in an immediately previous detection is employed as a reference point.

(2) Unit Tile Areas Detected in Odd-number-th Detections

The position of the second reference point of a triangular tile area detected in an immediately previous detection is employed as a reference point.

If all tile areas have been placed along one line in the X direction until reaching the area C 2303 across the edge of the area B 2302 (as represented by 2306), the image data of the area B 2302 is sequentially read to the sequential multiscanning unit 1616 via the second multilevel/bilevel converter 1607. Another corrected tile area 2101 is then produced by the distortion correcting units 1604 and 1605 and placed in the area C 2303 of the second frame memory 1606. An area 2307 extending outward across the lower edge is stored at an upper end location 2307' of the area A. If all tile areas have been placed along one line in the X direction until reaching the area A 2301, then image data of the area C 2303 is transmitted. That is, memory areas from which the image data is transmitted are switched such that A→B→C→A→B→ and so on each time image data has been transmitted along one main scanning line.

The sequential multiscanning unit 1616 divides the printing image data received from the second frame memory 1606 into two parts and sends them to the first band memory 1608 and the second band memory 1609, respectively. The first print head 1610 and the second print head 1611 emit ink in accordance with the image data stored in the first band memory 1608 and the image data stored in the second band memory 1608, respectively.

The technique according to the present embodiment of the invention allows a reduction in the number of pipe line process stages in the distortion correcting unit (3 stages are reduced to 2 stages). This makes it possible to form, at low cost, a high-precision image with suppressed distortion which occurs when a recording medium having expansion/contraction properties is stuck onto the adhesive layer of the conveying belt.

By employing the technique according to any of the first to third embodiments of the invention, it becomes possible to form a high-precision image at a correct location on a recording medium in accordance with image data corrected depending on distortion of the recording medium which can occur when the recording medium is conveyed. Thus, the invention is especially useful in particular when the recording medium is of the type having expansion/contraction properties such as a cloth. Thus, the invention provides a method and apparatus for forming a high-precision image at low cost, capable of forming a high-precision image with a guaranteed high accuracy on a cloth employed as the recording medium even if the cloth is conveyed in an expanded or contracted state.

Fourth Embodiment

A fourth embodiment of the present invention is now described below in detail with reference to the accompanying drawings.

This fourth embodiment provides a technique of forming a high-precision image with no distortion on a mixed fabric by performing an image forming process a plurality of times.

The main parts of the image forming apparatus used herein are similar to those employed in the first embodiment described above with reference to FIGS. 1–13, and thus a duplicated description is not given here.

Referring to FIG. 24, the sequence of tile printing processes performed on a mixed fabric using the image forming apparatus shown in FIG. 1 is described below. The textile printing operation on a mixed fabric includes a plurality of image forming processes so that various types of inks suitable for the respective types of fibers constituting the mixed fabric are used in the respective image forming processes.

Figure 24A:
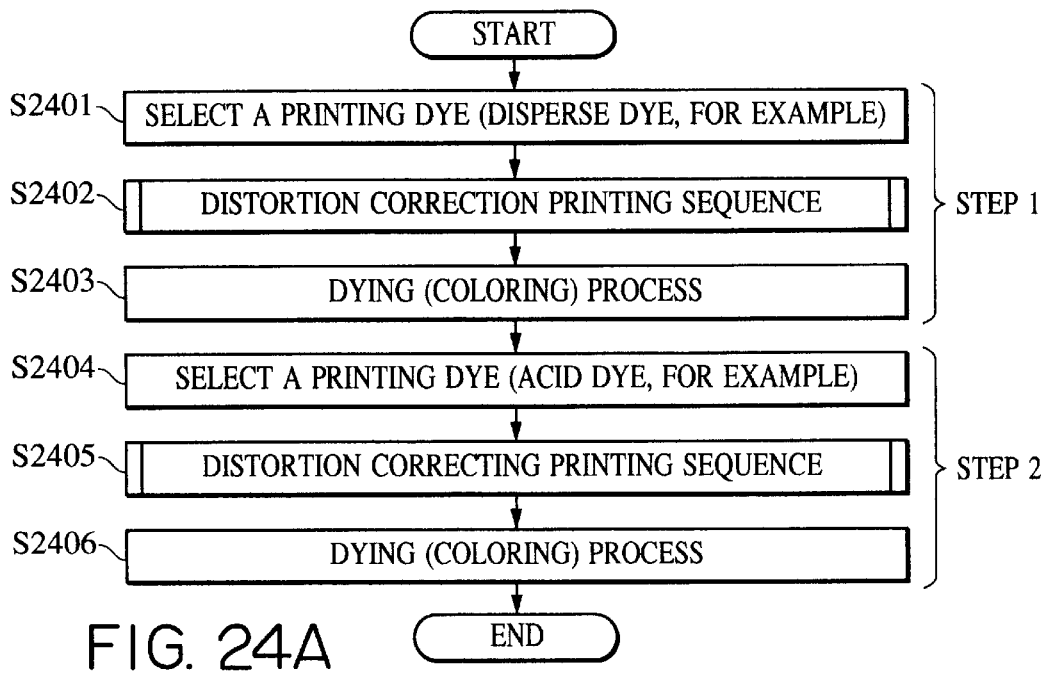
FIGS. 24A and 24B are flowcharts illustrating a printing sequence according to an embodiment of the invention.
Figure 24B:
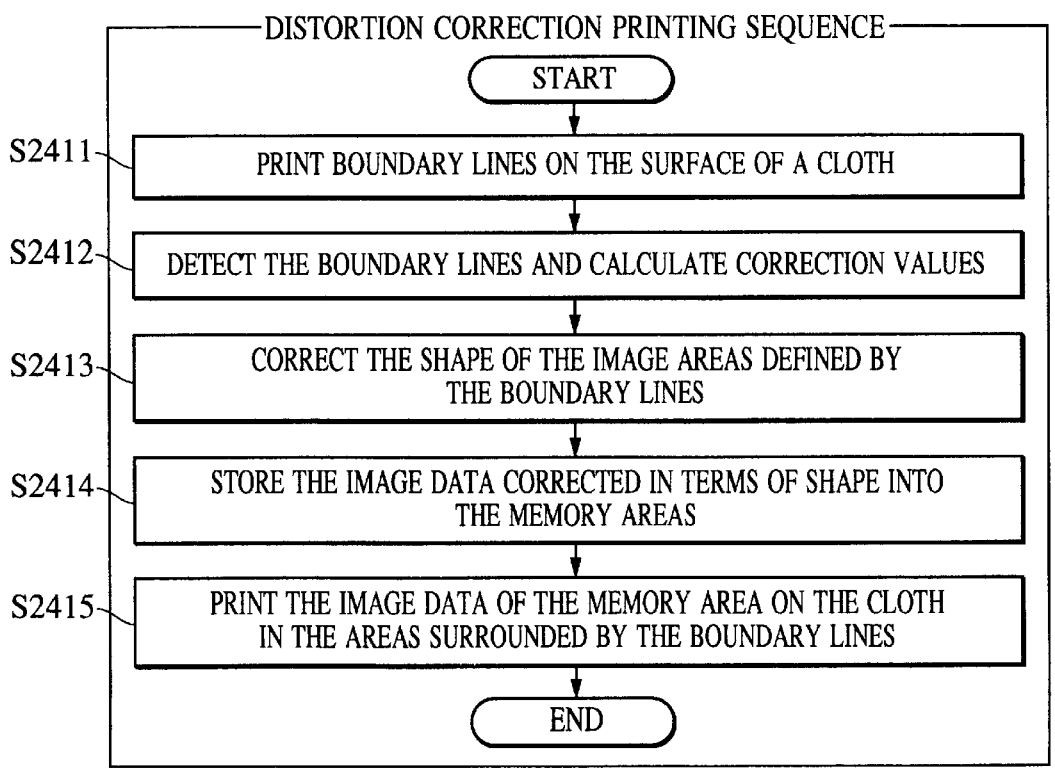

FIG. 24B is a flowchart illustrating a distortion correcting sequence. This distortion correcting sequence is similar to the sequence which has been described above in the first embodiment with reference to FIG. 14, wherein steps S1401–S1405 correspond to steps S2411–S2415 in FIG. 24B. Because the steps shown in the flowchart of FIG. 24B are similar to those in FIG. 14, they are not described in further detail here. In the present embodiment, as can be seen from the flowchart shown in FIG. 24B, a recording medium having boundary lines formed thereon is used, and distortion of the recording medium conveyed is evaluated by detecting the boundary lines. According to the evaluation result, image data is corrected and an image is formed according to the corrected image data thereby ensuring that the image with a correct shape is formed at a correct location even if the recording position where the image is to be formed is shifted for example by expansion or contraction of the cloth.

Referring now to FIG. 24A, the textile printing process on a mixed fabric is described below. In the present embodiment, the mixed fabric is assumed to consist of, by way of example, polyester and cotton.

In step S2401, a printing dye (recording agent) suitable for one type of fiber of the mixed fabric is selected. In this specific example, because the mixed fabric consists of polyester and cotton, dyeing is first performed on polyester which requires a higher processing temperature. Thus, herein, a disperse dye suitable for the textile printing on polyester is selected. The image forming process using the disperse dye is shown in step 1 of FIG. 24A. That is, in step S2402, a distortion correcting sequence is performed in the manner shown in FIG. 24B thereby forming an image. Then in step S2403, a dyeing (coloring) process is performed. After that, a textile printing process on the other type of fiber, or cotton, of the mixed fabric is performed in step 2 as shown in FIG. 24A. That is, in step S2402, a reactive dye suitable for cotton is selected and then in steps S2405 a distortion correcting sequence is performed (as shown in FIG. 24B) thereby forming an image. In the next step S2406, dyeing (coloring) is performed.

As described above, when a plurality of image forming processes are performed under conditions optimized for the respective types of fibers constituting the mixed fabric, the distortion of the recording medium is corrected in the respective image forming processes thereby ensuring that a high-precision image with a high registration accuracy among the respective image forming processes is formed on the mixed fabric.

Fifth Embodiment

A fifth embodiment of the present invention is now described below in detail with reference to the accompanying drawings.

In this fifth embodiment of the invention, disclosed is another technique of forming a high-precision image with no distortion even when the image is formed via a plurality of image forming processes.

Figure 25:
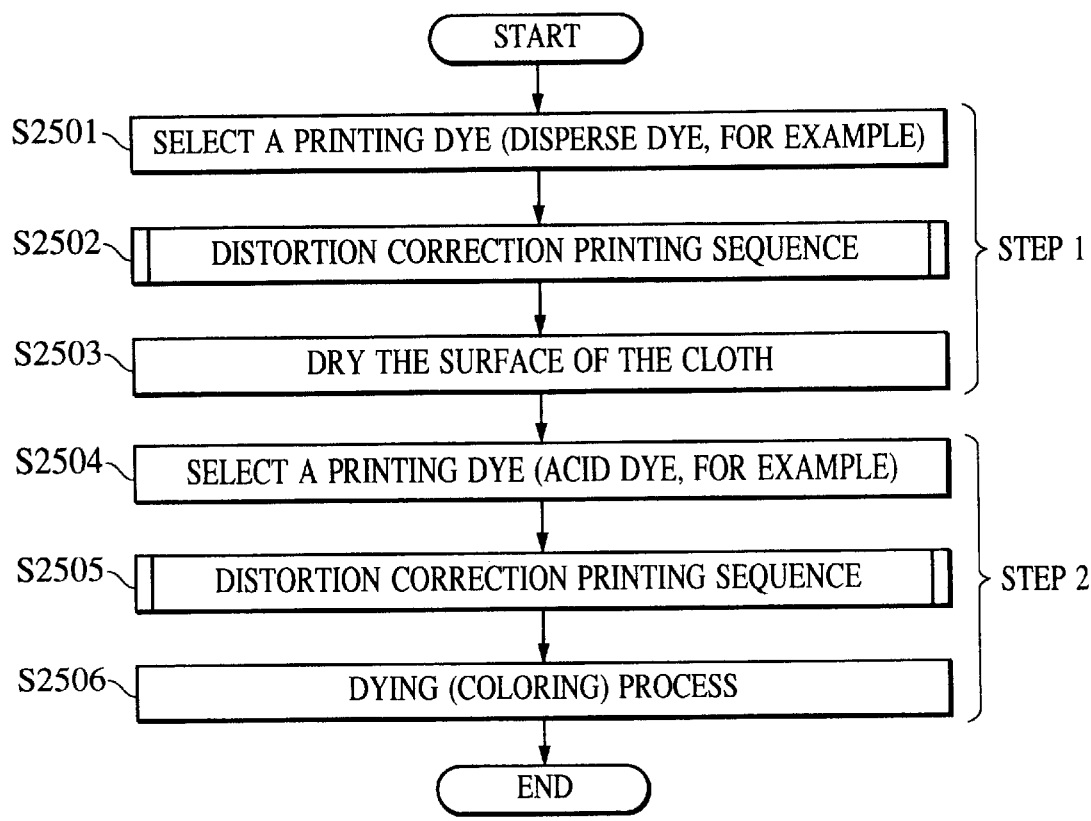
FIG. 25 is a flowchart illustrating a printing sequence according to another embodiment of the invention.

FIG. 25 illustrates the overall sequence of textile printing processes according to the fifth embodiment of the invention.

The sequence is similar to that employed in the fourth embodiment described above with respect to FIG. 24A except that step 1 in which a first image forming process is performed does not include a dyeing (coloring) step (step S2403 in FIG. 24A) and the surface of a cloth is dried in step S2503 after forming an image in step S2502 of step 1.

In this embodiment, after performing a first textile printing operation in accordance with the distortion of the cloth (steps S2501, S2502), the surface of the cloth is dried (step S2503), and then a second textile printing operation is performed with a high registration with respect to the image formed in the first textile printing operation (step S2504, S2505). In the following step S2506, a plurality of types of dyes are colored in the same single coloring step.

The technique disclosed in this embodiment of the invention is particularly useful when the mixed fabric consists of a plurality of types fibers which need similar coloring conditions. That is, this technique makes it possible to achieve a high registration accuracy among the respective images formed by the plurality of image forming operations and thus ensuring that a beautiful overall image can be obtained.

Sixth Embodiment

A sixth embodiment of the present invention is now described below in detail with reference to the accompanying drawings.

In this sixth embodiment of the invention, boundary lines used to detect distortion of a recording medium are formed on the recording medium when, of a plurality of image forming operations, a first-time image forming operation is performed. In the following image forming operations, the boundary lines are detected thereby achieving a high registration accuracy among the plurality of image forming operations.

Also in this embodiment, the boundary lines may be detected and the distortion may be corrected in a similar manner to the previous embodiments using an apparatus having a similar construction to that employed in the previous embodiments. Thus, a duplicated description is not given here.

Figure 26:
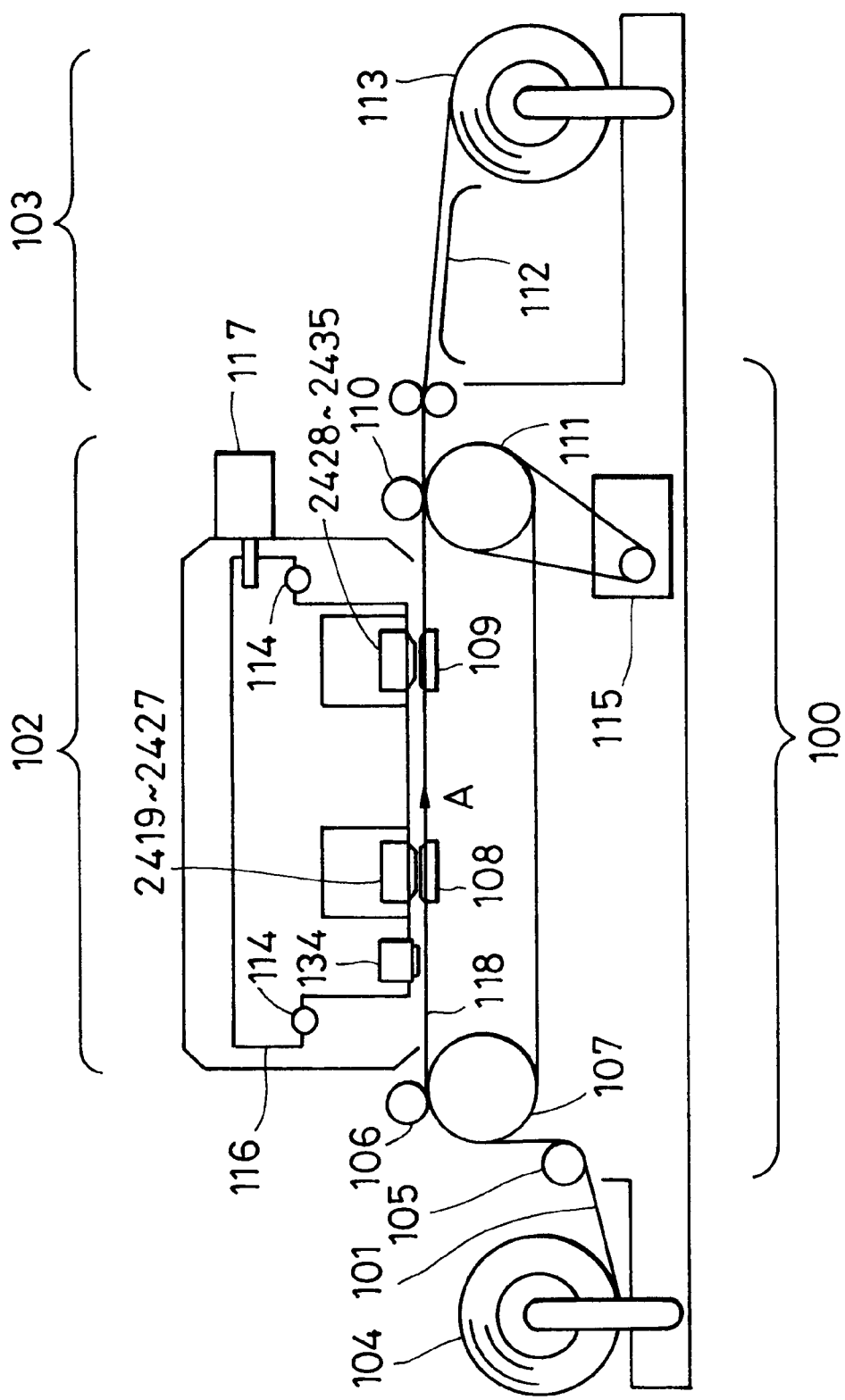
FIG. 26 is a cross-sectional view schematically illustrating the construction of a color ink-jet textile printing apparatus according to an embodiment of the invention.

FIG. 26 is a schematic diagram illustrating the construction of a full-color ink-jet recording apparatus used in this sixth embodiment of the invention.

The construction of the apparatus employed herein is similar to that shown in FIG. 1 except for the ink-jet head mounted on the carriage unit 116.

As shown in FIG. 26, the recording apparatus includes a conveying unit 100 for conveying a cloth 101 serving as a recording medium, a printer unit 102 for recording an image, a wind-up unit 103 for winding up the recording medium 101 on which the image has been printed, a feed roller 104 around which the recording medium 101 is wound, presser rollers 105 and 106, a driving roller 107, platens 108 and 109 for allowing the printing section to be maintained flat, a presser roller 110, a driving roller 111, a drying unit 112, a wind-up roller 113, a supporting rod 114 on which the carriage unit 116 is placed and held thereon, an electric motor 117 for driving the carriage unit in a main scanning direction. The driving rollers 107 and 111 are driven by a conveying motor 115. A conveying belt 118 is stretched between the driving rollers 107 and 111 across the scanning area of the carriage unit 116. An adhesive is coated on the outer surface of the conveying belt 118 so that the recording medium 101 is held on the conveying belt 118 by means of adhesive and frictional and thus the recording medium 101 is conveyed in a direction denoted by an arrow A in FIG. 26 when the above-described rollers are driven by a conveying motor 115.

The carriage unit 116 is moved by a carriage motor 117 in a horizontal direction along the supporting rods 114. The carriage unit 116 includes ink-jet heads 2419–2435 for printing an image. Of these, ink-jet heads 2419–2417 are disposed on the upstream side of the conveying path of the recording medium 101. That is, those ink-jet heads 2419–2417 are located near the feed roller 102. The ink-jet head 2419 serves as a first magenta head having a plurality of emission orifices for emitting magenta ink (other heads described below also have similar orifices). The ink-jet head 2420 serves as a first yellow head for emitting yellow ink. The ink-jet head 2421 serves as a first orange head for emitting orange ink. The ink-jet head 2422 serves as a second light-magenta head for emitting a light-magenta ink. The ink-jet head 2423 serves as a first cyan head for emitting cyan ink. The ink-jet head 2424 serves as a first light-cyan head for emitting a light-cyan ink. The ink-jet head 2425 serves as a first blue head for emitting blue ink. The ink-jet head 2426 serves as a first black head for emitting black ink. The ink-jet head 2427 serves as a first invisible-color multiscanning head (hereafter referred to as a first invisible-color head) for emitting dye ink which does not color the cloth and which can be detected using special light such as ultraviolet light. On the other hand, ink-jet heads 2428–2435 are disposed on the downstream side of the conveying path of the recording medium 101 so that they form an image following the image formed by the ink-jet heads 2419–2427. The ink-jet heads 2428–2435 are located at positions shifted from the ink-jet heads 2419–2427 located on the upstream side by a distance half the width which is scanned at a time by the carriage unit 116 (such a width is referred to as a band width). Of these heads, the ink-jet head 2428 serves as a second magenta head for emitting magenta ink, the ink-jet head 2429 serves as a second yellow head for emitting yellow ink, the ink-jet head 2430 serves as a second orange head for emitting orange ink, the ink-jet head 2431 serves as a second light-magenta head for emitting a light-magenta ink, the ink-jet head 2432 serves as a second cyan head for emitting cyan ink, the ink-jet head 2433 serves as a second light-cyan head for emitting a light-cyan ink, the ink-jet head 2433 serves as a second blue head for emitting blue ink, the ink-jet head 2434 serves as a second black head for emitting black ink, and the ink-jet head 2435 serves as a second invisible-color multiscanning head (hereafter referred to as a second invisible-color head) for emitting dye ink which does not color the cloth and which can be detected using special light such as ultraviolet light.

An optical line sensor 134 is mounted on the carriage unit 116 thereby detecting the position of yarn on the platen 101 wherein the yarn has been dyed with an invisible-color dye and woven into the recording medium 101 in advance.

Figure 27:
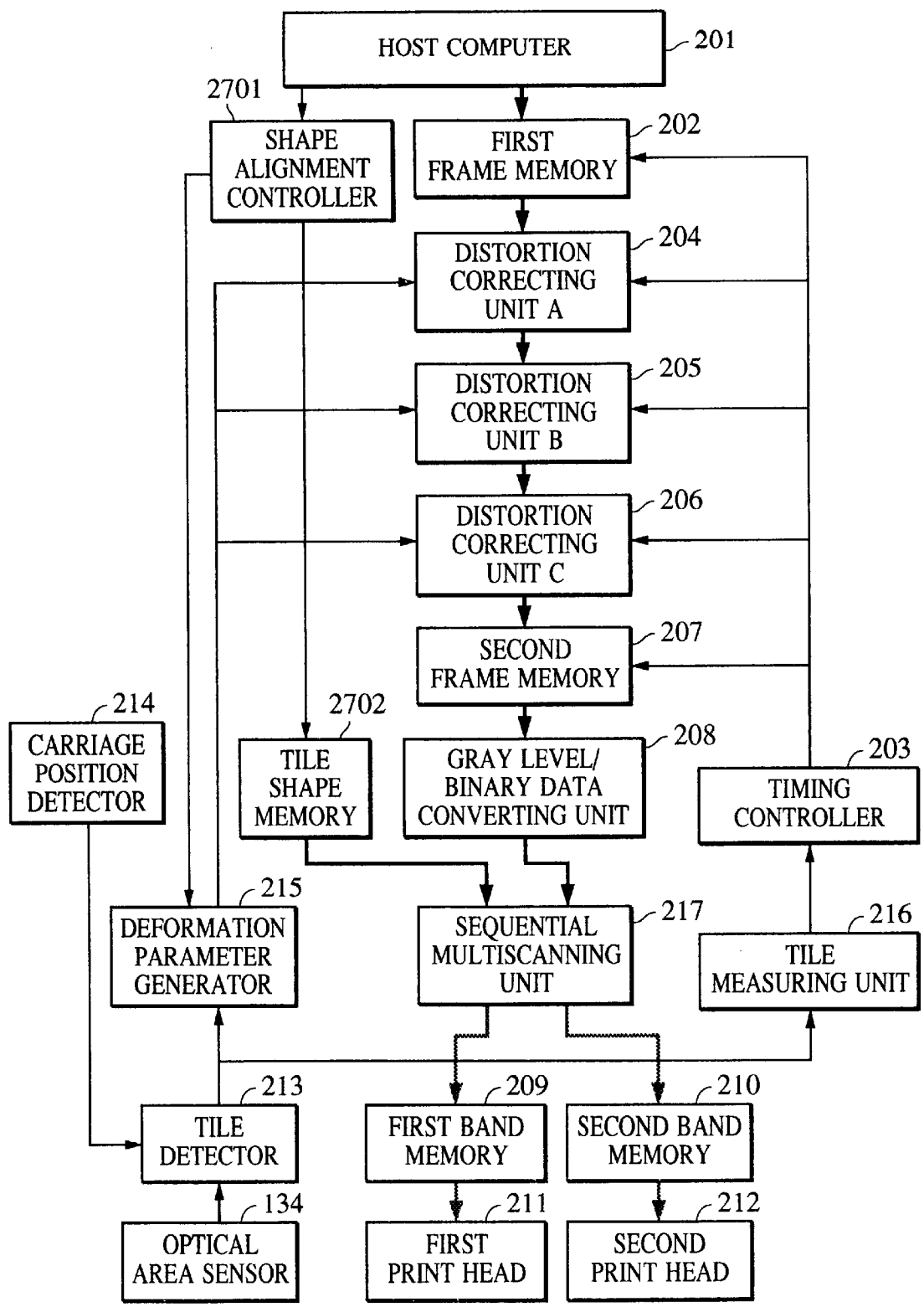
FIG. 27 is a block diagram illustrating a process performed on image data by the color ink-jet textile printing apparatus.

The operation according to the present embodiment is described below with reference to FIG. 27. FIG. 27 is a block diagram illustrating the printing operation performed by the apparatus shown in FIG. 26.

(1) First-time Textile Printing Operation

In a textile printing operation performed for the first time, in response to a print start command issued by the host computer 201, the shape alignment controller 2701 sequentially reads printing image data by an amount corresponding to one main scanning length from the first frame memory 202. The shape alignment controller 2701 also reads invisible-color data indicating tile boundary lines of a square area (or a triangular area similar to that employed in the third embodiment) from the tile shape memory 2702. The invisible-color data is superimposed on image data read from the second frame memory 207 and sent to the sequential multiscanning unit 217. The sequential multiscanning unit 217 divides the data of the tile boundary lines of the square area into two parts and sends them to the first band memory 209 and the second band memory 210, respectively. The first invisible-color head 2427 and the second invisible-color head 2435 emit ink in accordance with the data stored in the first band memory 209 and the second band memory 210, respectively. The deformation parameter generator 215 generates dummy deformation parameters without correcting distortion and sends them to the distortion correcting units A–C (204–206). As a result, the same image data as that stored in the first frame memory 202 is sent to the second frame memory 207.

(2) Second-time and Following Textile Printing Operations

In second-time and following textile printing operations, an image is formed at a location adjusted relative to the previously formed image. In response to a print start command issued by the host computer 201, the shape alignment controller sequentially reads printing image data by an amount corresponding to one main scanning length from the first frame memory 202 to the sequential multiscanning unit 217 via the distortion correcting units (204, 205, 206), the second frame memory 207, and the multilevel/bilevel converter 208. The sequential multiscanning unit 217 divides the printing image data received from the first frame memory 202 into two parts and sends them to the first band memory 209 and the second band memory 210, respectively. The image data stored in the first band memory 209 and that stored in the second band memory 210 are recorded via the first print head 211 and the second print head 212, respectively. In the above process, the lattice data stored in the tile shape memory is not superimposed on the image data read from the second frame memory 208.

Figure 28:
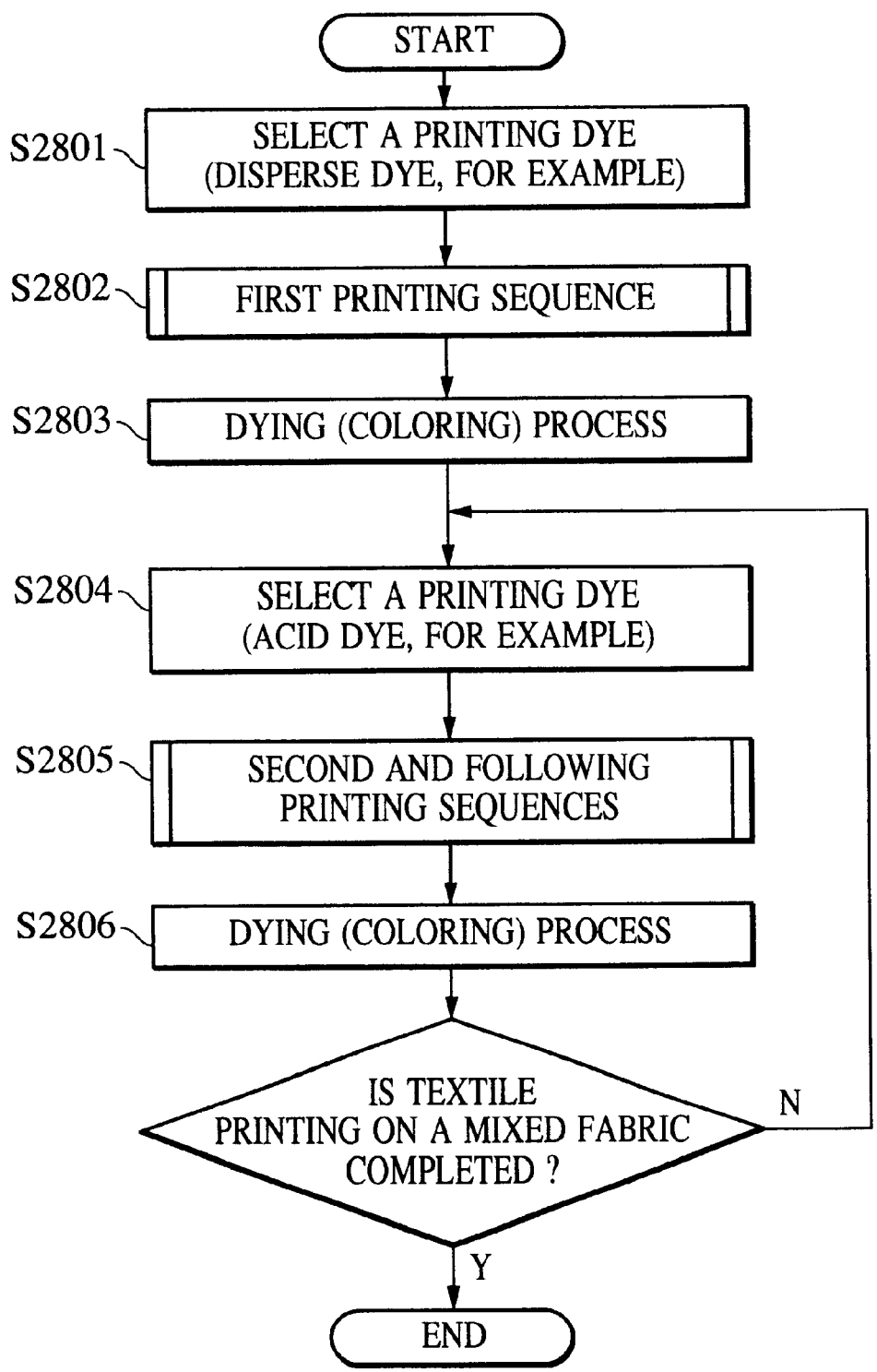
FIG. 28 is a flowchart illustrating a printing sequence performed by the color ink-jet textile printing apparatus according to an embodiment of the invention.
Figure 29A:
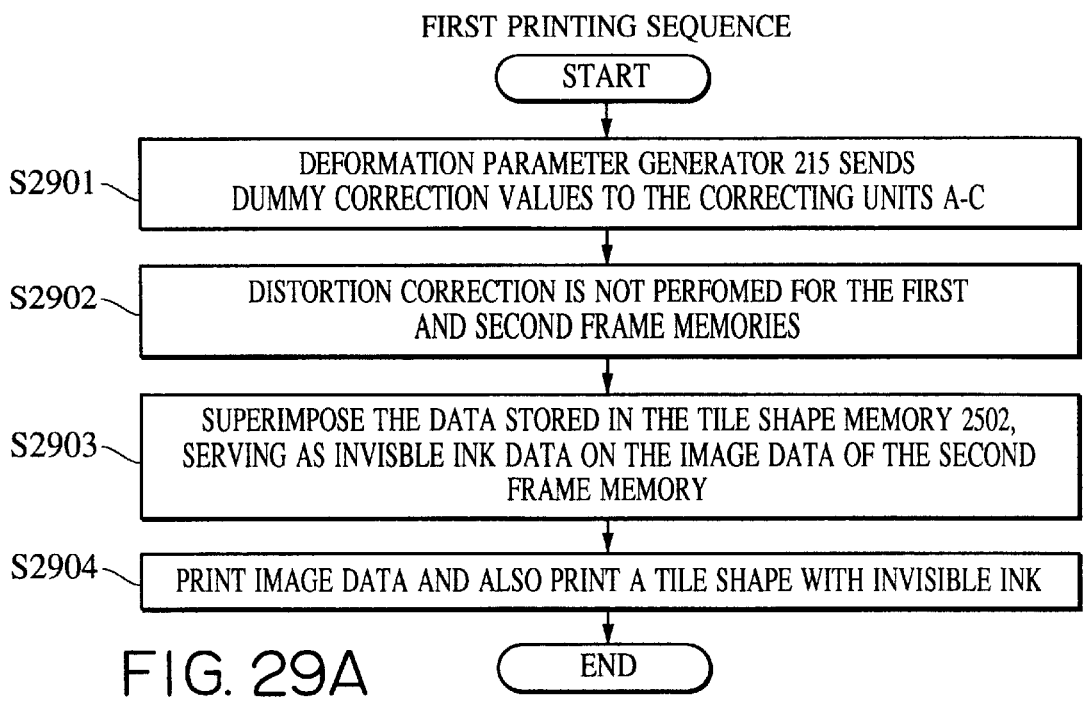
FIGS. 29A and 29B are flowcharts illustrating an image forming sequence according to an embodiment of the invention.
Figure 29B:
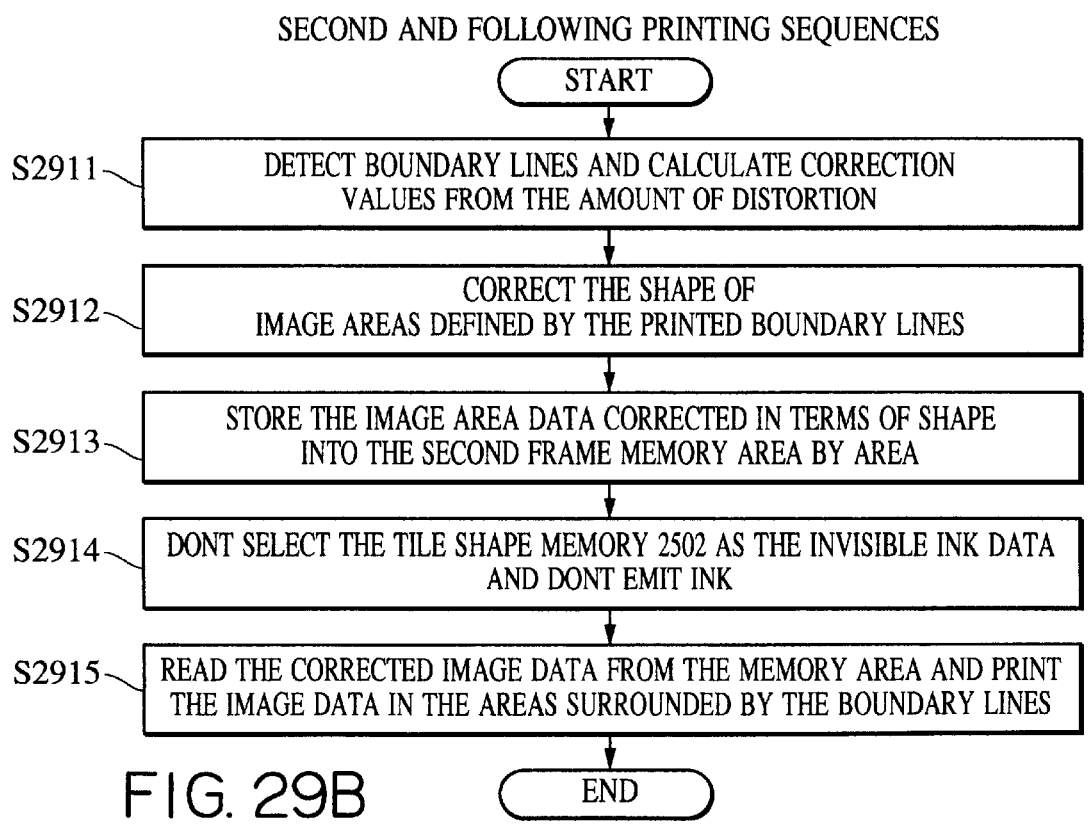

FIGS. 28 and 29 illustrate the whole textile printing process for a mixed fabric according to the above-described sequence wherein FIG. 28 is a flowchart illustrating the whole steps, FIG. 29A is a flowchart illustrating the first-time printing sequence shown in step S2802 of FIG. 28, and FIG. 29B is a flowchart illustrating the second-time and following printing sequences shown in step S2805 of FIG. 28.

In the textile printing process according to the present embodiment, as described above, an image and tile-shaped boundary lines which will be used later to detect distortion of the recording medium are printed on a cloth in the first-time printing sequence. In the second-time and following printing sequences, the boundary lines printed in the first-time printing sequence are detected and the image data is corrected on the basis of the detected boundary lines and then the corrected image data is printed.

In the present embodiment, it is possible to print an image on a cloth such that the image is formed at a location precisely adjusted relative to the distortion of the cloth without having to weave yarn dyed with invisible ink into the cloth employed as the recording medium.

Although in the specific example described above with reference to the flowchart shown in FIG. 28, the dyeing step (step S2803) is performed following the first printing process, the drying step may be performed after the first printing operation without performing the coloring step as in the fifth embodiment, if the recording medium is a mixed fabric consisting of different types of fibers which need similar coloring conditions. In the fourth to sixth embodiments, as described above, when an image is formed on a recording medium having expansion and contraction properties and consisting of different types of materials having different coloring characteristics, such as a mixed fabric, via a plurality of image forming operations using different types of dyes, it is possible to form the images at proper positions on the recording medium even if the recording medium has distortion during the conveying process and thus the images formed by the plurality of processes are precisely aligned with respect to each other. Therefore, even if a mixed fabric is conveyed in an expanded or contracted state, an image with guaranteed high precision can be formed on the mixed fabric. Thus, the invention provides a method and apparatus for forming a high-precision image at low cost.

Although in the fourth to sixth embodiments described above, the boundary lines used to detect distortion which can occur when a recording medium is conveyed are produced in the form of rectangles, the boundary lines may also be produced in the form of triangles as described in the third embodiment. Furthermore, information such as bar-code information may be recorded in areas within frames formed by the tile-shaped boundary lines as described in the second embodiment so that the absolute positions of the respective tile-shaped areas of the recording medium may be determined by detecting the recorded information using an optical area sensor.

Seventh Embodiment

A seventh embodiment of the invention is described below with reference to the accompanying drawings.

The seventh embodiment disclosed herein provides a technique of forming high-precision images on both sides of a special type of recording medium having expansion/contraction properties such as a cloth such that the images on both sides are coincident with each other.

Figure 30:
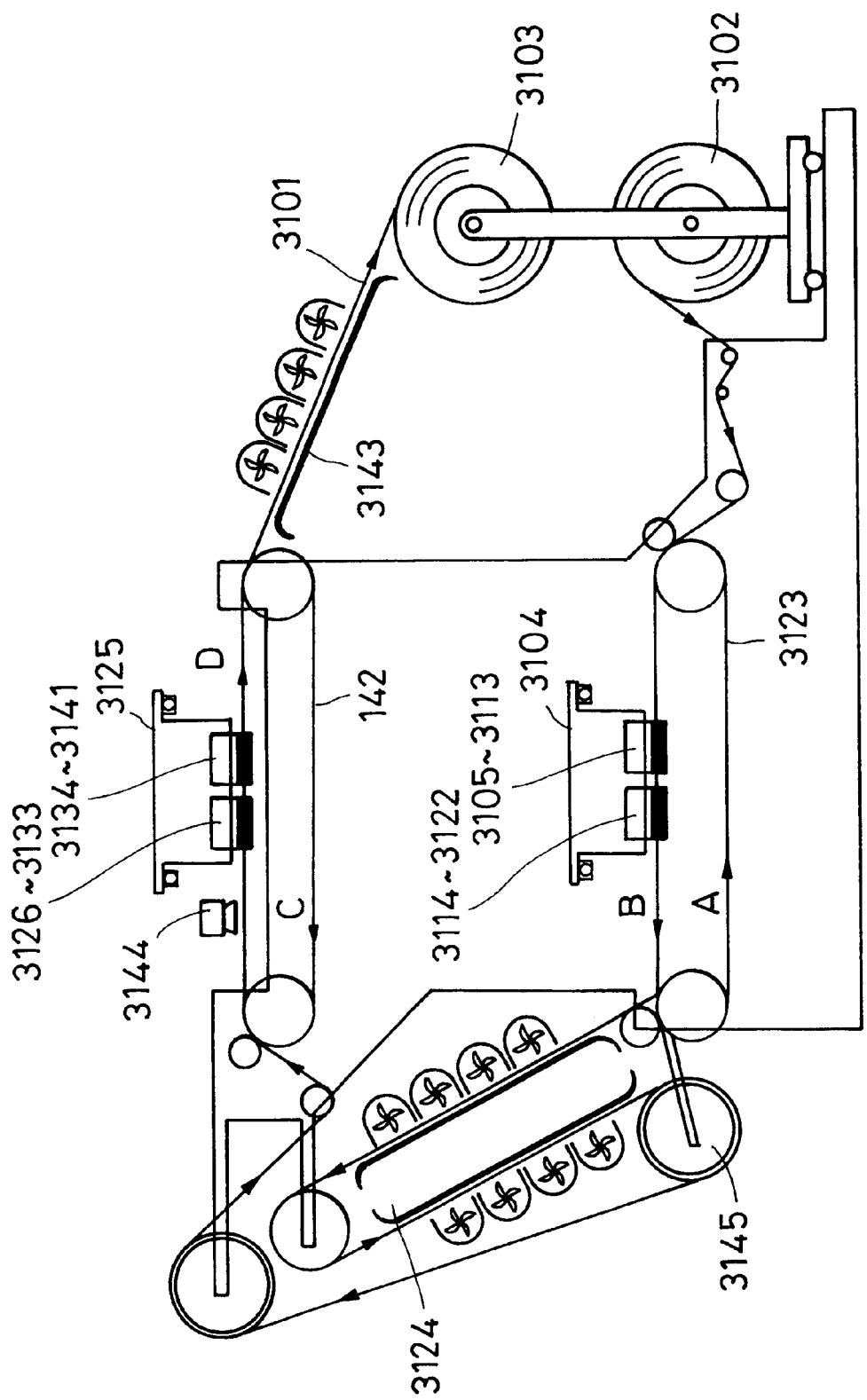
FIG. 30 is a cross-sectional view schematically illustrating the construction of a full-color ink-jet textile printing apparatus according to the invention.

In FIG. 30, reference numeral 3101 denotes a recording medium. As for the recording medium in the present embodiment, a cloth of cotton, silk, nylon, or polyester may be used. Reference numeral 3102 denotes a feed roller around which the recording medium 3101 is wound. Reference numeral 3103 denotes a wind-up roller for winding up the recording medium 3101 on which the image has been printed. A first printing controller 3104 controls the printing operation of ink-jet heads (3105–3122).

The ink-jet heads 3105–3113 are disposed on the upstream side of the conveying path along which the recording medium 3101 is conveyed. The ink-jet head 3105 serves as a first light-magenta multinozzle head (hereinafter referred to as a first light-magenta head) for emitting light-magenta ink. The ink-jet head 3106 serves as a first yellow multinozzle head (hereinafter referred to as a first yellow head) for emitting yellow ink. The ink-jet head 3107 serves as a first orange multinozzle head (hereinafter referred to as a first orange head) for emitting orange ink. The ink-jet head 3108 serves as a first magenta multinozzle head (hereinafter referred to as a first magenta head) for emitting magenta ink. The ink-jet head 3109 serves as a first light-cyan multinozzle head (hereinafter referred to as a first light-cyan head) for emitting light-cyan ink. The ink-jet head 3110 serves as a first cyan multinozzle head (hereinafter referred to as a first cyan head) for emitting cyan ink. The ink-jet head 3111 serves as a first blue multinozzle head (hereinafter referred to as a first blue head) for emitting blue ink. The ink-jet head 3112 serves as a first black multinozzle head (hereinafter referred to as a first black head) for emitting black ink. The ink-jet head 3113 serves as a first invisible-color multinozzle head (hereinafter referred to as a first invisible-color head) for emitting dye ink which does not color cloths but which can be detected using special light such as ultraviolet light. The recording agent emitted from the invisible-color head contains, for example, a dye which is invisible to human eyes in normal usage environments but which can be detected only when illuminated with a special light.

The ink-jet heads 3114–3122 are disposed on the downstream side of the conveying path of the recording medium 3101 such that they are apart from the ink-jet heads 3105–3113 by a distance half the width (band width) along which an image is recorded by the ink-jet heads 3105–3113 during one scanning process. The ink-jet head 3114 serves as a second light-magenta multinozzle head (hereinafter referred to as a second light-magenta head) for emitting light-magenta ink. The ink-jet head 3115 serves as a second yellow multinozzle head (hereinafter referred to as a second yellow head) for emitting yellow ink. The ink-jet head 3116 serves as a second orange multinozzle head (hereinafter referred to as a second orange head) for emitting orange ink. The ink-jet head 3117 serves as a second magenta multinozzle head (hereinafter referred to as a second magenta head) for emitting magenta ink. The ink-jet head 3118 serves as a second light-cyan multinozzle head (hereinafter referred to as a second light-cyan head) for emitting light-cyan ink. The ink-jet head 3119 serves as a second cyan multinozzle head (hereinafter referred to as a second cyan head) for emitting cyan ink. The ink-jet head 3120 serves as a second blue multinozzle head (hereinafter referred to as a second blue head) for emitting blue ink, the ink-jet head 3121 serves as a second black multinozzle head (hereinafter referred to as a second black head) for emitting black ink. The ink-jet head 3122 serves as a second invisible-color multinozzle head (hereinafter referred to as a second invisible-color head) for emitting dye ink which does not color cloths but which can be detected using special light such as ultraviolet light.

Reference numeral 3123 denotes a first platen for conveying the recording medium. As can be seen from the figure, the first platen 3123 is stretched by a plurality of rollers. When the first platen 3123 moves in a direction denoted by an arrow A, the recording medium 3103 is moved in a direction denoted by an arrow B by means of friction between the recording medium 3103 and the first platen 3123. Reference numeral 3124 denotes a drying unit for drying ink on the recording surface of the recording medium 3101 immediately after an image has been printed. After being dried, the recording medium 3101 is turned over by the conveying means 3145 (turning-over means) and conveyed in the opposite direction with the recording surface facing down.

A second printing controller 3125 controls the printing operation of the ink-jet heads (3126–3144). The ink-jet heads 3126–3133 are disposed on the upstream side of the conveying path along which the recording medium 3101 is conveyed. The ink-jet head 3126 serves as a third light-magenta multinozzle head (hereinafter referred to as a third light-magenta head) for emitting light-magenta ink. The ink-jet head 3127 serves as a third yellow multinozzle head (hereinafter referred to as a third yellow head) for emitting yellow ink. The ink-jet head 3128 serves as a third orange multinozzle head (hereinafter referred to as a third orange head) for emitting orange ink. The ink-jet head 3129 serves as a third magenta multinozzle head (hereinafter referred to as a third magenta head) for emitting magenta ink. The ink-jet head 3130 serves as a third light-cyan multinozzle head (hereinafter referred to as a third light-cyan head) for emitting light-cyan ink. The ink-jet head 3131 serves as a third cyan multinozzle head (hereinafter referred to as a third cyan head) for emitting cyan ink. The ink-jet head 3132 serves as a third blue multinozzle head (hereinafter referred to as a third blue head) for emitting blue ink. The ink-jet head 3133 serves as a third black multinozzle head (hereinafter referred to as a third black head) for emitting black ink.

The ink-jet heads 3134–3141 are disposed on the downstream side of the conveying path of the recording medium 3101 such that they are apart from the ink-jet heads 3126–3133 by a distance half the width (band width) along which an image is recorded by the ink-jet heads 3126–3133 during one scanning process. The ink-jet head 3134 serves as a fourth light-magenta multinozzle head (hereinafter referred to as a fourth light-magenta head) for emitting light-magenta ink. The ink-jet head 3135 serves as a fourth yellow multinozzle head (hereinafter referred to as a fourth yellow head) for emitting yellow ink. The ink-jet head 3136 serves as a fourth orange multinozzle head (hereinafter referred to as a fourth orange head) for emitting orange ink. The ink-jet head 3137 serves as a fourth magenta multinozzle head (hereinafter referred to as a fourth magenta head) for emitting magenta ink. The ink-jet head 3138 serves as a fourth light-cyan multinozzle head (hereinafter referred to as a fourth light-cyan head) for emitting light-cyan ink. The ink-jet head 3139 serves as a fourth cyan multinozzle head (hereinafter referred to as a fourth cyan head) for emitting cyan ink. The ink-jet head 3140 serves as a fourth blue multinozzle head (hereinafter referred to as a fourth blue head) for emitting blue ink. The ink-jet head 3141 serves as a fourth black multinozzle head (hereinafter referred to as a fourth black head) for emitting black ink.

Reference numeral 3142 denotes a second platen for conveying the recording medium. As can be seen from the figure, the second platen 3142 is stretched by a plurality of rollers. When the second platen 3142 moves in a direction denoted by an arrow C, the recording medium 3103 is moved in a direction denoted by an arrow D by means of friction between the recording medium 3103 and the second platen 3142. Reference numeral 3143 denotes a drying unit for drying ink on the recording surface of the recording medium 3101 immediately after an image is printed.

Reference numeral 3144 denotes an optical area sensor disposed above the second platen 3142 to detect the position of the dye ink printed by the first invisible-color head 3113 and the second invisible-color head 3122.

Figure 31:
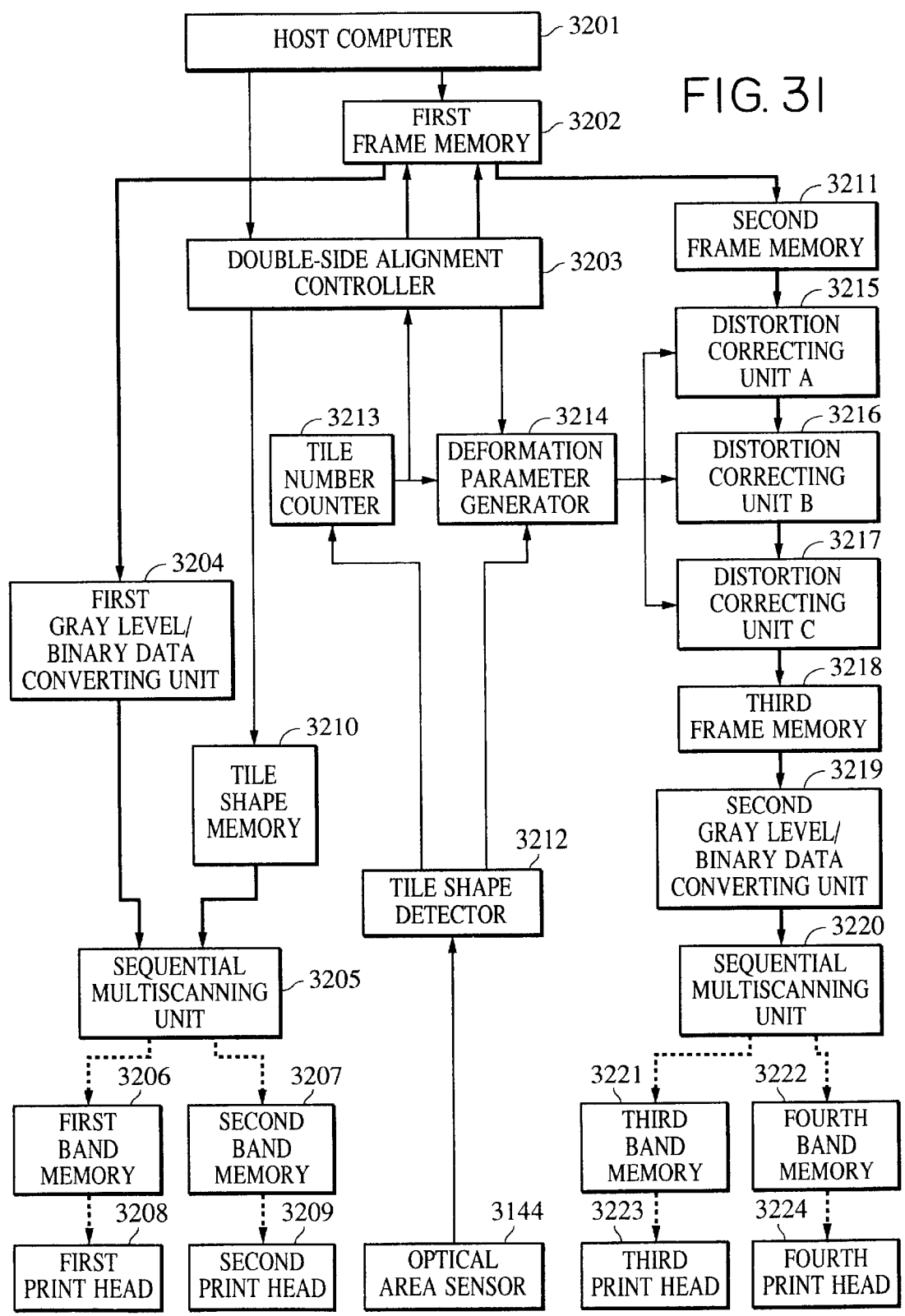
FIG. 31 is a block diagram illustrating a process performed on image data by the full-color ink-jet textile printing apparatus shown in FIG. 30.

FIG. 31 is a block diagram illustrating the printing operation performed by the ink-jet printer shown in FIG. 30.

A first print head 3208 (corresponding to the print heads 3105–3113 shown in FIG. 30), a second print head 3209 (corresponding to the print heads 3105–3113 shown in FIG. 30), a third print head 3223 (corresponding to the print heads 3126–3133 shown in FIG. 30), and a fourth print head 3224 (corresponding to the print heads 3134–3141 shown in FIG. 30) perform printing operations in both directions.

Reference numeral 3201 denotes a host computer responsible for controlling the ink-jet textile printing system. When printing image data is received from the host computer 301 via a GPIB (General Purpose Interface Bus) interface, the received data is temporarily stored in a first frame memory 3202. In response to a print start command issued by the host computer 3201, the both-side alignment controller 3203 sequentially reads printing image data by an amount corresponding to one full length of line along the main scanning direction from the first frame memory 3202 to the sequential multiscanning unit 3205 via the first multilevel/bilevel converter 3204. The sequential multiscanning unit 3205 operates in a similar manner to the sequential multiscanning unit 217 described in the first embodiment with reference to FIG. 2. That is, the sequential multiscanning unit 3205 divides the printing image data received from the first frame memory 3202 into two parts and sends them to the first band memory 3206 and the second band memory 3207, respectively.

In the ink-jet textile printing apparatus shown in FIGS. 30 and 31, the printing process is performed under the control of the first printing controller 3104 in the manner described above in the first embodiment with reference to FIG. 3. Because the printing process performed by the first printing control 3104 is similar to that described in the first embodiment, a duplicated description is not given here. The second printing controller 3125 performs a printing process in a multiscanning fashion using the third print head 3223 and the fourth print head 3224 in a similar manner.

Figure 32A:
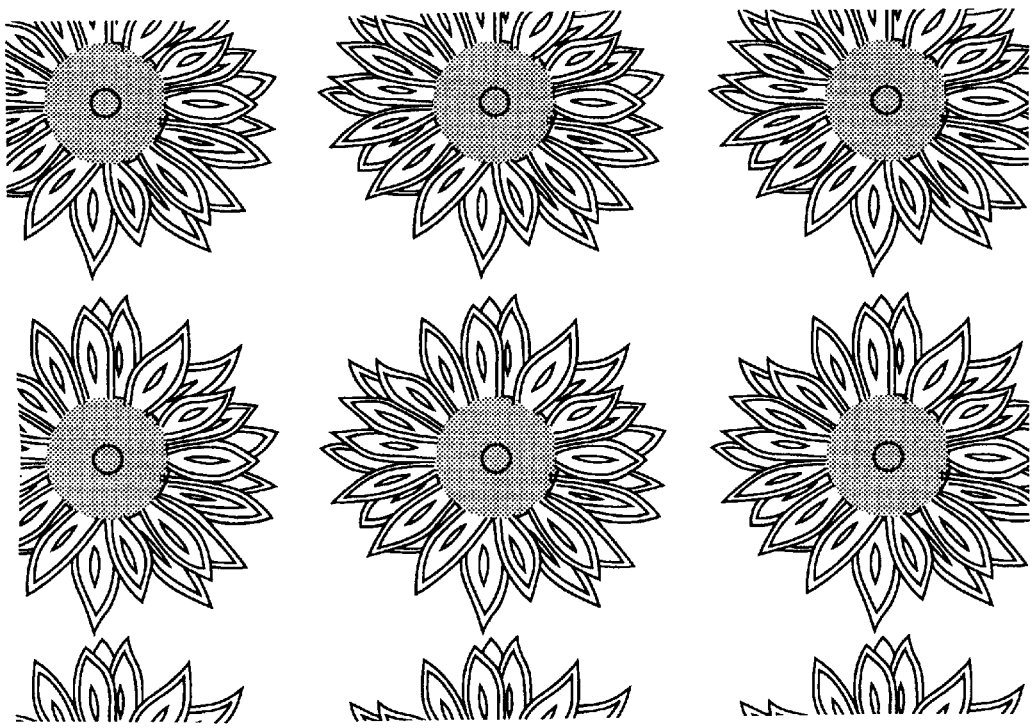
FIGS. 32A and 32B are schematic diagrams illustrating a manner in which image data to be printed by the full-color ink-jet textile printing apparatus is divided into rectangular tile areas according to an embodiment of the invention.
Figure 32B:
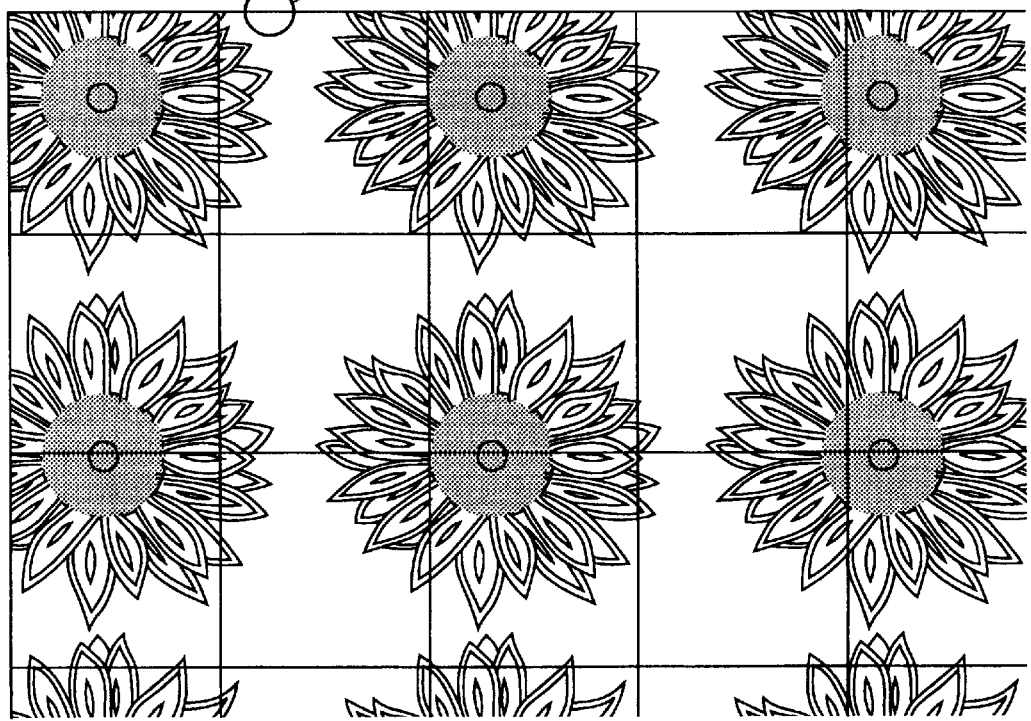

FIGS. 32A and 32B illustrates a manner in which image data to be printed by the ink-jet textile printing apparatus shown in FIGS. 30 and 31 is divided into rectangular tile areas. FIG. 32A illustrates an image 411 and FIG. 32B illustrates an image 412 divided into tile areas defined by boundary lines 413.

The tile-shaped boundary lines are similar to those employed in the first embodiment and thus they are not described in further detail herein.

In response to a print start command issued by the host computer 3201, the both-side alignment controller 3203 sequentially reads printing image data by an amount corresponding to one main scanning length from the first frame memory 3202. The both-side alignment controller 3203 also reads invisible-color data representing rectangular tile-shaped boundary lines 413 from the tile shape memory 3210 and sends it together with the image data 411 in a superimposed fashion to the sequential multiscanning unit 3203. The sequential multiscanning unit 3203 divides the data of the rectangular tile-shaped boundary lines 413 into two parts and sends them to the first band memory 3206 and the second band memory 3207, respectively. The first invisible-color head 3113 and the second invisible-color head 3122 emit ink in accordance with the data stored in the first band memory 3206 and the second band memory 3206, respectively.

Distortion of a cloth employed as a recording medium 3101, which occurs when the recording medium 3101 is conveyed via the conveying means 3145 and stuck onto the second platen 3142 of the ink-jet textile printing apparatus shown in FIGS. 1 and 2, is corrected in the manner shown in FIG. 6. The detailed description associated with FIG. 6 has already been described above in the first embodiment, and thus a duplicate description is not given here for the purpose of brevity.

In response to a print start command issued by the host computer 3201, the both-side alignment controller 3203 shown in FIG. 31 sequentially reads printing image data by an amount corresponding to one main scanning length from the first frame memory 202 to the first printing controller 3104. The both-side alignment controller 3203 also stores the same printing image data into the second frame memory 3211. If the optical area sensor 3144 detects rectangular tile-shaped boundary lines 413 printed by the first printing controller 3104, the shape of the detected boundary lines 314 is analyzed by the tile shape detector 3212. The tile number counter 3213 assigns a processing number (n) to a detected tile. The processing number is sent to the both-side alignment controller 3203. The deformation parameter generator 3214 determines the coordinates 601'–604' of the four corners of the detected tile with respect to the coordinates 601–604 of the four corners of the unit tile stored in the tile shape memory 3210. Furthermore, the deformation parameter generator 3214 calculates the correction value parameters 605–610 indicating the deviations of reference points 602–604 with respect to the first reference point 601. The resultant correction value parameters 605–610 are stored in a memory provided in the deformation parameter generator 3214. The respective parameters are stored in the memory as shown in FIG. 10. Herein, the respective coordinates and parameters are represented as follows.

First reference point 601 in the tile shape memory 3210=P1

Detected first tile reference point 601'=P1'

Second reference point 602 in the tile shape memory 3210=P2

Detected second tile reference point 602'=P2'

Correction value 605 in the main scanning direction for the second reference point=σX2n Correction value 606 in the secondary scanning direction for the second reference point=σY2n Third reference point 603 in the tile shape memory 3210=P3

Detected third tile reference point 603'=P3'

Correction value 607 in the main scanning direction for the third reference point=σX3n Correction value 608 in the secondary scanning direction for the third reference point=σY3n Fourth reference point 604 in the tile shape memory 3210=P4

Detected fourth tile reference point 604'=P4'

Correction value 609 in the main scanning direction for the fourth reference point=σX4n Correction value 610 in the secondary scanning direction for the fourth reference point=σY4n In the following distortion correcting process, as described below, the distortion correcting units (3215–3217) correct the pixel positions with respect to the coordinates of the first reference point for all pixels within the tile area 601 read from the second frame memory 211 thereby producing a corrected tile area 801. The distortion correcting processes are similar to the distortion correcting processes (1)–(3) described earlier in the first embodiment with reference to FIGS. 7–9, and thus a further description is not given here.

The process associated with the frame memory of the ink-jet textile printing apparatus is similar to that employed in the first embodiment described above with reference to FIGS. 11 and 12.

The process in the present embodiment is described below.

The third frame memory 3218 includes an area A 1101, an area B 1102, and an area C 1103 and thus it has a capacity equal to one main scanning area×3. After a print start command is issued by the host computer 3201, if the double-side alignment controller 3203 detects a first tile (via the tile number counter 213), the distortion correcting units A–C (3215–3217) produce a corrected tile area 901. The produced tile area 901 is placed in the area B 1102 of the third frame memory 3218. Other tile areas following the tile area 901 are sequentially placed such that the first reference point of each file area is located on the second reference point of an immediately previous tile area thereby placing tile areas in the third frame memory 3218 at locations close to each other without producing spaces among them (FIG. 12). In the above process, the corrected tile area 901 is placed in such a manner that its first reference point 601 is offset in the X direction by an amount denoted by 1104 so that the following corrected tile areas are prevented from being placed outside the printing area across the left edge. In the Y-direction, the first reference point 601 is located on the upper edge (on the side of the area A) of the area B 1102 so that even if a following corrected tile area 901 is shifted into the area A across the upper edge of the area B 1102 (as represented by 1105), the tile area 901 can be properly printed by starting the printing operation for the tile area 901 from a point in the area A 1101 thereby preventing a non-printed area from being created. If all tile areas have been placed along one line in the X direction until reaching the area C 1103 across the edge of the area B 1102 (as represented by 1106), the image data of the area B 1102 is sequentially read to the sequential multiscanning unit 3218 via the second multilevel/bilevel converter 3219. Another corrected tile area 901 is then produced by the distortion correcting unit 3215 and placed in the area C 1103 of the third frame memory 3216. An area 1107 extending outward across the lower edge is stored at an upper end location 1107' of the area A. If all tile areas have been placed along one line in the X direction until reaching the area A 1101, then image data of the area C 1103 is transmitted. That is, memory areas from which the image data is transmitted are switched such that A→B→C→A→B→ and so on each time image data has been transmitted along one main scanning line.

The sequential multiscanning unit 3220 divides the printing image data received from the third frame memory 3218 into two parts and sends them to the third band memory 3221 and the fourth band memory 3222, respectively. The third print head 3223 and the fourth print head 3224 emit ink in accordance with the image data stored in the third band memory 3221 and the image data stored in the fourth band memory 3224, respectively.

FIG. 13 schematically illustrates a printed image obtained by correcting distortion of a cloth on which the image is printed by the third and fourth print heads 221 and 221. As shown in FIG. 13, it is possible to form an image by applying a recording agent via the third and fourth print heads such that the resultant image is precisely adjusted in position relative to the image already formed on the surface of the cloth by applying a recording agent via the first and second print heads, regardless of expansion/contraction of the cloth.

Referring now to the flowchart shown in FIG. 37, an image forming process according to the present embodiment is described below. In this invention, a part of the apparatus consisting of the print heads 3105–3122 serving to perform a firs t printing operation and the first printing controller 3104 is referred to as first recording means 3104. Similarly, a part of the apparatus consisting of the print heads 3126–3141 serving to perform a second printing operation and the second printing controller 3125 is referred to as second recording means.

If the process is started, in step S3701 the first recording means 3104 forms an image together with rectangular tile-shaped boundary lines 413 on a cloth. In the next step S3702, the cloth is turned over and conveyed to the second recording means 3125. Then in step S3703, the boundary lines 413 formed on the cloth are detected using the optical area sensor 3144 and the distortion of the cloth in the upside-down state is evaluated. The correction values 605–610 are then calculated from the distortion. In the following step S3704, the shape of the image area corresponding to the recording position in the area 412 defined by the detected rectangular tile-shaped boundary lines, in accordance with the correction values 605–610. The images formed on the principal surface and back surface of the cloth should be mirror-symmetric to each other. Therefore, in the next step S3705, the area 901 corrected in terms of the shape is reversed from right to left and the resultant image data is sequentially stored side by side in the memory areas 1101–1103. In step S3706, the second recording means 3125 forms an image on the surface of the cloth opposite to the surface on which the image has already been formed, in accordance with the image data stored in the memory area 1102.

In the present embodiment, as described above, boundary lines are formed together with an image on a first surface of a cloth, and then an image data is formed on the opposite surface in accordance with image data corrected on the basis of the distortion of the detected boundary lines. Thus, it is possible to form images at correct positions on both surfaces such that both images are coincident with each other even if the positions where the images should be formed are shifted by expansion/contraction of the cloth.

Figure 37:
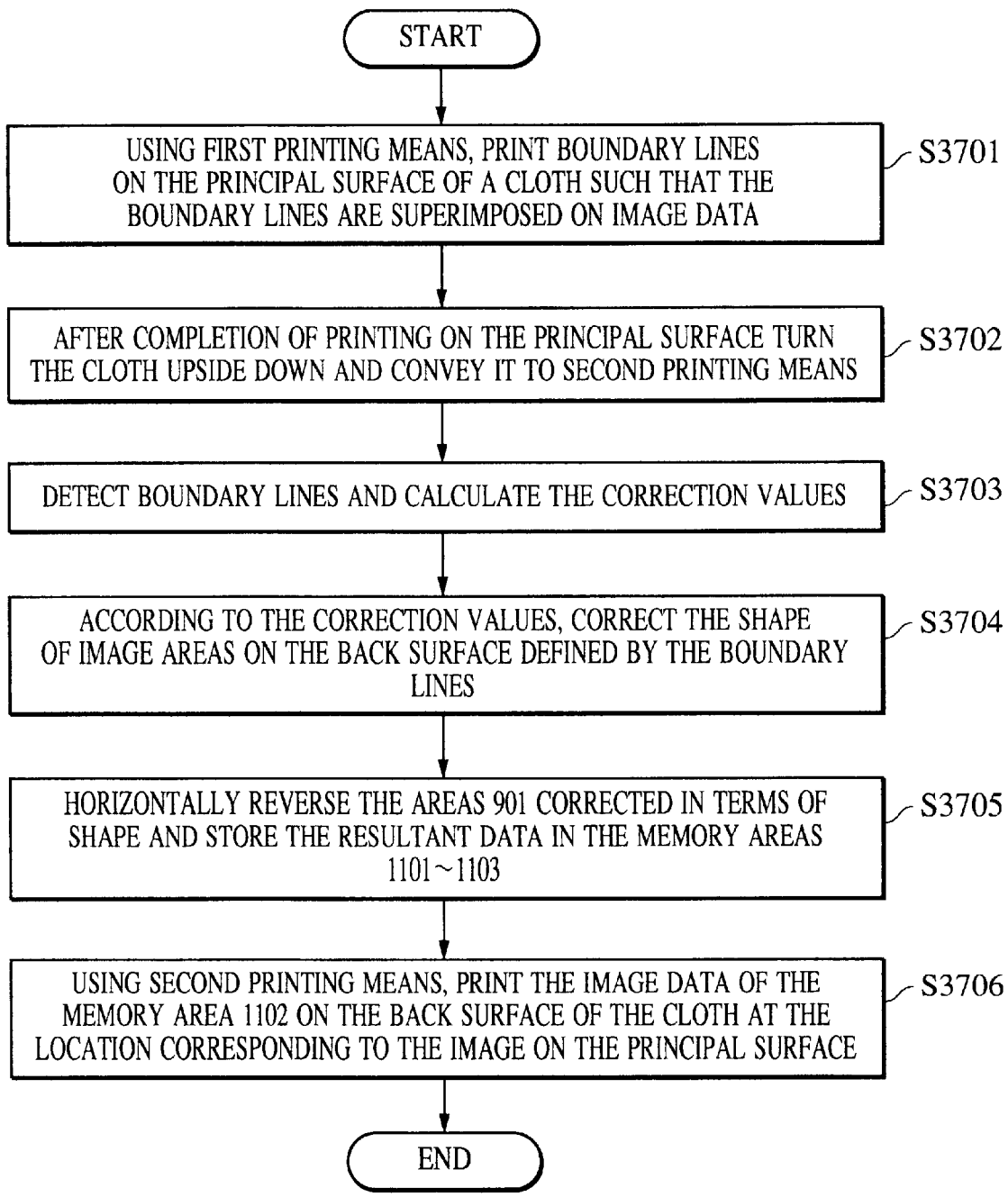
FIG. 37 is a block diagram illustrating a process performed on image data according to still another embodiment of the invention.

That is, the process shown in the flowchart of FIG. 37 includes the steps of forming an image on one surface of a recording medium by applying a recording agent in accordance with image data; conveying the recording medium having the image formed on the one surface; evaluating the distortion or the state of the conveyed recording medium; processing the image data in accordance with the result of the evaluation; and finally forming an image on the surface opposite to the surface on which the image has already been formed, in accordance with the processed image data.

The image forming apparatus according to the present embodiment is such an image forming apparatus for forming an image on a recording medium using a recording head wherein the apparatus includes conveying means for conveying a recording medium; evaluation means for evaluating the distortion or the state of the conveyed recording medium; and processing means for processing image data in accordance with the result of the evaluation whereby an image is first formed on one surface of the recording medium, and then the recording medium is conveyed and the state of the conveyed recording medium is evaluated, the image data is then processed in accordance with the result of the evaluation, and finally an image is formed on the surface opposite to the surface on which the image has already been formed, in accordance with the processed image data.

According to the technique disclosed in the present embodiment of the invention, as described above, it is possible to form images on both sides of a cloth in such a manner that an image is first formed on one surface of the cloth and then another image is formed on the opposite surface at locations precisely corresponding to the previously formed image regardless of whether the cloth is expanded or contracted.

Eighth Embodiment

An eighth embodiment of the present invention is now described below in detail with reference to the accompanying drawings.

In addition to the seventh embodiment, this eighth embodiment provides another technique of forming high-precision images on both sides of a special type of recording medium having expansion/contraction properties such as a cloth such that the images on both sides are coincident with each other.

Figure 33:
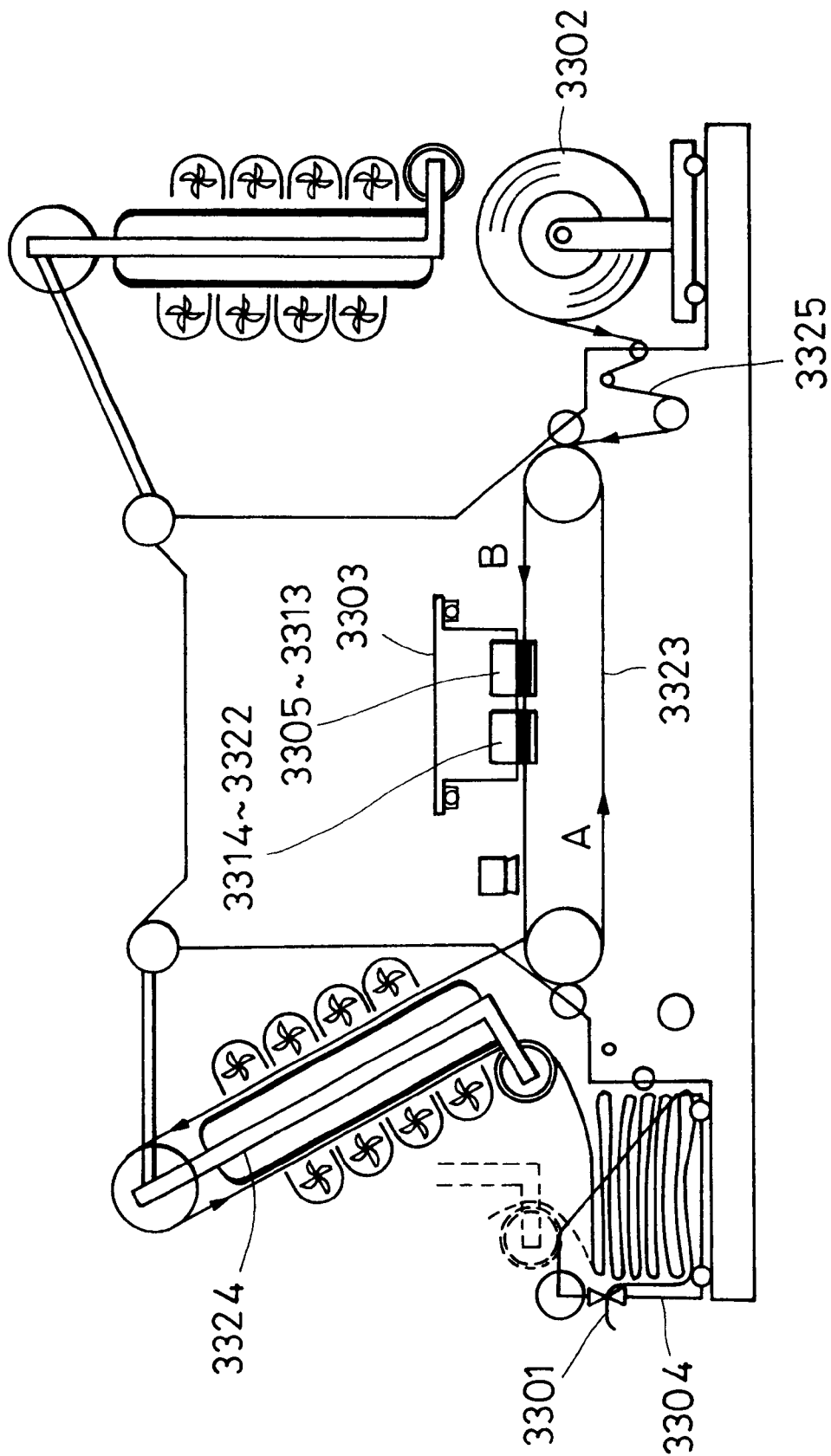
FIG. 33 is a cross-sectional view schematically illustrating the construction of a full-color ink-jet textile printing apparatus according to an embodiment of the invention and also illustrating the operation of recording an image on the surface of a cloth.
Figure 34:
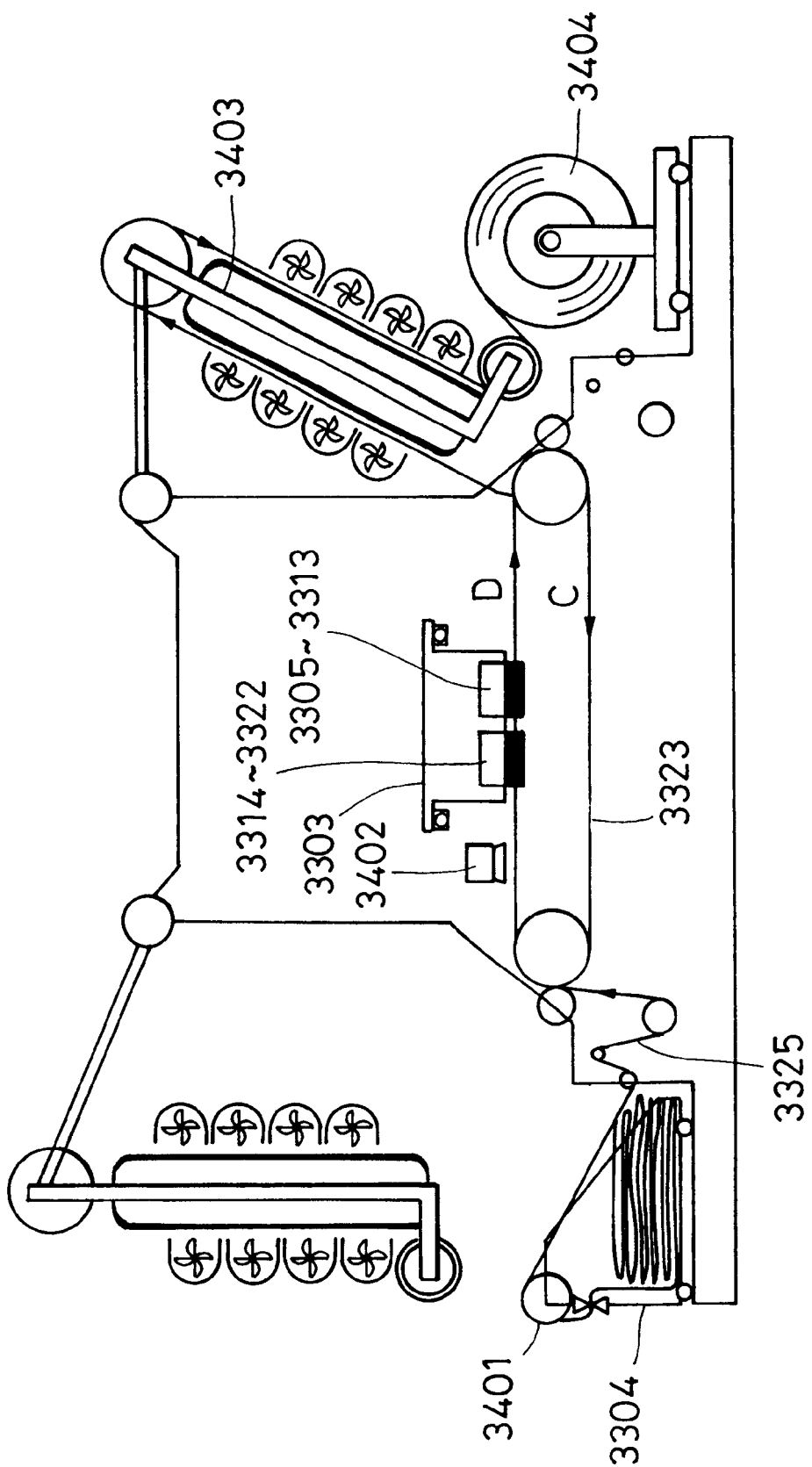
FIG. 34 is a cross-sectional view schematically illustrating the construction of a full-color ink-jet textile printing apparatus according to another embodiment of the invention and also illustrating the operation of recording an image on the surface of a cloth.

FIGS. 33 and 34 are cross-sectional views illustrating the construction of a color ink-jet recording apparatus according to the eighth embodiment of the invention. The manner of printing an image on the principal surface is shown in FIG. 33 wherein reference numeral 3302 denotes a feed roller around which a recording medium 3325 is wound into the shape of a roll. A printing controller 3303 controls the printing operation of the ink-jet heads (3305–3322). The recording medium 3325 on which an image has been printed is stored in a storage cage (storage unit) 3304 while preserving the print starting position 3301.

The ink-jet heads 3305–3313 are disposed on the upstream side of the conveying path along which the recording medium 3325 is conveyed. The ink-jet head 3305 serves as a first light-magenta multinozzle head (hereinafter referred to as a first light-magenta head) for emitting light-magenta ink. The ink-jet head 3306 serves as a first yellow multinozzle head (hereinafter referred to as a first yellow head) for emitting yellow ink. The ink-jet head 3307 serves as a first orange multinozzle head (hereinafter referred to as a first orange head) for emitting orange ink. The ink-jet head 3308 serves as a first magenta multinozzle head (hereinafter referred to as a first magenta head) for emitting magenta ink. The ink-jet head 3309 serves as a first light-cyan multinozzle head (hereinafter referred to as a first light-cyan head) for emitting light-cyan ink. The ink-jet head 3310 serves as a first cyan multinozzle head (hereinafter referred to as a first cyan head) for emitting cyan ink. The ink-jet head 3311 serves as a first blue multinozzle head (hereinafter referred to as a first blue head) for emitting blue ink. The ink-jet head 3312 serves as a first black multinozzle head (hereinafter referred to as a first black head) for emitting black ink. The ink-jet head 3113 serves as a first invisible-color multinozzle head (hereinafter referred to as a first invisible-color head) for emitting dye ink which does not color cloths but which can be detected using special light such as ultraviolet light.

The ink-jet heads 3114–3322 are disposed on the downstream side of the conveying path of the recording medium 3325 such that they are apart from the ink-jet heads 3305–3313 by a distance half the width (band width) along which an image is recorded by the ink-jet heads 3305–3313 during one scanning process. The ink-jet head 3314 serves as a second light-magenta multinozzle head (hereinafter referred to as a second light-magenta head) for emitting light-magenta ink. The ink-jet head 3315 serves as a second yellow multinozzle head (hereinafter referred to as a second yellow head) for emitting yellow ink. The ink-jet head 3316 serves as a second orange multinozzle head (hereinafter referred to as a second orange head) for emitting orange ink. The ink-jet head 3317 serves as a second magenta multinozzle head (hereinafter referred to as a second magenta head) for emitting magenta ink. The ink-jet head 3318 serves as a second light-cyan multinozzle head (hereinafter referred to as a second light-cyan head) for emitting light-cyan ink. The ink-jet head 3319 serves as a second cyan multinozzle head (hereinafter referred to as a second cyan head) for emitting cyan ink. The ink-jet head 3320 serves as a second blue multinozzle head (hereinafter referred to as a second blue head) for emitting blue ink. The ink-jet head 3321 serves as the second black multinozzle head (hereinafter referred to as the second black head) for emitting black ink. The ink-jet head 3322 serves as a second invisible-color multinozzle head (hereinafter referred to as a second invisible-color head) for emitting dye ink which does not color cloths but which can be detected using special light such as ultraviolet light.

Reference numeral 3323 denotes a platen for conveying the recording medium. The platen 3323 is held in a stretched fashion by a plurality of rollers, as shown in the figure. The platen 3323 moves in a direction denoted by an arrow A thereby conveying the recording medium by means of friction between the platen 3323 and the recording medium 3325 in a direction denoted by an arrow B. Reference numeral 3324 denotes a drying unit for drying ink on the recording surface of the recording medium 3325 immediately after an image is printed.

FIG. 34 illustrates the manner of printing an image on the back surface of the recording medium. The recording medium 3325 is supplied upside down onto the platen 3323 via the feed roller 3410 of the storing cage 3304 and stuck thereto. The platen 3323 moves in a direction denoted by an arrow C thereby conveying the recording medium 3325 by means of friction between the platen 3323 and the recording medium 3325 in a direction denoted by an arrow D. Reference numeral 3402 denotes an optical area sensor disposed above the platen 3323 to detect the position of the dye ink printed by the first invisible-color head 3313 and the second invisible-color head 3322. When the image is printed on the back surface of the recording medium, the print heads 3314–3322 are located on the upstream side of the conveying path of the recording medium 3325 and the print heads 3305–3313 are located on the downstream side. That is, the recording medium is conveyed in a direction opposite to that shown in FIG. 33. When the image is formed on the back surface of the recording medium, the first invisible-color multinozzle head 3313 and the second invisible-color multinozzle head 3322 are not used. Reference numeral 3403 denotes a drying unit for drying ink on the recording surface of the recording medium 3325 immediately after the completion of the printing process. Reference numeral 3404 denotes a roller similar to the roller 3302 shown in FIG. 33. However, the roller 3404 shown in FIG. 34 serves as a wind-up roller for winding-up the cloth after printing the image thereon.

Figure 35:
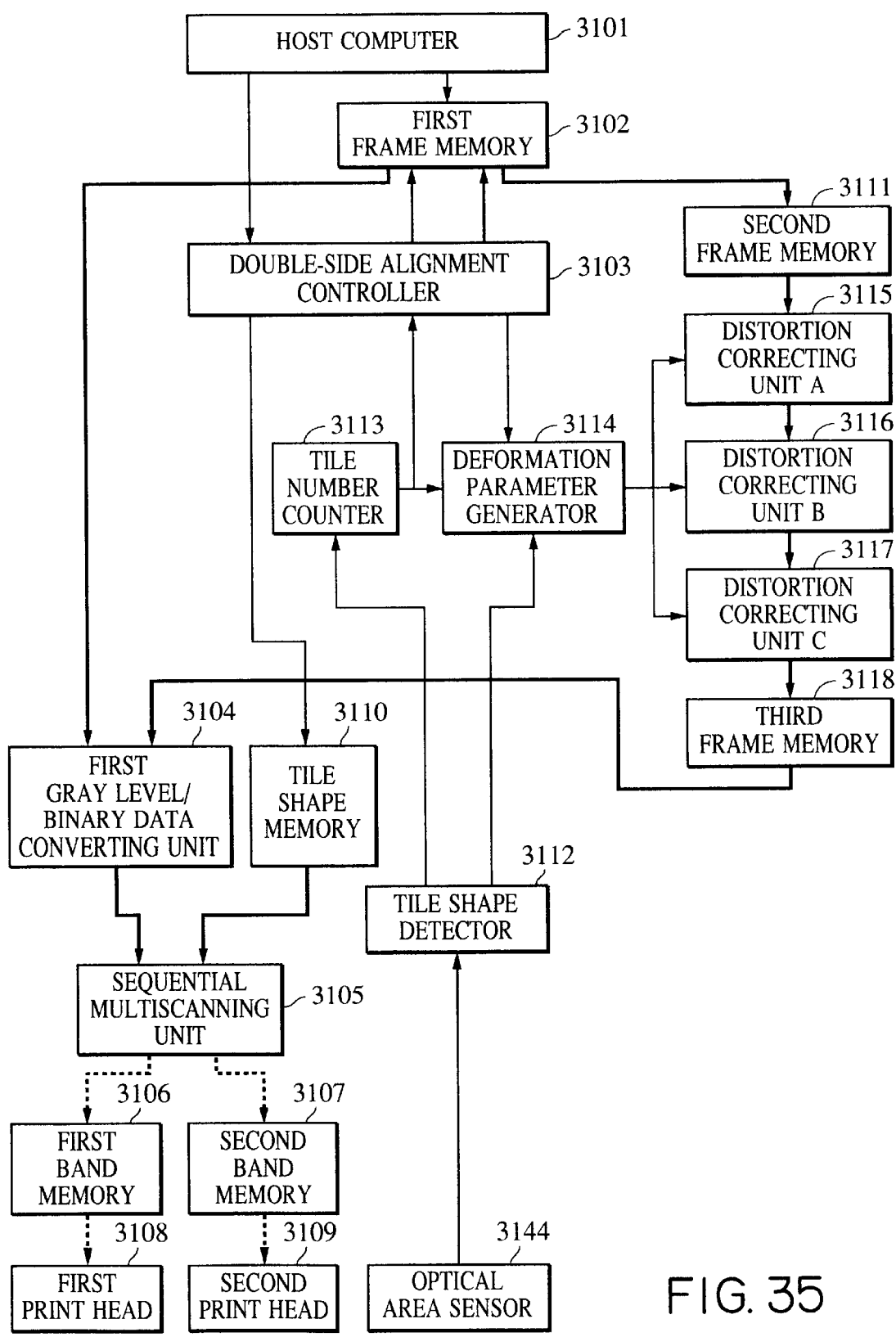
FIG. 35 is a block diagram illustrating a process performed on image data according to an embodiment of the invention.

In the present embodiment, as can be seen from the block diagram shown in FIG. 35, an image is formed on the surface of a cloth by applying a recording agent using the first print head and the second print head, and then another image is formed on the opposite surface of the cloth by applying a recording agent using the second print head first and then the first print head thereby forming the images on both surfaces at precisely corresponding locations using only a single printing apparatus, regardless of expansion/contraction of the cloth.

Ninth Embodiment

A ninth embodiment of the present invention is now described below in detail with reference to the accompanying drawings.

In the seventh and eighth embodiments described above, the boundary lines used to detect the distortion of the recording medium which can occur when the recording medium is conveyed are formed into the rectangular shape. However, the boundary lines may also be formed into a triangular shape as described above in the third embodiment.

Figure 36:
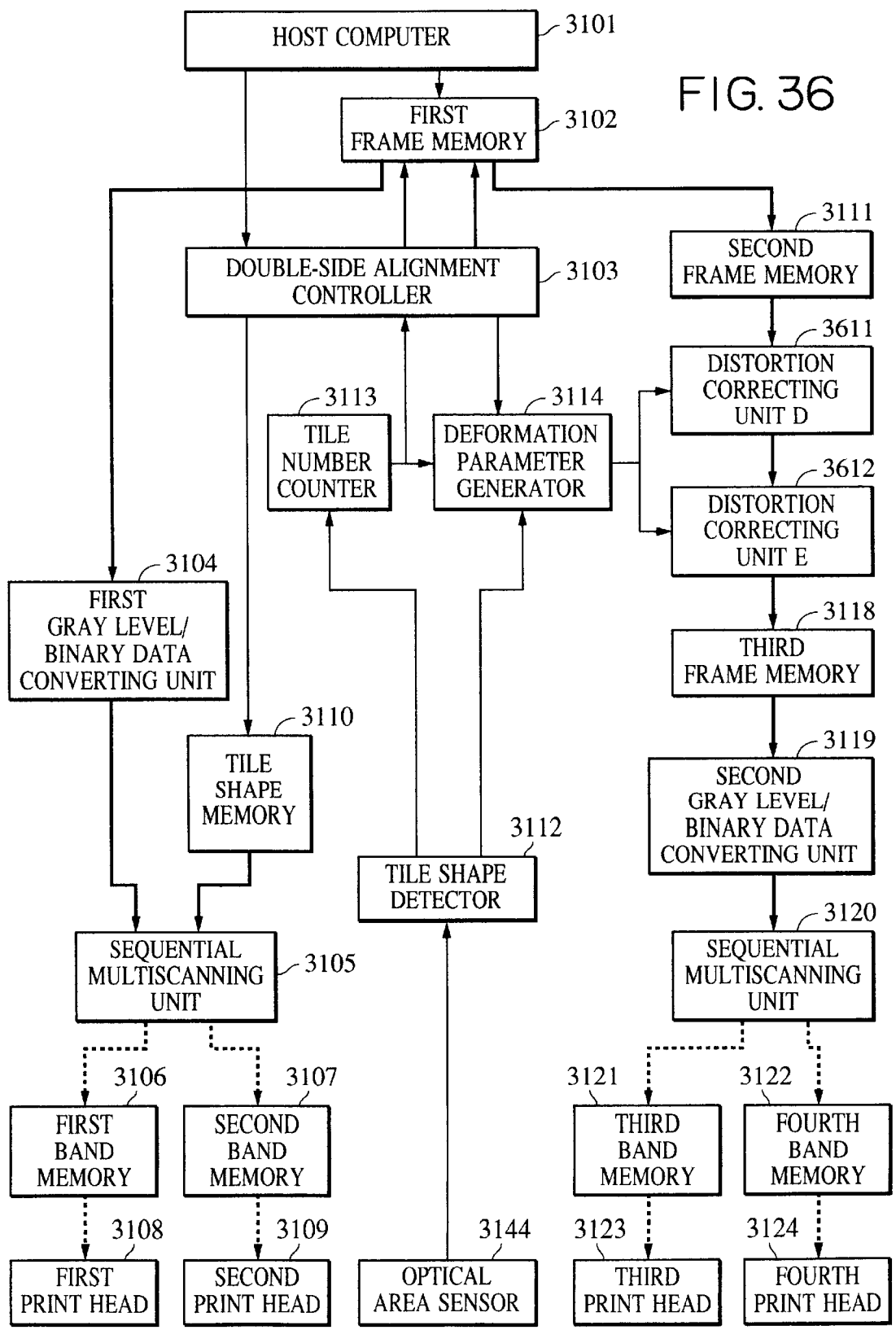
FIG. 36 is a block diagram illustrating a process performed on image data according to another embodiment of the invention.

FIG. 36 is a block diagram illustrating the printing operation performed by an ink-jet printer according to the ninth embodiment of the invention. Image data 1801 to be printed by the ink-jet textile printing apparatus is divided into triangular tile-shaped areas in the same manner described above in the previous embodiment with reference to FIG. 18. Therefore, the manner of dividing the image data into triangular tile-shaped ares is not described in further detail here. In this embodiment, the construction of the textile printing apparatus is similar to that shown in FIG. 30 employed in the first embodiment. In FIG. 36, similar elements to those in FIG. 31 are denoted by similar reference numerals.

In the present embodiment, if a print start command is issued by the host computer 3101, the both-side alignment controller 3103 shown in FIG. 36 sequentially reads printing image data by an amount corresponding to one main scanning length from the first frame memory 3202. The both-side alignment controller 3103 also reads invisible-color data representing triangular tile-shaped boundary lines 1803 (FIG. 18) from the tile shape memory 3110 and sends it together with the image data 1801 in a superimposed fashion to the sequential multiscanning unit 3105.

In the present embodiment, distortion of the cloth or the recording medium, which occurs when the cloth is stuck onto the second platen via the conveying means, is corrected in the manner described above with reference to FIG. 19.

In response to a print start command issued by the host computer 3101, the both-side alignment controller 3103 sequentially reads printing image data by an amount corresponding to one main scanning length from the first frame memory 3012 to the first printing controller (including 3104, 3105, 3106, 3107). The both-side alignment controller 3103 also stores the same printing image data into the second frame memory 3111. If the optical area sensor 3144 detects rectangular tile-shaped boundary lines 1803 printed by the first printing controller, the shape of the detected boundary lines 314 is analyzed by the tile shape detector 3112. The tile number counter 3113 assigns a processing number (n) to a detected tile. The processing number is sent to the both-side alignment controller 3103. The deformation parameter generator 3114 determines the coordinates 1901'–1903' of the three corners of the detected tile with respect to the coordinates 1901–1903 of the three corners of the unit tile (FIG. 19) stored in the tile shape memory 3110. Furthermore, the deformation parameter generator 3114 calculates the correction value parameters 1904–1907 indicating the deviations of reference points 1902–1903 with respect to the first reference point 1901. The resultant correction value parameters 1904–1907 are stored in a memory provided in the deformation parameter generator 3114. FIG. 19 illustrates a unit tile area detected by an odd-number-th detection. The respective coordinates and correction value parameters are similar to those employed in the third embodiment and thus they are not described in further detail herein.

In the present embodiment, the distortion correcting unit includes a distortion correcting unit D 3611 and a distortion correcting unit E 3612. In the distortion correcting processes (1) and (2), the distortion correcting units D and E correct the pixel positions with respect to the coordinates of the first reference point for all pixels within the tile area 2001 read from the second frame memory 3111 thereby producing a corrected tile area 2101.

The process of correcting distortion caused by deviations of the respective reference points is performed in a similar manner to the third embodiment described above with reference to FIGS. 20, 21, and 22, and thus a duplicated description is not given here.

The process associated with the frame memory of the ink-jet textile printing apparatus is also performed in a similar manner to the third embodiment described above with reference to FIG. 23.

According to the technique disclosed in the present embodiment of the invention, as described above, it is possible to form images on both sides of a cloth in such a manner that an image is first formed on one surface of the cloth and then another image is formed on the opposite surface at locations precisely corresponding to the previously formed image regardless of expansion/contraction of the cloth.

Furthermore, in the present embodiment, because the boundary lines used to detect the distortion are formed into the triangular shape, it becomes possible to reduce the number of pipe line process stages in the distortion correcting unit (3 stages are reduced to 2 stages). This makes it possible to form, at low cost, a high-precision image with a high registration accuracy regardless of expansion/contraction of the cloth.

In the seventh to ninth embodiments, as described above, boundary lines used to detect distortion of a recording medium is formed together with an image on the principal surface of the recording medium and then another image is formed on the back surface of the recording medium in accordance with image data which is corrected in accordance with the distortion of the recording medium and which is reversed from right to left about an axis in the conveying direction such that the resultant image becomes mirror-symmetric to the image on the principal surface thereby forming high-precision images on both surfaces at precisely corresponding locations. The techniques disclosed in these embodiments are useful in particular when a recording medium having expansion/contraction properties such as a cloth is used, because it is possible to form images on both surfaces at precisely adjusted locations by correcting distortion which can occur when the cloth is conveyed. When an image is printed on a cloth using an ink-jet technique, it is possible to form an image with a dye reaching the back side of the cloth.

Furthermore, the apparatus used in those embodiments may include first recording means for forming an image on the principal surface of a cloth and a second recording means for forming an image on the back surface of the cloth wherein the maximum number of recording heads of each recording means is limited to 2. This makes it possible to realize a low-cost apparatus including a less number of heads and capable of forming an image including a less number of overprinted points. This allows an improvement in productivity.

In the seventh to ninth embodiments described above, tile information may also be printed on the recording medium in the respective areas defined by the boundary lines as described earlier with reference to the second embodiment. As in the second embodiment, the information may be printed into the form of for example a bar code using invisible-color ink. It is possible to detect the absolute positions of the respective tile areas by detecting the bar code using an optical area sensor. Such information printed with invisible-color ink according to the technique disclosed in the second embodiment makes it possible to correctly adjust the image locations when the printing operation is restarted after the printing apparatus is shut down for an unpredictable reason.

Other Embodiments

In the embodiments described above, the electrothermal transducer is employed to emit liquid. However, the present invention is not limited to that. Other various known emission techniques may also be employed. For example, a piezoelectric device may be employed as an electromechanical transducer whereby a mechanical pressure serving as emission energy is applied to liquid thereby emitting the liquid.

The present invention is especially useful when applied to a recording apparatus using an ink-jet recording apparatus, in particular, when applied to a recording apparatus using a so-called bubble jet recording head which emits a droplet by means of thermal energy.

It is desirable that the bubble jet recording apparatus be based on the basic principles disclosed for example in U.S. Pat. Nos. 4,723,129 or 4,740,796. This bubble jet technique may be applied to either the on-demand or continuous type. In the on-demand type, electrothermal transducer elements are disposed at locations corresponding to locations on a sheet or in liquid paths where liquid (ink) is held so that when at least one driving signal corresponding to information to be recorded is applied to an electrothermal transducer element, the electrothermal transducer element generates thermal energy which causes a rapid increase in temperature above the nuclear boiling temperature thereby causing film boiling to occur at the heating surface of the recording head thus creating bubbles in the liquid (ink) corresponding in a one-to-one fashion to the driving signals. The growth and contraction of bubbles causes at least one droplet of liquid (ink) to be emitted via an emission orifice. It is more desirable that the driving signal be given in the form of pulses so that bubbles are quickly and properly grown and contracted in response to the driving signal. It is desirable that the driving signal be given in the manner disclosed in U.S. Pat. Nos. 4,463,359 or 4,345,262. If the temperature increasing rate of the heating surface is optimized according to the technique disclosed in U.S. Pat. No. 4,313,124, it becomes possible to perform printing in a more desirable fashion.

The present invention is applicable not only to a serial type of apparatus but also to an apparatus using a full line type recording head having a length corresponding to the maximum allowable width of a recording medium.

It is also desirable that the recording apparatus include recording head recovering means and other auxiliary means so that the effects of the present invention can be achieved in a more reliable fashion.

The present invention may be applied to ink-jet recording apparatus of various types. They include an ink-jet recording apparatus used as an image output terminal of an information processing device such as a computer, a copying machine combined with a reader or the like, and a facsimile machine having transmission and reception capabilities.

According to the present invention, as described above, it is possible to form a high-precision image at a correct location on a recording medium in accordance with image data corrected depending on distortion of the recording medium which can occur when the recording medium is conveyed. Thus, the invention is especially useful when the recording medium is of the type having expansion/contraction properties such as a cloth. That is, the invention provides a method and apparatus capable of forming an image with a guaranteed high accuracy on a cloth employed as the recording medium at low cost even when a cloth employed as the recording medium is conveying in an expanded or contracted fashion.

What is claimed is:

1. An image forming apparatus for forming an image on a recording medium using a recording head in accordance with image data, said image forming apparatus comprising:
    conveying means for conveying the recording medium;
    evaluation means for evaluating distortion of the recording medium conveyed by said conveying means;
    correction means for correcting image data corresponding to an image of a predetermined area in accordance with the result of an evaluation made by said evaluation means, wherein the image data is corrected such that a shape of the predetermined area to be formed on the recording medium is changed; and
    image forming means for forming an image on the recording medium by driving the recording head in accordance with the image data corrected by said correction means.

2. An image forming apparatus according to claim 1, wherein boundary lines are formed at least on a surface of the recording medium such that tile-shaped areas are defined by the boundary lines, and wherein said evaluation means detects the boundary lines and evaluates the shape of the tile-shaped areas.

3. An image forming apparatus according to claim 2, wherein the boundary lines are formed with a recording agent containing a dye which can be detected using particular light.

4. An image forming apparatus according to claim 3, wherein the recording medium is a cloth, and wherein the recording agent used to form the boundary lines contains a dye which does not color the cloth.

5. An image forming apparatus according to claim 1, wherein the recording medium includes boundary lines which are formed, before the recording medium is conveyed by said conveying means, by weaving yarn dyed with a dye which can be detected using particular light into the form of a rectangular lattice.

6. An image forming apparatus according to claim 5, wherein the recording medium is a cloth and the dye which can be detected using particular light is a dye which does not color the cloth.

7. An image forming apparatus according to claim 5, wherein said evaluation means includes detection means for detecting the boundary lines and said evaluation means evaluates the distortion of the recording medium on the basis of a shape defined by the boundary lines.

8. An image forming apparatus according to claim 7, wherein the recording medium is a cloth, said evaluation means evaluates the distortion caused by expansion or contraction of the cloth on the basis of the shape of the area defined by the boundary lines, and said correcting means corrects the image data such that an image corresponding to the image data has a shape corresponding to the shape of the area defined by the boundary lines.

9. An image forming apparatus according to claim 8, further comprising a memory for storing image data, wherein said correcting means restores the corrected image data into said memory.

10. An image forming apparatus according to claim 8, wherein said correction means makes a correction by deforming the image data in accordance with the evaluation result given by said evaluation means.

11. An image forming apparatus according to claim 1, wherein the recording medium includes boundary lines which are formed, before the recording medium is conveyed by said conveying means, by weaving yarn dyed with a dye which can be detected using particular light into the form of a triangular lattice.

12. An image forming apparatus according to claim 1, wherein the recording medium is a cloth and the cloth has boundary lines which are formed, before the cloth is conveyed by said conveying means, by weaving yarn dyed with a dye, which does not color the cloth and which can be removed, into the form of a rectangular lattice.

13. An image forming apparatus according to claim 1, wherein the recording medium is a cloth and the cloth has boundary lines which are formed, before the cloth is conveyed by said conveying means, by weaving yarn dyed with a dye, which does not color the cloth and which can be removed, into the form of a triangular lattice.

14. An image forming apparatus according to claim 1, wherein the recording medium has lattice-shaped boundary lines used to evaluate the distortion of the recording medium and bar-code information representing the areas defined by the boundary lines.

15. An image forming apparatus according to claim 14, wherein the bar-code information is formed with a recording agent containing a dye which can be detected using particular light.

16. An image forming apparatus according to claim 14, wherein the recording medium is a cloth and the bar-code information is formed with a recording agent containing a dye which does not color the cloth.

17. An image forming apparatus according to claim 1, wherein said conveying means includes an adhesive part for holding the recording medium.

18. An image forming apparatus according to claim 1, further comprising drying means for drying the recording medium after an image has been formed on the recording medium by the recording head.

19. An image forming apparatus according to claim 1, wherein the recording head is an ink-jet head for emitting ink.

20. An image forming apparatus according to claim 19, wherein the ink-jet head includes an electrothermal transducer for applying thermal energy to ink to generate a bubble in the ink thereby emitting the ink.

21. A method for forming an image on a recording medium using a recording head in accordance with image data, said method comprising the steps of:

conveying the recording medium;

evaluating distortion of the recording medium conveyed;

correcting image data corresponding to an image of a predetermined area in accordance with the result of an evaluation made in said evaluation step, wherein the image data is corrected such that a shape of the predetermined area to be formed on the recording medium is changed; and forming an image on the recording medium using the recording head in accordance with the image data corrected in said correction step.

22. A method for forming an image according to claim 21, wherein the recording medium has lattice-shaped boundary lines formed at least on a surface of the recording medium, and wherein said evaluation step optically detects the boundary lines and evaluates the distortion of the recording medium on the basis of the shape of the areas defined by the boundary lines.

23. A method for forming an image according to claim 22, wherein said correction step corrects the image data such that the resultant image data has a shape corresponding to the areas defined by the boundary lines.

24. A method of forming an image according to claim 21, wherein the recording medium is a cloth.

25. A method of forming an image according to claim 21, wherein the recording head is an ink-jet head for emitting ink.

26. A method of forming an image according to claim 25, wherein the ink-jet head includes an electrothermal transducer for applying thermal energy to ink to generate a bubble in the ink thereby emitting the ink.

27. An image forming apparatus for forming an image on a recording medium using a recording head in accordance with image data, said image forming apparatus comprising:

conveying means for conveying the recording medium;

evaluation means for evaluating distortion of the recording medium conveyed by said conveying means;

correction means for correcting image data corresponding to an image of a predetermined area in accordance with a result of an evaluation made by said evaluation means, wherein the image data is corrected such that a shape of the predetermined area to be formed on the recording medium is changed; and control means for controlling an image forming process such that an image is formed a plurality of times on the recording medium in accordance with the same image data, and such that for forming the image at least one of the plurality of times, said evaluation means evaluates the distortion of the recording medium, said correction means corrects the image data, and the image is formed in accordance with the corrected image data.

28. An image forming apparatus according to claim 27, wherein boundary lines are formed at least on the surface of the recording medium such that tile-shaped areas are defined by the boundary lines and wherein said evaluation means detects the boundary lines and evaluates the shape of the tile-shaped areas.

29. An image forming apparatus according to claim 28, wherein the boundary lines are formed with a recording agent containing a dye which can be detected using particular light.

30. An image forming apparatus according to claim 29, wherein the recording medium is a cloth and wherein the recording agent used to form the boundary lines contains a dye which does not color the cloth.

31. An image forming apparatus according to claim 27, wherein the recording medium includes boundary lines which are formed, before the recording medium is conveyed by said conveying means, by weaving yarn dyed with a dye which can be detected using particular light into the form of a rectangular lattice.

32. An image forming apparatus according to claim 31, wherein the recording medium is a cloth and the dye which can be detected using particular light is a dye which does not color the cloth.

33. An image forming apparatus according to claim 31, wherein said evaluation means includes detection means for detecting the boundary lines and said evaluation means evaluates the distortion of the recording medium on the basis of a shape defined by the boundary lines.

34. An image forming apparatus according to claim 33, wherein the recording medium is cloth, said evaluation means evaluates the distortion caused by expansion or contraction of the cloth on the basis of the shape of the area defined by the boundary lines, and said correcting means corrects the image data such that an image corresponding to the image data has a shape corresponding to the shape of the area defined by the boundary lines.

35. An image forming apparatus according to claim 34, further comprising a memory for storing image data, wherein said correcting means restores the corrected image data into said memory.

36. An image forming apparatus according to claim 27, wherein the recording medium includes boundary lines which are formed, before the recording medium is conveyed by said conveying means, by weaving yarn dyed with a dye which can be detected using particular light into the form of a triangular lattice.

37. An image forming apparatus according to claim 27, wherein the recording medium is a cloth and the cloth has boundary lines which are formed, before the cloth is conveyed by said conveying means, by weaving yarn dyed with a dye, which does not color the cloth and which can be removed, into the form of a rectangular lattice.

38. An image forming apparatus according to claim 27, wherein the recording medium is a cloth and the cloth has boundary lines which are formed, before the cloth is conveyed by said conveying means, by weaving yarn dyed with a dye, which does not color the cloth and which can be removed, into the form of a triangular lattice.

39. An image forming apparatus according to claim 27, further comprising forming means for forming boundary lines defining tile-shaped areas on the recording medium, wherein said evaluation means detects the boundary lines and evaluates the shape of the tile-shaped areas.

40. An image forming apparatus according to claim 39, wherein said control means controls the image forming process such that the boundary lines are formed by said forming means when forming the image an earlier one of the plurality times and such that the distortion of the recording medium is evaluated by said evaluation means when forming the image a later one of the plurality of times.

41. An image forming apparatus according to claim 27, wherein the recording medium has lattice-shaped boundary lines used to evaluate the distortion of the recording medium and bar-code information representing the areas defined by the boundary lines.

42. An image forming apparatus according to claim 41, wherein the bar-code information is formed with a recording agent containing a dye which can be detected using particular light.

43. An image forming apparatus according to claim 41, wherein the recording medium is a cloth and wherein the bar-code information is formed with a recording agent containing a dye which does not color the cloth.

44. An image forming apparatus according to claim 27, wherein the recording medium is a cloth consisting of different types of fibers which need different types of dyes to color.

45. An image forming apparatus according to claim 44, wherein different recording agents containing different dyes are employed in the image forming process performed under the control of said control means.

46. An image forming apparatus according to claim 27, wherein said correction means makes a correction by deforming the image data in accordance with the evaluation result given by said evaluation means.

47. An image forming apparatus according to claim 27, wherein said conveying means includes an adhesive part for holding the recording medium.

48. An image forming apparatus according to claim 27, further comprising drying means for drying the recording medium after an image has been formed on the recording medium by the recording head.

49. An image forming apparatus according to claim 27, wherein the recording head is an ink-jet head for emitting ink.

50. An image forming apparatus according to claim 49, wherein the ink-jet head includes an electrothermal transducer for applying thermal energy to ink to generate a bubble in the ink thereby emitting the ink.

51. A method for forming an image on a recording medium using a recording head in accordance with image data, said method comprising:
a first image forming step in which an image is formed on a recording medium in accordance with image data;
a conveying step in which the recording medium is conveyed;
an evaluation step in which distortion of the conveyed recording medium is evaluated;
a correction step in which the image data corresponding to an image of a predetermined area is corrected in accordance with the result of the evaluation made in said evaluation step, wherein the image data is corrected such that a shape of the predetermined area to be formed on the recording medium is changed; and
a second image forming step in which an image is formed on the recording medium using the recording head in accordance with the image data corrected in said correction step.

52. A method for forming an image according to claim 51, wherein said first image forming step includes a boundary line forming step in which in addition to the image, lattice-shaped boundary lines are also formed at least on the surface of the recording medium, and wherein said evaluation step evaluates the distortion of the recording medium by detecting the boundary lines.

53. A method for forming an image according to claim 51, wherein the recording medium has lattice-shaped boundary lines formed at least on the surface thereof, and wherein said first image forming step includes the steps of evaluating distortion of the supplied recording medium by detecting the boundary lines and correcting said image data in accordance with the result of the evaluation made in said evaluation step, whereby an image is formed in accordance with the corrected image data.

54. A method for forming an image according to claim 51, wherein said evaluation step optically detects the boundary lines and evaluates the distortion of the recording medium on the basis of the shape of the areas defined by the boundary lines.

55. A method for forming an image, according to claim 54, wherein said correction step corrects the image data such that the resultant image data has a shape corresponding to the areas defined by the boundary lines.

56. A method for forming an image, according to claim 51, wherein a cloth is employed as the recording medium.

57. A method for forming an image according to claim 56, wherein the cloth is a cloth consisting of different types fibers which need different types of dyes to color.

58. A method for forming an image according to claim 51, wherein the recording head is an ink-jet head for emitting ink.

59. A method for forming an image according to claim 58, wherein the ink-jet head includes an electrothermal transducer for applying thermal energy to ink to generate a bubble in the ink thereby emitting the ink.

* * * * *

UNITED STATES PATENT AND TRADEMARK OFFICE
CERTIFICATE OF CORRECTION

PATENT NO.      : 6,499,822 B1
DATED           : December 31, 2002
INVENTOR(S)     : Junkichi Abe et al.

It is certified that error appears in the above-identified patent and that said Letters Patent is hereby corrected as shown below:

Column 2,
Line 46, "certain" should read -- certain --; and
Line 64, "the textile" should read -- textile --.

Column 3,
Line 26, "Coth" should read -- Cloth --;
Line 31, "dying" should read -- dyeing --; and
Line 48, "coth" should read -- cloth --.

Column 5,
Line 26, "side" should read -- sides --.

Column 6,
Line 33, "According" should read -- According to --; and
Line 60, "coth" should read -- cloth --.

Column 10,
Line 45, "pint" should read -- print --.

Column 11,
Line 28, "respective," should read -- respectively, --; and
Line 29, "or a" should read -- of an --.

Column 18,
Line 32, "1608," should read -- 1609, --.

Column 19,
Line 43, "steps" should read -- step --.

Column 20,
Line 10, "(step" should read -- (steps --;
Line 15, "types" should read -- types of --; and
Line 62, "frictional" should read -- friction --.

Column 21,
Line 2, "2419-2417" should read -- 2419-2427 --; and
Line 5, "2419-2417" should read -- 2429-2427 --.

UNITED STATES PATENT AND TRADEMARK OFFICE
CERTIFICATE OF CORRECTION

PATENT NO.    : 6,499,822 B1
DATED         : December 31, 2002
INVENTOR(S)   : Junkichi Abe et al.

It is certified that error appears in the above-identified patent and that said Letters Patent is hereby corrected as shown below:

Column 22,
Line 57, "drying" should read -- dyeing --.

Column 26,
Line 33, "3206" should read -- 3207, --.

Column 28,
Line 39, "firs t" should read -- first --.

Column 29,
Line 21, "imag e" should read -- image --.

Column 31,
Line 50, "ares" should read -- areas --.

Column 32,
Line 66, "is" should read -- are --.

Column 33,
Line 32, "of for example" should read -- of, for example, --.

Column 40,
Line 7, "fibers," should read -- of fibers, --.

Signed and Sealed this

Twenty-first Day of October, 2003

JAMES E. ROGAN
*Director of the United States Patent and Trademark Office*